(12) United States Patent
Nakamura et al.

(10) Patent No.: US 7,843,793 B2
(45) Date of Patent: Nov. 30, 2010

(54) OPTICAL PICKUP APPARATUS, OBJECTIVE OPTICAL ELEMENT AND OPTICAL INFORMATION RECORDING REPRODUCING APPARATUS

(75) Inventors: Kentarou Nakamura, Hachioji (JP); Kohei Ota, Hachioji (JP); Nobuyoshi Mori, Hachioji (JP); Eiji Nomura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 942 days.

(21) Appl. No.: 11/712,959

(22) Filed: Mar. 2, 2007

(65) Prior Publication Data

US 2007/0211607 A1   Sep. 13, 2007

(30) Foreign Application Priority Data

| Mar. 7, 2006 | (JP) | ............... JP2006-060968 |
| Mar. 15, 2006 | (JP) | ............... JP2006-070701 |
| Apr. 27, 2006 | (JP) | ............... JP2006-123471 |
| Jun. 15, 2006 | (JP) | ............... JP2006-166148 |

(51) Int. Cl.
  *G11B 7/00* (2006.01)
(52) U.S. Cl. .................. 369/112.26; 369/121
(58) Field of Classification Search .......... None
  See application file for complete search history.

(56) References Cited

U.S. PATENT DOCUMENTS

2004/0047269 A1   3/2004   Ikenaka et al.
2005/0068881 A1 *  3/2005   Kimura et al. ......... 369/112.23
2005/0083562 A1   4/2005   Hendriks
2005/0237898 A1   10/2005  Kimura

FOREIGN PATENT DOCUMENTS

| EP | 1 521 248 A2 | 4/2005 |
| EP | 1 580 737 A2 | 9/2005 |
| EP | 1 596 383 A2 | 11/2005 |

OTHER PUBLICATIONS

European Search Report dated Mar. 25, 2009.

* cited by examiner

*Primary Examiner*—Paul Huber
(74) *Attorney, Agent, or Firm*—Finnegan, Henderson, Farabow, Garrett & Dunner, L.L.P.

(57) ABSTRACT

An optical pickup apparatus according to the present invention includes: a first light source for emitting a first light flux; a second light source for emitting a second light flux; a third light source for emitting a third light flux; and an objective optical element. The objective optical element has an optical surface including at least two areas provided with optical path difference providing structures. The objective optical element converges the first to third light fluxes each passing through the predetermined areas on the objective optical element onto respective information recording surfaces of the first to third optical disks. The optical pickup apparatus provides a wavelength dependency of a spherical aberration so as to correct a change in a spherical aberration due to a refractive index change with a temperature change of the objective optical element.

27 Claims, 14 Drawing Sheets

OPTICAL AXIS DIRECTION

+

=

Wa

OPTICAL PICKUP APPARATUS, OBJECTIVE OPTICAL ELEMENT AND OPTICAL INFORMATION RECORDING REPRODUCING APPARATUS

This application is based on Japanese Patent Application Nos. 2006-060968 filed on Mar. 7, 2006, 2006-070701 filed on Mar. 15, 2006, 2006-123471 filed on Apr. 27, 2006, 2006-166148 filed on Jun. 15, 2006, in Japanese Patent Office, the entire content of which is hereby incorporated by reference.

BACKGROUND OF THE INVENTION

The present invention relates to an optical pickup apparatus, objective optical element and optical information recording reproducing apparatus by which information can be recorded and/or reproduced information compatibly for different kinds of optical disks.

In recent years, tendency of a shorter wavelength of laser beam as a light source which has been used to record and/or reproduce information for optical disks, has become a main stream. For example, a laser light source having 400-420 nm wavelength, such as a blue-violet semiconductor laser; and a blue-SHG laser which converts wavelength of an infrared semiconductor laser utilizing a second harmonic wave, have been made practical. Information of 23-27 GB can be recorded on the optical disk having a diameter of 12 cm by using these blue-violet optical sources and an objective lens having NA (Numerical aperture) which is the same as a DVD (Digital Versatile Disc). When NA is increased to 0.85, information of 23-25 GB can be recorded onto the optical disk having a diameter of 12 cm. In this specification, the optical disk and an optical-magnetic disk using a blue-violet laser light source are called "a high density optical disk".

Hereupon, the high density optical disk using the objective optical element, has larger coma caused due to the skew of the optical disk. Therefore some high density optical disks using the objective optical element with NA of 0.85, are designed so that the protective layer has thinner thickness (which is 0.1 mm, while that of DVD is 0.6 mm) than that of DVD to reduce the comma due to the skew. On the other hand, it is sometimes considered that a product, such as an optical disk player/recorder, which is capable of only recording/reproducing information for the above high-density optical disk is worthless. Taking account of a fact that, at present, DVDs and CDs (Compact Disc), onto which various kinds of information have been recorded, are on the market, the value of the product as a high-density optical disk player/recorder is increased by, for example, enabling to appropriately record/reproduce information additionally for DVDs and CDs, which a user possesses. From these backgrounds, the optical pickup apparatus installed in the high-density optical disk player/recorder is required to be capable of appropriately recording/reproducing information not only for a high-density optical disk but also a DVD and a CD.

It can be considered, as a method by which the information can be adequately recorded/reproduced while the compatibility is maintained also to anyone of the high density optical disk and DVD and further to CD, a method to selectively switch the optical system for the high density optical disk and the optical system for DVD and CD corresponding to the recording density of the optical disk to which the information is recorded/reproduced. However, it requires a plurality of optical systems, which is disadvantageous for the size-reduction and which increases the cost.

Accordingly, in order to simplify the structure of the optical pickup apparatus and to intend the reduction of cost, it is preferable to make an optical system for the high density optical disk an optical system for DVD and CD into a common optical system, and to reduce the number of optical parts contributing the optical pickup apparatus as much as possible, even when the optical pickup apparatus has compatibility. Then, providing the common objective optical element which is arranged with facing an optical disk, is most advantageous for the simplification of the construction or cost reduction of the optical pickup apparatus. Here, in order to obtain the common objective optical element for plural kinds of optical disks which use different wavelengths for recording/reproducing information, it is requires that the objective optical system is provided with an optical path difference providing structure having a wavelength dependency for the spherical aberration, which is formed thereon.

European patent application EP-A 1304689 discloses an objective optical system which has the diffractive structure as an optical path difference providing structure and can be commonly used for the high density optical disk and the conventional DVD and CD, and also discloses an optical pickup apparatus in which this objective optical system is mounted.

However, the objective optical element for use in the optical pickup apparatus which compatibly conducts recording and/or reproducing information for three different optical disks, which is written in EP-A 1304689, has a probability that the light amount used for recording and/or reproducing information is insufficient, depending on the design specification of the optical pickup apparatus, or has a problem that the unnecessary light affects a sensor for tracking operation when the tracking operation for CD is conducted, and the accurate tracking operation is hardly conducted, which is a problem. Particularly, when using an infinite optical system for all three different kinds of optical disks, in other words, a collimated light flux enters into an objective optical element, the above problems become remarkable.

SUMMARY OF THE INVENTION

The present invention is provided, with considering the above problems, to achieve at least one of the following objects. The present invention provides an optical pickup apparatus, an objective optical element, and an optical information recording reproducing apparatus which can properly conducts recording and/or reproducing information for three kinds of optical disks having different recording densities such as a high density optical disk, DVD and CD, even when using as the objective optical element, and which is capable of simplifying the structure and reducing the cost. In addition, the present invention provides an optical pickup apparatus, an objective optical element, and an optical information recording reproducing apparatus which can maintain accuracy of the tracking operation for all three different optical disks, even when using an infinite optical system. The present invention provides an optical pickup apparatus, an objective optical element, and an optical information recording reproducing apparatus which can provide excellent temperature characteristics and can properly conducts recording and/or reproducing information for the three kinds of disks, even when using a plastic lens for the objective optical element. The present invention provides an optical pickup apparatus, an objective optical element, and an optical information recording reproducing apparatus which provides desired optical characteristics and which can be easily manufactured without using minute structures.

According to various embodiments, the present teachings can provide an optical pickup apparatus for recording and/or reproducing information for an optical disk, an objective optical element for use in the optical pickup apparatus and an optical information recording reproducing apparatus employing the optical pickup apparatus. The optical pickup apparatus comprises: a first light source for emitting a first light flux having a first wavelength λ1; a second light source for emitting a second light flux having a second wavelength λ2 (λ2>λ1); a third light source for emitting a third light flux having a third wavelength λ3 (λ3>λ2); and an objective optical element. The objective optical element can be provided for converging the first light flux onto an information recording surface of a first optical disk having a protective substrate with a thickness t1, for converging the second light flux onto an information recording surface of a second optical disk having a protective substrate with a thickness t2 (t1≦t2), and for converging the third light flux onto an information recording surface of a third optical disk having a protective substrate with a thickness t3 (t2<t3). The optical pickup apparatus can record and/or reproduce information by converging the first light flux onto the information recording surface of the first optical disk, by converging the second light flux onto the information recording surface of the second optical disk, and by converging the third light flux onto the information recording surface of the third optical disk. The objective optical element comprises an optical surface including at least two areas which are a central area and a peripheral area surrounding the central area. The central area comprises a first optical path difference providing structure. The peripheral area comprises a second optical path difference providing structure. The objective optical element can converge the first light flux which passes through the central area of the objective optical element onto the information recording surface of the first optical disk so that the optical pickup apparatus can record and/or reproduce information on the information recording surface of the first optical disk. The objective optical element can converge the second light flux which passes through the central area of the objective optical element onto the information recording surface of the second optical disk so that the optical pickup apparatus can record and/or reproduce information on the information recording surface of the second optical disk. The objective optical element can converge the third light flux which passes through the central area of the objective optical element onto the information recording surface of the third optical disk so that the optical pickup apparatus can record and/or reproduce information on the information recording surface of the third optical disk. The objective optical element can converge the first light flux which passes through the peripheral area of the objective optical element onto the information recording surface of the first optical disk so that the optical pickup apparatus can record and/or reproduce information on the information recording surface of the first optical disk. The objective optical element can the second light flux which passes through the peripheral area of the objective optical element onto the information recording surface of the second optical disk so that the optical pickup apparatus can record and/or reproduce information on the information recording surface of the second optical disk. The optical pickup apparatus can satisfy following expressions:

$$+0.00045(WFE\lambda \text{rms}/(°C. \cdot mm)) > \delta SAT1/f \leq +0.0027 (WFE\lambda \text{rms}/(°C. \cdot mm)), \text{ and}$$

$$-0.045(WFE\lambda \text{rms}/(nm \cdot mm)) \leq \delta SA\lambda/f \leq -0.0045 (WFE\lambda \text{rms}/(nm \cdot mm)),$$

where $\delta SAT1$ represents $\delta SA3/\delta T$ of the objective optical element for a using light wavelength which does not change with a temperature change, in case that information is recorded and/or reproduced for the first optical disk, in other words, $\delta SAT1$ is a ratio of a change in a third spherical aberration of the objective optical element with a temperature change for a using light wavelength which does not change with a temperature change, in case that information is recorded and/or reproduced for the first optical disk, and $\delta SA\lambda$ represents $\delta SA3/\delta \lambda$ of the objective optical element for a using light wavelength, in case that information is recorded and/or reproduced for the first optical disk, in other words, $\delta SA\lambda$ is a ratio of a change in a third spherical aberration of the objective optical element with a wavelength change for an using light wavelength, in case that information is recorded and/or reproduced for the first optical disk, and f is a focal length of the objective optical element for the first light flux.

The present teachings can also provide an optical pickup apparatus for recording and/or reproducing information for an optical disk, comprising: a first light source for emitting a first light flux having a first wavelength λ1; a second light source for emitting a second light flux having a second wavelength λ2 (λ2>λ1); a third light source for emitting a third light flux having a third wavelength λ3 (λ3>λ2); and an objective optical element. The objective optical element can be provided for converging the first light flux onto an information recording surface of a first optical disk having a protective substrate with a thickness t1, for converging the second light flux onto an information recording surface of a second optical disk having a protective substrate with a thickness t2 (t1≦t2), and for converging the third light flux onto an information recording surface of a third optical disk having a protective substrate with a thickness t3 (t2<t3). The optical pickup apparatus can record and/or reproduce information by converging the first light flux onto the information recording surface of the first optical disk, by converging the second light flux onto the information recording surface of the second optical disk, and by converging the third light flux onto the information recording surface of the third optical disk. The objective optical element can comprise an optical surface comprising at least two areas which are a central area and a peripheral area surrounding the central area. The central area can comprise a first optical path difference providing structure, and the peripheral area can comprise a second optical path difference providing structure. The objective optical element can converge the first light flux which passes through the central area of the objective optical element onto the information recording surface of the first optical disk so that the optical pickup apparatus can record and/or reproduce information on the information recording surface of the first optical disk. The objective optical element can converge the second light flux which passes through the central area of the objective optical element onto the information recording surface of the second optical disk so that the optical pickup apparatus can record and/or reproduce information on the information recording surface of the second optical disk. The objective optical element can converge the third light flux which passes through the central area of the objective optical element onto the information recording surface of the third optical disk so that the optical pickup apparatus can record and/or reproduce information on the information recording surface of the third optical disk. The objective optical element can converge the first light flux which passes through the peripheral area of the objective optical element onto the information recording surface of the first optical disk so that the optical pickup apparatus can record and/or reproduce information on the information recording surface of the first optical disk. The objective optical element can converge the second light flux which passes through the peripheral area of the objective optical element onto the information recording surface of the second optical disk so that the optical pickup apparatus can record and/or reproduce information on the information recording surface of the second optical disk. The optical pickup apparatus can have a wavelength dependency of a spherical aberration so as to correct a change in a spherical aberration due to a refractive index change with a temperature change of the objective optical element by a change of the first wavelength due to the temperature change.

The present teachings can also provide an optical pickup apparatus for recording and/or reproducing information for an optical disk, comprising: a first light source for emitting a first light flux having a first wavelength $\lambda 1$ (350 nm $\leq \lambda 1 \leq$ 440 nm); and an objective optical element. The objective optical element can be provided for converging the first light flux onto an information recording surface of a first optical disk having a protective substrate with a thickness t1 (0.0750 mm $\leq$ t1 $\leq$ 0.125 mm). The optical pickup apparatus can record and/or reproduce information by converging the first light flux onto the information recording surface of the first optical disk. The optical pickup apparatus can satisfy the following expressions:

$$+0.00045(WFE\lambda rms/(°C \cdot mm)) \leq \delta SAT1/f \leq +0.0027 (WFE\lambda rms/(°C \cdot mm)), \text{ and}$$

$$-0.045(WFE\lambda rms/(nm \cdot mm)) \leq \delta SA\lambda/f \leq -0.0045 (WFE\lambda rms/(nm \cdot mm)),$$

where $\delta SAT1$ represents $\delta SA3/\delta T$ of the objective optical element for a using light wavelength which does not change with a temperature change, in case that information is recorded and/or reproduced for the first optical disk, in other words, $\delta SAT1$ is a ratio of a change in a third spherical aberration of the objective optical element with a temperature change for a using light wavelength which does not change with a temperature change, in case that information is recorded and/or reproduced for the first optical disk, and $\delta SA\lambda$ represents $\delta SA3/\delta \lambda$ of the objective optical element for a using light wavelength, in case that information is recorded and/or reproduced for the first optical disk, in other words, $\delta SA\lambda$ is a ratio of a change in a third spherical aberration of the objective optical element with a wavelength change for an using light wavelength, in case that information is recorded and/or reproduced for the first optical disk, and f is a focal length of the objective optical element for the first light flux.

The above embodiments allow that one objective optical element to properly record and/or reproduce information for three different disks (for example, a high density optical disk using a blue-violet laser light source, DVD, and CD) with employing a simple and low-cost configuration. Further, the above embodiment allows to provide an optical pickup apparatus, an objective optical element, and an optical information recording reproducing apparatus which can maintain accuracy of the tracking operation for all three different optical disks, even when using an infinite optical system. The above embodiment further allows to provide an optical pickup apparatus, an objective optical element, and an optical information recording reproducing apparatus which properly record and/or reproduce information for three different disks with using a single objective optical element. The above embodiment further allow to provide an optical pickup apparatus, an objective optical element, and an optical information recording reproducing apparatus which provide excellent temperature characteristics and properly record and/or reproduce information for three different disks with using a single objective optical element, even when employing a plastic lens.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE PREFERRED EMBODIMENT

Figure 1:
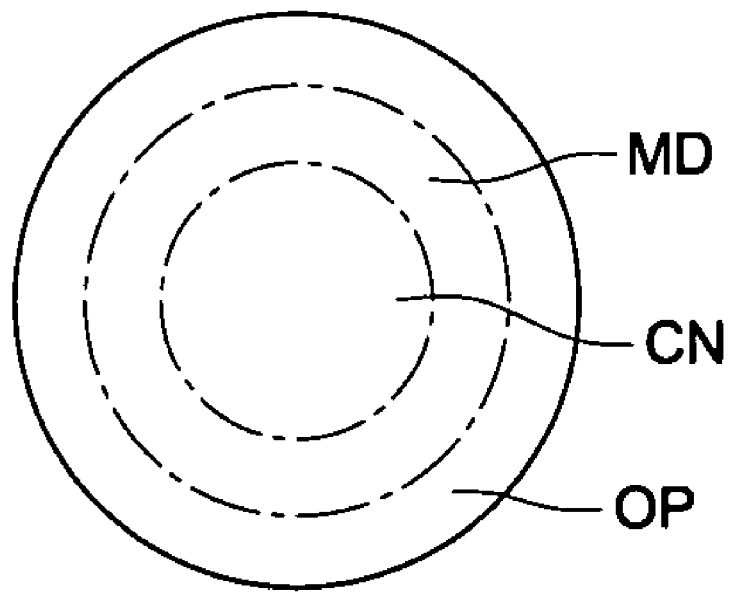
FIG. 1 is a diagram showing an example of objective optical element OBJ according to the present invention viewed from the optical axis direction.

An optical pickup apparatus according to the present invention comprises at least three light sources: a first light source, a second light source, and a third light source. The optical pickup apparatus further comprises a light converging optical system for converging the first light flux on the information recording surface of the first optical disk, converging the second light flux on the information recording surface of the second optical disk, and converging the third light flux on the information recording surface of the third optical disk. The optical pickup apparatus according to the present invention further comprises a light receiving element for receiving each of reflection light fluxes from the information recording surface of the first optical disk, the second optical disk, or the third optical disk.

The first optical disk comprises a protective substrate with a thickness of t1 and an information recording surface. The second optical disk comprises a protective substrate with a thickness of t2 (t1≦t2) and an information recording surface. The third optical disk comprises a protective substrate of a thickness of t3 (t2≦t3) and an information recording surface. It is preferable that the first optical disk is a high density optical disk, the second optical disk is DVD, and the third optical disk is CD, however, optical disks are not limited to those. Further, in the case where t1<t2, as compared to the case where t1=t2, it is more difficult to record and/or reproduce information for three different optical disks by an objective optical element being a single lens, with providing excellent tracking characteristics at the time of recording and/or reproducing information for the third optical disk. However, an embodiment according to the present invention can conduct that. Hereupon, the first optical disk, the second optical disk or the third optical disk may also be an optical disk of the plurality of layers having the plurality of the information recording surfaces.

As an example of the high density optical disk in the present specification, there is cited an optical disk (for example, BD: Blue-ray Disc) based on the standard that information is recorded and/or reproduced by an objective optical element with NA 0.85, and that a protective substrate of the optical disk is about 0.1 mm. Further, as an example of another high density optical disk, there is cited an optical disk (for example, HD DVD: it also called HD) based on the standard that information is recorded and/or reproduced by an objective optical element with NA in the range of 0.65 to 0.67 and the protective substrate of the optical disk is about 0.6 mm. Further, the high density optical disk includes an optical disk having a protective film (in the present specification, the protective substrate includes also the protective film), having a thickness of about several to several ten nm on the information recording surface, or an optical disk whose protective substrate thickness is 0 (zero). The high density optical disk further includes a photo-magnetic disk for which the blue-violet semiconductor laser or blue-violet SHG laser is used as the light source for recording/reproducing information. Further, DVD in the present specification represents a generic name of optical disks based on the standard that information is recorded and/or reproduced by an objective optical element with NA in the range of 0.60 to 0.67 and that the protective substrate of the optical disc is about 0.6 mm, which belong to DVD group such as DVD-ROM, DVD-Video, DVD-Audio, DVD-RAM, DVD-R, DVD-RW, DVD+R and DVD+RW. In the present specification, CD represents a generic name of optical disks based on the standard that information is recorded and/or reproduced by an objective optical element with NA in the range of 0.45 to 0.51 and that the protective substrate of the optical disc is about 1.2 mm, which belong to CD group such as CD-ROM, CD-Audio, CD-Video, CD-R and CD-RW. Among these optical disks, the high density optical disk provides the highest recording density. DVD and CD provide the second highest recording density, the third highest recording density, respectively.

Thicknesses t1, t2, and t3 of the protective substrates preferably satisfy the following conditional expressions (6), (7), and (8). However, it is to be understood that various changes and modifications will be apparent to those skilled in the art.

$$0.0750 \text{ mm} \leq t1 \leq 0.125 \text{ mm or } 0.5 \text{ mm} \leq t1 \leq 0.7 \text{ mm} \tag{6}$$

$$0.5 \text{ mm} \leq t2 \leq 0.7 \text{ mm} \tag{7}$$

$$1.0 \text{ mm} \leq t3 \leq 1.3 \text{ mm} \tag{8}$$

In the present specification, each of the first light source, the second light source, and the third light source is preferably a laser light source. A semiconductor laser, and a silicon laser are preferably used for the laser light source. The first wavelength $\lambda 1$ of the first light flux emitted from the first light source, the second wavelength $\lambda 2$ ($\lambda 2 > \lambda 1$) of the second light flux emitted from the second light source, the third wavelength $\lambda 3$ ($\lambda 3 > \lambda 2$) of the third light flux emitted from the third light source, are preferable to satisfy the following conditional expressions (9) and (10).

$$1.5 \times \lambda 1 < \lambda 2 < 1.7 \times \lambda 1 \tag{9}$$

$$1.9 \times \lambda 1 < \lambda 3 < 2.1 \times \lambda 1 \tag{10}$$

When BD or HD is employed as the first optical disk, the wavelength $\lambda 1$ of the first light source is preferably 350 nm or more, and 440 nm or less. The wavelength $\lambda 1$ is more preferably 380 nm or more, and 415 nm or less. When DVD is employed as the second optical disk, the second wavelength $\lambda 2$ of the second light source is preferably 570 nm or more, and 680 nm or less. The second wavelength $\lambda 2$ is more preferably 630 nm or more, and 670 nm or less. When CD is employed for the third optical disk, the third wavelength $\lambda 3$ of the third light source is preferably 750 nm or more, and 880 nm or less. The third wavelength $\lambda 3$ is more preferably 760 nm or more, and 820 nm or less.

Further, at least two light sources of the first light source, the second light source, and the third light source may also be unitized. The unitization means fixing and housing, for example, the first light source and the second light source into one package. However it is to be understood that various changes and modifications will be apparent to those skilled in the art. The unitization in a broad sense includes a situation that two light sources are fixed so that aberration can not be corrected. Further, in addition to the light source, the light receiving element which will be described later, may also be provided as one package.

As the light receiving element, the light detector such as a photo diode is preferably used. The light reflected on the information recording surface of the optical disk enters into the light receiving element, and signal outputted from the light receiving element is used for obtaining the read signal of the information recorded in each optical disk. Further, the light amount of the spot on the light receiving element caused with the change in the spot shape and the change in the spot position, to conduct the focus detection and the tracking detection focus detection. The objective optical element is moved based on these detections for focusing and tracking of the objective optical element. The light receiving element may be composed of a plurality of light detectors. The light receiving element may also have a main light detector and secondary light detector. For example, the light receiving element is provided with a main light detector which receives the main light used for recording and/or reproducing information, and two secondary light detectors positioned on both sides of the main light detector, so as to receive secondary light for tracking adjustment by the two secondary light detectors. Further, the light receiving element may also comprise a plurality of light receiving elements corresponding to each light source.

The light converging optical system comprises the objective optical element. The light converging optical system may comprise only an objective optical element, however, the light converging optical system may also have a coupling lens such as a collimator lens other than the objective optical element. The coupling lens is arranged between the objective optical element and the light source and means a single lens or a lens group which changes divergent angle of a light flux. The collimator lens is a lens to collimate the light flux entered into the collimator lens. Further, the light converging optical system may also comprise an optical element such as the diffractive optical element which divides the light flux emitted from the light source into a main light flux used for recording reproducing information and two secondary light fluxes used for the tracking operation. In the present specification, the objective optical element means an optical system which is arranged to face the optical disk in the optical pickup apparatus, which has the function which converges the light flux emitted from the light source onto an information recording surface of the optical disk. Preferably, the objective optical element is an optical system which is arranged to face the optical disk in the optical pickup apparatus, and which has the function which converges the light flux emitted from the light source on the information recording surface of the optical disk, and further which is movable as one body in the direction of at least the optical axis by an actuator. The objective optical element may be formed of a plurality of lenses and/or optical elements. Alternatively, the objective optical element may be a single lens. Preferably, the objective lens is formed of a single lens. The objective optical element may also be a glass lens, a plastic lens or a hybrid lens in which an optical path difference providing structure is formed on the glass lens by using thermosetting resin. When the objective optical element has a plurality of lenses, a combination of a glass lens and a plastic lens can be used for the objective optical element. When the objective optical element has a plurality of lenses and/or optical elements, a combination of: an optical element in flat plate shape having an optical path difference providing structure; and an aspheric surface lens which may not have a optical path difference providing structure. The objective optical element comprises a refractive surface which is an aspheric surface. Further, the objective optical element preferably can have a base surface where the optical path difference providing structure is provided, which is an aspheric surface.

Further, when the objective optical element is a glass lens, a glass material used for the glass lens preferably has a glass transition point Tg of 400° C. or less. By using the glass material whose glass transition point Tg is 400° C. or less, the material can be molded at a comparatively low temperature. Therefore, the life of the metallic mold can be prolonged. As an example of the glass material whose glass transition point Tg is low, there are K-PG325 and K-PG375 (both are trade names) made by SUMITA Optical glass, Inc.

Hereupon, a glass lens has generally larger specific gravity than a resin lens. Therefore, the objective optical element made of a glass lens has larger weight and apply a larger burden to the actuator which drives the objective optical element. Therefore, when a glass lens is employed for the objective optical lens, a glass material having small specific gravity is preferably used for the objective optical element. Specifically, the specific gravity is preferably 3.0 or less, and is more preferably 2.8 or less.

Further, when a plastic lens is employed for the objective optical element, it is preferable that the resin material of cyclic olefins is used for the objective optical element. In the cyclic olefins, there is more preferably used the resin material having: refractive index at the temperature 25° C. for wavelength 405 nm, which is within the range of 1.54 to 1.60; and ratio of refractive index change dN/dT ($° C.^{-1}$) with the temperature change within the temperature range of −5° C. to 70° C. for the wavelength 405 nm, which is within the range of $-20 \times 10^{-5}$ to $-5 \times 10^{-5}$ (more preferably, $-10 \times 10^{-5}$ to $-8 \times 10^{-5}$). Further, when a plastic lens is employed for the objective optical element, it is preferable that a plastic lens is also employed for the coupling lens.

Alternatively, as the resin material appropriate to the objective optical element of the present invention, there is "athermal resin" also other than the cyclic olefins. "Athermal resin" is a resin material in which microparticles each having a diameter of 30 nm or less are dispersed into a resin which is a base material. The material of the microparticles has ratio of change in the refractive index with the temperature change, and the ratio of change in the refractive index of the microparticles has the opposite sign to that of the material of the resin which is the base material. Generally, when microparticles are mixed in the transparent resin material, light is scattered and the transmission factor is lowered. So, it is difficult to use as the optical material. However, it becomes clear that the microparticles whose size is smaller than the wavelength of the transmitting light flux prevent the scattering effectively.

Hereupon, the refractive index of the resin material is lowered when the temperature rises, while the refractive index of the inorganic microparticles is increased when the temperature rises. Accordingly, it is also well known to prevent the refractive index from changing by combining above nature of the microparticles and the base material so as to cancel them out each other. When the objective optical element according to the present invention employs the material such that the inorganic particles whose size is 30 nanometer or less, which is preferably 20 nanometer or less, more preferably 10-15 nanometer, are dispersed in the resin as base material, there can be provided the objective optical unit having no or very low temperature dependency of the refractive index.

For example, microparticles of niobium oxide ($Nb_2O_5$) are dispersed in acryl resin. The volume ratio of the resin material that represents the basic material is about 80% and that of niobium oxide is about 20%, and these are mixed uniformly. Though microparticles have a problem that they tend to condense, the necessary state of dispersion can be kept by a technology to disperse particles by giving electric charges to the surface of each particle.

It is preferable that microparticles are mixed and dispersed into the resin as a base material during injection molding of optical elements by the in-line manner. In other words, it is preferable that, after the microparticles are mixed and dispersed in to the base material, the mixture is neither cooled nor solidified until the mixture is molded into an objective optical unit.

Incidentally, in order to control the ratio of change in the refractive index with the temperature, the volume ratio of microparticles to the base material may increase or decrease, and microparticles in which a plural kinds of nanometer-sized microparticles are blended may also be dispersed into the base material.

Though the volume ratio of the microparticles and the base material is made to be 80:20, namely to be 4:1, in the example stated above, it is possible to adjust properly within a range from 90:10 (9:1) to 60:40 (3:2). It is preferable that a volume of the microparticles is provided to be exceed the ratio of 9:1, because the temperature-affected change is effectively reduced. While, it is also preferable that a volume of the microparticles is provided to be less than the ratio of 3:2, because moldability of the a thermal resin becomes easy.

It is preferable that the microparticles are inorganic substances, and more preferable that the microparticles are oxides. Further, it is preferable that the state of oxidation is saturated, and the oxides are not oxidized any more.

It is preferable that the microparticles are inorganic substances because reaction between the inorganic substances and resin as a base material representing high molecular organic compound is restrained to be low, and deterioration caused by actual use such as irradiation of laser beam can be prevented because the microparticles are oxides. In particular, under the severe conditions such as high temperature and irradiation of a laser beam, oxidation of resin tends to be accelerated. However, aforesaid microparticles of inorganic oxide are prevented from deterioration caused by oxidation.

Further, it is naturally possible to add antioxidants in resin material in order to prevent the resin from oxidation caused by other factors.

Materials described in JP-A 2004-144951, JP-A 2004-144953, JP-A 2004-144954 are suitable for a preferable material to be base material.

Inorganic microparticles to be dispersed in thermoplastic resin are not limited in particular, and suitable microparticles can be arbitrarily selected from inorganic microparticles which reduce the ratio (hereinafter, |dn/dT|) of change in refractive index with the temperature. To be concrete, oxide microparticles, metal salt microparticles and semiconductor microparticles are preferably used, and it is preferable to use by selecting properly those in which absorption, light emission and fluorescence are not generated in the wavelength range employed for an optical element, from the aforesaid microparticles.

The following metal oxide is used for oxide microparticles used in the structure according to the present invention: a metal oxide constructed by one or more kinds of metal selected by a group including Li, Na, Mg, Al, Si, K, Ca, Sc, Ti, V, Cr, Mn, Fe, Co, Ni, Cu, Zn, Rb, Sr, Y, Nb, Zr, Mo, Ag, Cd, In, Sn, Sb, Cs, Ba, La, Ta, Hf, W, Ir, Tl, Pb, Bi and rare earth metal. More specifically, for example, oxide such as silicon oxide, titanium oxide, zinc oxide, aluminum oxide, zirconium oxide, hafnium oxide, niobium oxide, tantalum oxide, magnesium oxide, calcium oxide, strontium oxide, barium oxide, indium oxide, tin oxide, lead oxide; complex oxide compounds these oxides such as lithium niobate, potassium niobate and lithium tantalate, the aluminum magnesium oxide ($MgAl_2O_4$) are cited. Furthermore, rare earth oxides are used for the oxide microparticles in the structure according to the present invention. More specifically, for example, scandium oxide, yttrium oxide, lanthanum trioxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide are cited. As metal salt microparticles, the carbonate, phosphate, sulfate, etc. are cited. More specifically, for example, calcium carbonate, aluminum phosphate are cited.

Moreover, semiconductor microparticles in the structure according to the present invention mean the microparticles constructed by a semiconducting crystal. The semiconducting crystal composition examples include simple substances of the 14th group elements in the periodic table such as carbon, silica, germanium and tin; simple substances of the 15th group elements in the periodic table such as phosphor (black phosphor); simple substances of the 16th group elements in the periodic table such as selenium and tellurium; compounds comprising a plural number of the 14th group elements in the periodic table such as silicon carbide (SiC); compounds of an element of the 14th group in the periodic table and an element of the 16th group in the periodic table such as tin oxide (IV) ($SnO_2$), tin sulfide (II, IV) (Sn(II)Sn(IV)$S_3$), tin sulfide (IV) ($SnS_2$), tin sulfide (II) (SnS), tin selenide (II) (SnSe), tin telluride (II) (SnTe), lead sulfide (II) (PbS), lead selenide (II) (PbSe) and lead telluride (II) (PbTe); compounds of an element of the 13th group in the periodic table and an element of the 15th group in the periodic table (or III-V group compound semiconductors) such as boron nitride (BN), boron phosphide (BP), boron arsenide (BAs), aluminum nitride (AlN), aluminum phosphide (AlP), aluminum arsenide (AlAs), aluminum antimonide (AlSb), gallium nitride (GaN), gallium phosphide (GaP), gallium arsenide (GaAs), gallium antimonide (GaSb), indium nitride (InN), indium phophide (InP), indium arsenide (InAs) and indium antimonide (InSb); compounds of an element of the 13th group in the periodic table and an element of the 16th group in the periodic table such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide ($In_2Se_3$) and indium telluride ($In_2Te_3$); compounds of an element of the 13th group in the periodic table and an element of the 16th group in the periodic table such as thallium chloride (I) (TlCl), thallium bromide (I) (TlBr), thallium iodide (I) (TlI); compounds of an element of the 12th group in the periodic table and an element of the 16th group in the periodic table (or II-VI group compound semiconductors) such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe) and mercury telluride (HgTe); compounds of an element of the 15th group in the periodic table and an element of the 16th group in the periodic table such as arsenic sulfide (III) ($As_2S_3$), arsenic selenide (III) ($As_2Se_3$), arsenic telluride (III) ($As_2Te_3$), antimony sulfide (III) ($Sb_2S_3$), antimony selenide (III) ($Sb_2Se_3$), antimony telluride (III) ($Sb_2Te_3$), bismuth sulfide (III) ($Bi_2S_3$), bismuth selenide (III) ($Bi_2Se_3$) and bismuth telluride (III) ($Bi_2Te_3$); compounds of an element of the 11th group in the periodic table and an element of the 16th group in the periodic table such as copper oxide (I) ($Cu_2O$) and copper selenide (I) ($Cu_2Se$); compounds of an element of the 11th group in the periodic table and an element of the 17th group in the periodic table such as copper chloride (I) (CuCl), copper bromide (I) (CuBr), copper iodide (I) (CuI), silver chloride (AgCl) and silver bromide (AgBr); compounds of an element of the 10th group in the periodic table and an element of the 16th group in the periodic table such as nickel oxide (II) (NiO); compounds of an element of the 9th group in the periodic table and an element of the 16th group in the periodic table such as cobalt oxide (II) (CoO) and cobalt sulfide (II) (CoS); compounds of an element of the 8th group in the periodic table and an element of the 16th group in the periodic table such as triiron tetraoxide ($Fe_3O_4$) and iron sulfide (II) (FeS); compounds of an element of the 7th group in the periodic table and an element of the 16th group in the periodic table such as manganese oxide (II) (MnO); compounds of an element of the 6th group in the periodic table and an element of the 16th group in the periodic table such as molybdenum sulfide (IV) ($MoS_2$) and tungsten oxide(IV) ($WO_2$); compounds of an element of the 5th group in the periodic table and an element of the 16th group in the periodic table such as vanadium oxide (II) (VO), vanadium oxide (IV) ($VO_2$) and tantalum oxide (V) ($Ta_2O_5$); compounds of an element of the 4th group in the periodic table and an element of the 16th group in the periodic table such as titanium oxide (such as $TiO_2$, $Ti_2O_5$, $Ti_2O_3$ and $Ti_5O_9$); compounds of an element of the 2th group in the periodic table and an element of the 16th group in the periodic table such as magnesium sulfide (MgS) and magnesium selenide (MgSe); chalcogen spinels such as cadmium oxide (II) chromium (III) ($CdCr_2O_4$), cadmium selenide (II) chromium (III) ($CdCr_2Se_4$), copper sulfide (II) chromium (III) ($CuCr_2S_4$) and mercury selenide (II) chromium (III) ($HgCr_2Se_4$); and barium titanate ($BaTiO_3$). Further, semiconductor clusters structures of which are established such as $BN_{75}(BF_2)_{15}F_{15}$, described in Adv. Mater., vol. 4, p. 494 (1991) by G. Schmid, et al.; and $Cu_{146}Se_{73}$(triethylphosphine)$_{22}$ described in Angew. Chem. Int. Ed. Engl., vol. 29, p. 1452 (1990) by D. Fenske are also listed as examples.

In general, dn/dT of thermoplastic resin has a negative value, namely, a refractive index becomes smaller as the temperature rises. Therefore, it is preferable to disperse microparticles having large dn/dT, in order to make |dn/dT| of thermoplastic resin composition to be efficiently small. It is preferable that the absolute value of dn/dT of the microparticles is smaller than that of the thermoplastic resin used as a base material when using microparticles having dn/dT with same sign to the sign of dn/dT of the thermoplastic resin. Furthermore, microparticles having positive dn/dT, which is microparticles having different sign of dn/dT from that of the thermoplastic resin which is a base material, are preferably used. By dispersing these kinds of microparticles into the thermoplastic resin, |dn/dT| of thermoplastic resin composition can effectively become small with less amount of the microparticles. It is possible to properly select dn/dT of microparticles to be dispersed corresponding to a value of dn/dT of thermoplastic resin to become a base material. However, it is preferable that dn/dT of microparticles is greater than $-20 \times 10^{-6}$ and it is more preferable that dn/dT of microparticles is greater than $-10 \times 10^{-6}$ when microparticles are dispersed into a thermoplastic resin which is preferably employed to a general optical element. As microparticles having large dn/dT, gallium nitride, zinc sulfate, zinc oxide, lithium niobate and lithium tantalite, for example, are preferably used.

On the other hand, when dispersing microparticles in thermoplastic resin, it is preferable that a difference of refractive index between the thermoplastic resin to become a base material and the microparticles is small. Scattering is hardly caused when light is transmitted, if a difference of refractive index between the thermoplastic resin and the microparticles to be dispersed is small. In case of dispersing microparticles in the thermoplastic resin, microparticles in larger size easily cause scattering when light flux transmits the material. However, in a material in which a difference of refractive index between the thermoplastic resin and the microparticles to be dispersed is small, an occurrence of light scattering becomes low even when relatively large-sized microparticles are used. A difference of refractive index between the thermoplastic resin and the microparticles to be dispersed is preferably within the range of 0-0.3, and more preferably within the range of 0-0.15.

Refractive indexes of thermoplastic resins preferably used as optical materials are in the range about 1.4-1.6 in many cases. As materials to be dispersed in these thermoplastic resins, silica (silicon oxide), calcium carbonate, aluminum phosphate, aluminum oxide, magnesium oxide, and aluminum•magnesium oxides, for example, are preferably used.

Further, dn/dT of thermoplastic resin composition can be made small effectively, by dispersing microparticles whose refractive index is relatively low. As a reason why |dn/dT| of thermoplastic resin composition including dispersed microparticles with low refractive index becomes small, it is considered that temperature changes of the volume fraction of inorganic microparticles in the resin composition may work to make the |dn/dT| of the resin composition to become smaller when the refractive index of the microparticles is lower, although the details are not clarified. As microparticles having a relatively low refractive index, silica (silicon oxide), calcium carbonate and aluminum phosphate, for example, are preferably used.

It is difficult to simultaneously achieve all of improving an effect of lowering dn/dT of the thermoplastic resin composition, improving of light transmittance and a desired refractive index. Therefore, microparticles to be dispersed in the thermoplastic resin can be selected properly by considering a magnitude of dn/dT of a microparticle itself, a difference of dn/dT between microparticles and the thermoplastic resin to become a base material, and the refractive index of the microparticles, depending on the characteristics which are required for the thermoplastic resin composition. Further, it is preferable, for maintaining light transmittance, to properly select microparticles which hardly cause light scattering with considering its affinity with the thermoplastic resin to become a base material, in other words, characteristics of the microparticles in dispersion for the thermoplastic resin.

For example, when using cyclic olefin polymer preferably employed for an optical element as a base material, silica is preferably used as microparticles which make |dn/dT| small while keeping light transmittance.

For the microparticles mentioned above, it is possible to use either one type of inorganic microparticles or plural types of inorganic microparticles in combination. By using plural types of microparticles each having a different characteristic, the required characteristics can further be improved efficiently.

Inorganic microparticles relating to the present invention preferably has an average particle size being 1 nm or larger and being 30 nm or smaller and more preferably has an average particle size being 1 nm or more and being 10 nm or less. When the average particle size is less than 1 nm, dispersion of the inorganic microparticles is difficult, resulting in a fear that the required efficiency may not be obtained, therefore, it is preferable that the average particle size is 1 nm or more. When the average particle size exceeds 30 nm, thermoplastic material composition obtained becomes muddy and transparency is lowered, resulting in a fear that the light transmittance may become less than 70%, therefore, it is preferable that the average particle size is 30 nm or less. The average particle size mentioned here means volume average value of a diameter (particle size in conversion to sphere) in conversion from each particle into a sphere having the same volume as that of the particle.

Further, a form of an inorganic microparticle is not limited in particular, but a spherical microparticle is used preferably. To be concrete, a range of 0.5-1.0 for the ratio of the minimum size of the particle (minimum value of the distance between opposing two tangents each touching the outer circumference of the microparticle)/the maximum size (maximum value of the distance between opposing two tangents each touching the outer circumference of the microparticle) is preferable, and a range of 0.7-1.0 is more preferable.

A distribution of particle sizes is not limited in particular, but a relatively narrow distribution is used suitably, rather than a broad distribution, for making the invention to exhibit its effect efficiently.

The objective optical element will be described below. At least one optical surface of the objective optical element comprises a central area and a peripheral area around the central area. More preferably, at least one optical surface of the objective optical element further includes a most peripheral area around the peripheral area. By providing the most peripheral area, it allows to more appropriately record and/or reproduce information for the optical disk using the high NA. The central area preferably is an area having the optical axis of the objective optical element, however, it may also be the area not including the optical axis. It is preferable that the central area, peripheral area, and most peripheral area are provided on the same optical surface. As shown in FIG. 1, it is preferable that the central area CN, peripheral area MD, most peripheral area OT are provided on the same optical surface concentrically around the optical axis. Further, the first optical path difference providing structure is provided in the central area of the objective optical element. The second optical path difference providing structure is provided in the peripheral area. When the most peripheral area is provided, the most peripheral area may be a refractive surface, or the third optical path difference providing structure may be provided in the most peripheral area. It is preferable that each of the central area, peripheral area, most peripheral area adjoins to the neighboring area, however, there may be slight gaps between adjoining areas.

The area where the first optical path difference providing structure is provided is preferably 70% or more of the area of the central area on the objective optical element. It is more preferably 90% or more of the area of the central area. The first optical path difference providing structure is furthermore preferably provided on the entire surface of the central area. The area where the second optical path difference providing structure is provided is preferably 70% or more of the peripheral area on the objective optical element. It is more preferably 90% or more of the area of the peripheral area. The second optical path difference providing structure is further more preferably provided on the entire surface of the peripheral area. The area where the third optical path difference providing structure is provided, is 70% or more of the area of the most peripheral area on the objective optical element. It is more preferably 90% or more of the area of the most peripheral area. The third optical path difference providing structure is more preferably provided on the entire surface of the most peripheral area.

Hereupon, the optical path difference providing structure used in the present specification, is the general name of the structure by which an optical path difference is provided to an incident light flux. The optical path difference providing structure also includes the phase difference providing structure by which the phase difference is provided. Further, the phase difference providing structure includes a diffractive structure. The optical path difference providing structure has a step, preferably, has a plurality of steps. This step provides an optical path difference and/or phase difference to an incident light flux. The optical path difference added by the optical path difference providing structure may also be an integer times of the wavelength of the incident light flux, or may also be non-integer times of the wavelength of the incident light flux. The step may also be arranged with periodic interval in the direction perpendicular to the optical axis, or may also be arranged with non-periodic interval in the direction perpendicular to the optical axis.

Figure 2A:
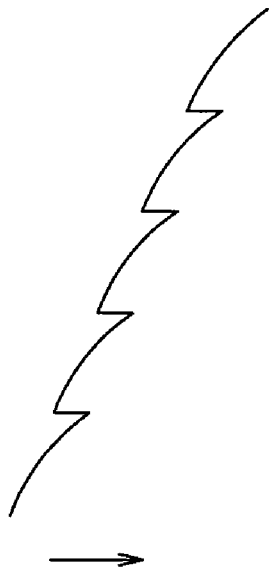
FIGS. 2(a)-2(d) are sectional views typically showing several examples of the optical path difference providing structure provided in objective optical element OBJ according to the present invention.
Figure 2B:
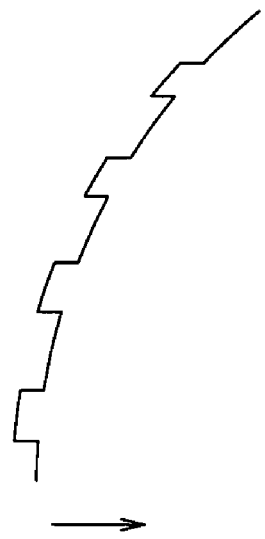
Figure 2C:
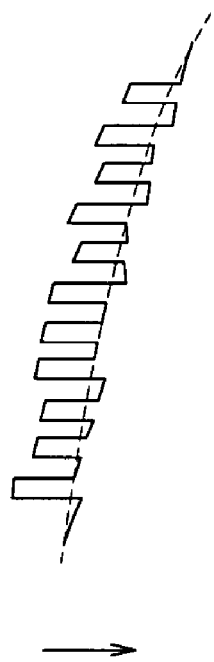
Figure 2D:
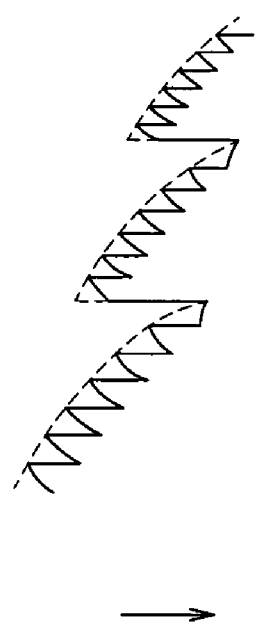

It is preferable that the optical path difference providing structure has a plurality of ring-shaped zones arranged concentrically around the optical axis. Further, the optical path difference providing structure can have various sectional shapes (cross sectional shapes in the plane including the optical axis). One of the most common optical path difference providing structure provides the sectional shape including the optical axis, which is in the serrated shape, as shows in FIG. 2(a). Even when the cross sectional shape of the optical path difference providing structure arranged on the flat plane looks a stepped shape, the same optical path difference providing structure arranged on an aspheric surface can be considered as the serrated shape shown in FIG. 2(a). Accordingly, in the present specification, it is defined that the sectional shape in the serrated shape includes the sectional shape in the stepped shape. Further, when the serrated shaped optical path difference providing structures whose step extend to the different directions, overlap with each other, there is provided the binary structured optical path difference providing structure as shown in FIG. 2(b). Each of the first optical path difference providing structure and the second optical path difference providing structure of the present specification, may have a sectional shape which is formed by overlapping different optical path difference providing structures having serrated shape, or may have a sectional shape which is formed by further overlapping a serrated shaped optical path difference providing structure with a binary structured optical path difference providing structure formed by overlapping serrated optical path difference providing structures. For example, FIG. 2(c) shows the structure in which the serrated shaped optical path difference providing structure and the binary structured optical path difference providing structure overlap with each other, and FIG. 2(d) shows the structure in which the fine serrated shaped optical path difference providing structure and the rough serrated optical path difference providing structure overlap with each other.

Further, the first optical path difference providing structure provided in the central area of the objective optical element and the second optical path difference providing structure provided in the peripheral area of the objective optical element may be provided on the different optical surface of the objective optical element. However, it is preferable that the first and second optical path difference providing structures are provided on the same optical surface. By providing them on the same optical surface, it reduces the decentration error at the time of the manufacture, which is preferable. Further, it is preferable that the first optical path difference providing structure and the second optical path difference providing structure are provided on the surface on the light source side of the objective optical element, rather than the surface on the optical disk side of the objective optical element.

The objective optical element converges the first light flux, the second light flux, and the third light flux each passing through the central area of the objective lens, where the first optical path difference providing structure is provided, so as to form a light converged spot for each light flux. Preferably, the objective optical element converges the first light flux passing through the central area of the objective optical element where the first optical path difference providing structure is provided onto the information recording surface of he first optical disk, so that information can be recorded and/or reproduced for the first optical disk. Preferably, the objective optical element converges the second light flux passing the central area of the objective optical element where the first optical path difference providing structure is provided onto the information recording surface of the second optical disk, so that information can be recorded and/or reproduced for the second optical disk. Preferably, the objective optical element converges the third light flux passing the central area of the objective optical element where the first optical path difference providing structure is provided onto the information recording surface of the third optical disk, so that information can be recorded and/or reproduced for the third optical disk. Further, when the thickness t1 of the protective substrate of the first optical disk and the thickness t2 of the protective substrate of the second optical disk are different, the first optical path difference providing structure preferably corrects the spherical aberration caused due to the difference between the thickness t1 of the protective substrate of the first optical disk and the thickness t2 of the protective substrate of the second optical disk and/or the spherical aberration caused due to the difference of the wavelength of the first light flux and the second light flux, for the first light flux and the second light flux passing through the first optical path difference providing structure. Furthermore, the first optical path difference providing structure preferably corrects the spherical aberration caused due to the difference between the thickness t1 of the protective substrate of the first optical disk and the thickness t3 of the protective substrate of the third optical disk and/or the spherical aberration caused due to the difference of the wavelength of the first light flux and the third light flux, for the first light flux and the third light flux passing through the first optical path difference providing structure.

Further, the third light flux passing through the first optical path difference providing structure of the objective optical element, forms a first best focus in which the third light flux forms a spot having the smallest diameter, and a second best focus, in which the third light flux forms a spot having the second smallest diameter. Hereupon, the best focus used herein means a position where the beam waist is minimized within the predetermined defocus range. That is, the case that the third light flux forms the first best focus and the second best focus means that the beam waist in the third light flux is minimized within the predetermined defocus range on at least two positions. Hereupon, the first best focus is preferably formed by a diffracted light flux with a maximum light amount in the third light flux passing through the first optical path difference providing structure. The second best focus is preferably formed by a diffracted light flux with a second maximum light amount in the third light flux passing through the first optical path difference providing structure. When the difference between the diffraction efficiency of the diffracted light flux which forms the first best focus and the diffraction efficiency of the diffracted light flux which forms the second best focus, is 20% or less, the effect of the present invention becomes more conspicuous.

Hereupon, it is preferable that the spot formed by the third light flux in the first best focus is used for recording and/or reproducing information for the third optical disk, and that the spot formed by the third light flux in the second best focus is not used for recording and/or reproducing information for the third optical disk. However, it does not denies an embodiment that the spot formed by the third light flux in the first best focus is not used for recording and/or reproducing information for the third optical disk, and that the spot formed by the third light flux in the second best focus is used for recording and/or reproducing information for the third optical disk. Hereupon, when the first optical path difference providing structure is provided on the surface on the light source side of the objective optical element, the second best focus is preferably nearer to the objective optical element, than the first best focus.

Further, the first best focus and the second best focus satisfy the following expression (1).

$$0.05 \leq L/f \leq 0.35 \tag{1}$$

Where, f (mm) indicates the focal length of the objective optical element for the third light flux which passes through the first optical path difference providing structure and forms the first best focus, and L (mm) indicates the distance between the first best focus and the second best focus.

The first best focus and the second best focus more preferably satisfy the following expression (1').

$$0.10 \leq L/f \leq 0.25 \tag{1'}$$

The first best focus and the second best focus further more preferably satisfy the following expression (1").

$$0.11 \leq L/f \leq 0.24 \tag{1"}$$

Further, it is preferable that L is 0.18 mm or more, and is 0.63 mm or less. Furthermore, it is preferable that f is 1.8 mm or more, and is 3.0 mm or less.

In case that the above expression (1) is satisfied, it allows to prevent the unused light which is a light not used for recording and/or reproducing information for the third optical disk, from affecting the light receiving element for the tracking operation, and enables to maintain the excellent tracking characteristics when information is recorded and/or reproduced for the third optical disk.

Further, the objective optical element converges the first light flux and the second light flux each passing through the peripheral area of the objective optical element, where the second optical path difference providing structure is provided, so as to form a light converged spot for each light flux. Preferably, the objective optical element converges the first light flux passing through the peripheral area of the objective optical element where the second optical path difference providing structure is provided onto the information recording surface of the first optical disk so that information can be recorded and/or reproduced for the first optical disk. Preferably, the objective optical element converges the second light flux passing through the peripheral area of the objective optical element where the second optical path difference providing structure is provided, onto the information recording surface of the second optical disk so that information can be recorded and/or reproduced for the second optical disk. Further, when the thickness t1 of the protective substrate of the first optical disk and the thickness t2 of the protective substrate of the second optical disk are different, the second optical path difference providing structure preferably corrects the spherical aberration caused due to the difference between the thickness t1 of the protective substrate of the first optical disk and the thickness t2 of the protective substrate of the second optical disk, and/or the spherical aberration caused due to the difference of the wavelength of the first light flux and the second light flux, for the first flux and the second light flux passing through the second optical path difference providing structure.

Figure 10:
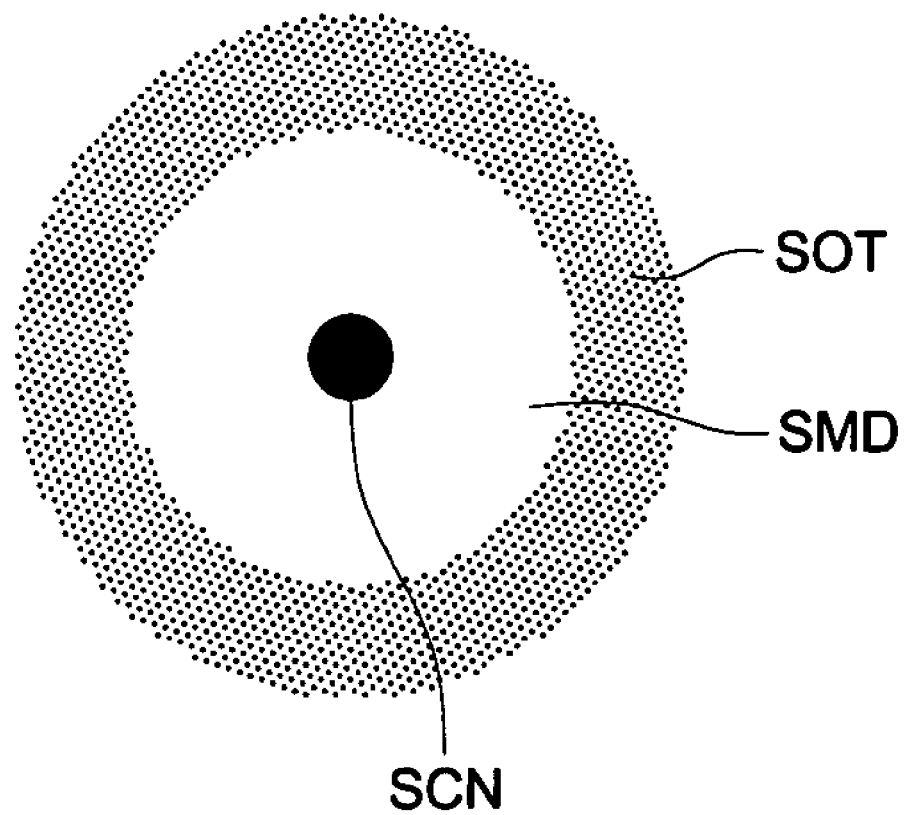
FIG. 10 is a view showing the shape of a spot according to the present invention.

Further, there is provided one preferable embodiment that the third light flux passing through the peripheral area is not used for recording and/or reproducing information for the third optical disk. In the embodiment, it is preferable that the third light flux passing through the peripheral area does not contribute to forming the light converged spot on the information recording surface of the third optical disk. In other words, it is preferable that the third light flux passing through the peripheral area comprising the second optical path difference providing structure of the objective optical element, forms flare on the information recording surface of the third optical disk. FIG. 10 shows the spot formed by the third light flux passing through the objective optical element on the information recording surface of the third optical disk. The spot shown in FIG. 10 comprises, in order from the optical axis side (or the central part of the spot) to the outside of the spot, the central spot portion SCN whose light density is high, the intermediate spot portion SMD whose light density is lower than the central spot portion, and the peripheral spot portion SOT whose light density is higher than the intermediate spot portion and lower than the central spot portion. The central spot portion is used for recording and/or reproducing information for an optical disk, and the intermediate spot portion and the peripheral spot portion are not used for recording and/or reproducing information for a optical disk. In the above description, this peripheral spot portion can be called flare. That is, the third light flux passing through the second optical path difference providing structure provided in the peripheral area of the objective optical element, forms the peripheral spot portion on the information recording surface of the third optical disk. Hereupon, it is preferable that the light converging spot or the spot of the third light flux in the above is a spot in the first best focus. Further, it is preferable that the second light flux passing through the objective optical element, forms a spot on the information recording surface of the second optical disk, which comprises a central spot portion, an intermediate spot portion, and a peripheral spot portion.

Further, it is preferable that the second optical path difference providing structure corrects the spherochromatism (chromatic spherical aberration) caused due to the slightly fluctuating wavelength of the first light source or the second light source. The slight fluctuation of the wavelength means the fluctuation within ±10 nm. For example, when the first light flux changes by ±5 nm from the wavelength $\lambda 1$, it is preferable that the second optical path difference providing structure corrects the fluctuation of the spherical aberration of the first light flux passing through the peripheral area and the amount of the fluctuation of the spherical aberration on the information recording surface of the first optical disk is 0.010$\lambda 1$ rms or more, and is 0.095 $\lambda 1$ rms or less. Further, when the second light flux changes by ±5 nm from the wavelength $\lambda 2$, it is preferable that the second optical path difference providing structure corrects the fluctuation of the spherical aberration of the second light flux passing through the peripheral area and the amount of the fluctuation of the spherical aberration on the information recording surface of the second optical disk is 0.002 $\lambda 2$ rms or more, and is 0.03 $\lambda 2$ rms or less. Therefore, the aberration due to the fluctuation of the wavelength by the manufacturing error of the wavelength of the laser diode which is a light source, or the individual difference of the laser diode can be corrected.

When the objective optical element comprises the most peripheral area, the objective optical element converges the first light flux passing through the most peripheral area of the objective optical element, onto the information recording surface of the first optical disk so that information can be recorded and/or reproduced for the first optical disk. Further, the spherical aberration in the first light flux passing through the most peripheral area, is preferably corrected when recording and/or reproducing information for the first optical disk is conducted.

Further, there is provided a preferable embodiment that the second light flux passing through the most peripheral area is not used for recording and/or reproducing information for the second optical disk, and that the third light flux passing through the most peripheral area is not used for recording and/or reproducing information for the third optical disk. In the embodiment, it is preferable that the second light flux and the third light flux each passing through the most peripheral area do not contribute to forming the light converged spots on respective information recording surface of the second optical disk and the third optical disk. That is, when the objective optical element comprises the most peripheral area, the third light flux passing through the most peripheral area of the objective optical element preferably forms flare on the information recording surface of the third optical disk. In other words, the third light flux passing through the most peripheral area of the objective optical element, preferably forms the peripheral spot portion on the information recording surface of the third optical disk. Further, when the objective optical element comprises the most peripheral area, the second light flux passing the most peripheral area of the objective optical element preferably forms flare on the information recording surface of the second optical disk. In other words, the second light flux which has passed through the most peripheral area on the objective optical element, preferably forms the peripheral spot portion on the information recording surface of the second optical disk.

When the most peripheral area comprises the third optical path difference providing structure, the third optical path difference providing structure may correct the sperochromatism (chromatic spherical aberration) caused due to the slightly fluctuated wavelength of the first light source. The slight fluctuation of the wavelength means a fluctuation within ±10 nm. For example, when the first light flux changes by ±5 nm from the wavelength $\lambda 1$, it is preferable that the third optical path difference providing structure corrects the fluctuation of the spherical aberration of the first light flux passing through the peripheral area and the amount of the fluctuation of the spherical aberration on the information recording surface of the first optical disk is 0.010 $\lambda 1$ rms or more, and is 0.095 $\lambda 1$ rms or less.

Hereupon, the first optical path difference providing structure may be the structure in which the serrated shaped diffractive structure and the binary structure overlap with each other. Further, the second optical path difference providing structure may be the structure in which the serrated shaped diffractive structure and the rougher (its pitch is larger) serrated shaped diffractive structure overlap with each other. When the first optical path difference providing structure is the overlapped structure, the serrated shaped diffractive structure may provide optical path difference corresponding to the even times of the first wavelength $\lambda 1$ of the first light flux, so as not to provide a change in a phase of the wavefront of the first light flux. When the second optical path difference providing structure is the overlapped structure, the finer serrated shaped diffractive structure (with smaller pitch) may provide optical path difference corresponding to the even times of the first wavelength $\lambda 1$ of the first light flux, so as not to provide a change in a phase of the wavefront of the first light flux. Further, when the third wavelength $\lambda 3$ of the third light flux is the wavelength which is about even times of the first wavelength of the first light flux, the integer times optical path difference is provided with the third light flux and it does not cause phase change in the wavefront of the third light flux. This structure provides an advantage that the above diffractive structure does not affect converging light spot of the first light flux and the third light flux. Hereupon, a value corresponding to the even times indicates a value which is (2n−0.1)×$\lambda 1$ or more, and is (2n+0.1)×$\lambda 1$ or less, where n is a natural number.

The first optical path difference providing structure may be the structure in which at least the first basic structure and the second basic structure overlap with each other.

The first basic structure is the optical path difference providing structure which emits a second-order diffracted light flux with a larger light amount than any diffracted light fluxes with the other diffraction order, when the first light flux passes through the first basic structure, which emits a first-order diffracted light flux with a larger light amount than any diffracted light fluxes with the other diffraction order, when the second light flux passes through the first basic structure, and which emits a first-order diffracted light flux with a larger light amount than any diffracted light fluxes with the other diffraction order, when the third light flux passes through the first basic structure. The first basic structure is preferably the optical path difference providing structure which emits the first light flux and the third light flux each of which passes through the first basic structure with their wavefront substantially being even, and which emits the second light flux which passes through the first basic structure with the wavefront substantially being uneven. Further the first basic structure is preferably the optical path difference providing structure which makes a diffraction angle of the second light flux passing through the first basic structure different from the diffraction angles of the first light flux and the third light flux each passing through the first basic structure. The step amount in the direction of the optical axis of the step in the first basic structure is preferably the step amount providing optical path difference which is about two times of the first wavelength for the first light flux, also providing optical path difference which is about 1.2 times of the second wavelength for the second light flux and further providing optical path difference which is about 1 time of the third wavelength for the third light flux.

Further, the second basic structure is the optical path difference providing structure which emits a 0-th-order diffracted light flux with a larger light amount than any diffracted light fluxes with the other diffraction order, when the first light flux passes through the second basic structure, which emits a 0-th-order diffracted light flux with a larger light amount than any diffracted light fluxes with the other diffraction order, when the second light flux passes through the second basic structure, and which emits a ±1st order diffracted light flux with a larger light amount than any diffracted light fluxes with the other diffraction order, when the third light flux passes through the second basic structure. The second basic structure is preferably the optical path difference providing structure which emits the first light flux and the second light flux each of which passes through the second basic structure with their wavefront substantially being even, and which emits the third light flux which passes through the second basic structure with the wavefront substantially being uneven. Further the second basic structure is preferably the optical path difference providing structure which makes a diffraction angle of the third light flux passing through the second basic structure different from the diffraction angles of the first light flux and the second light flux each passing through the second basic structure. The step amount in the direction of the optical axis of the step in the second basic structure is preferably the step amount providing optical path difference which is about five times of the first wavelength for the first light flux, also providing optical path difference which is about three times of the second wavelength for the second light flux and further providing optical path difference which is about 2.5 times of the third wavelength for the third light flux. Further, the shape of the second basic structure is preferably a binary structure shape as shown in FIG. 2(b) as an example.

Further, it is preferable that the second optical path difference providing structure is the structure which comprises any one structure selected from the group including at least the first basic structure, the fifth basic structure and the sixth basic structure. It is preferable that the second optical path difference providing structure is not the structure which overlaps two or more of the first basic structure, the fifth basic structure and the sixth basic structure. When the second optical path difference providing structure at least comprises the first basic structure, the second optical path difference providing structure has the same basic structure as the first optical path difference providing structure. Therefore, it makes the design work easy, which is preferable.

The fifth basic structure is the optical path difference providing structure which emits a first-order diffracted light flux with a larger light amount than any diffracted light fluxes with the other diffraction order, when the first light flux passes through the fifth basic structure, which emits a first-order diffracted light flux with a larger light amount than any diffracted light fluxes with the other diffraction order, when the second light flux passes through the fifth basic structure, and which emits a first-order diffracted light flux with a larger light amount than any diffracted light fluxes with the other diffraction order, when the third light flux passes through the first fifth structure. The step amount in the direction of the optical axis of the step in the fifth basic structure is preferably the step amount providing optical path difference which is about one time of the first wavelength for the first light flux, also providing optical path difference which is about 0.6 times of the second wavelength for the second light flux and further providing optical path difference which is about 0.5 times of the third wavelength for the third light flux.

The sixth basic structure is the optical path difference providing structure which emits a third-order diffracted light flux with a larger light amount than any diffracted light fluxes with the other diffraction order, when the first light flux passes through the sixth basic structure, which emits a second-order diffracted light flux with a larger light amount than any diffracted light fluxes with the other diffraction order, when the second light flux passes through the sixth basic structure, and which emits a second order diffracted light flux with a larger light amount than any diffracted light fluxes with the other diffraction order, when the third light flux passes through the sixth basic structure. The step amount in the direction of the optical axis of the step in the sixth basic structure is preferably the step amount providing optical path difference which is about three times of the first wavelength for the first light flux, also providing optical path difference which is about 1.9 times of the second wavelength for the second light flux and further providing optical path difference which is about 1.6 times of the third wavelength for the third light flux.

When the objective optical element is a plastic lens, it is preferable that the first optical path difference providing structure is triple overlapped structure in which three kinds of basic structures overlap with each other. More specifically, it is preferable that the triple basic structure is formed by overlapping the third basic structure, the fourth basic structure or the seventh basic structure with the first basic structure and the second basic structure. More preferably, the triple overlapped structure is formed by overlapping the third basic structure with the first basic structure and the second basic structure.

Hereupon, the third basic structure is the optical path difference providing structure which emits a tenth-order diffracted light flux with a larger light amount than any diffracted light fluxes with the other diffraction order, when the first light flux passes through the third basic structure, which emits a sixth-order diffracted light flux with a larger light amount than any diffracted light fluxes with the other diffraction order, when the second light flux passes through the third basic structure, and which emits a fifth-order diffracted light flux with a larger light amount than any diffracted light fluxes with the other diffraction order, when the third light flux passes through the third basic structure. The step amount in the direction of the optical axis of the step in the third basic structure is preferably the step amount providing optical path difference which is about ten times of the first wavelength for the first light flux, also providing optical path difference which is about six times of the second wavelength for the second light flux and further providing optical path difference which is about five times of the third wavelength for the third light flux. Further, the fourth basic structure is the optical path difference providing structure which emits a fifth-order diffracted light flux with a larger light amount than any diffracted light fluxes with the other diffraction order, when the first light flux passes through the fourth basic structure, which emits a third-order diffracted light flux with a larger light amount than any diffracted light fluxes with the other diffraction order, when the second light flux passes through the fourth basic structure, and which emits third and second order diffracted light fluxes each with a larger light amount than any diffracted light fluxes with the other diffraction order, when the third light flux passes through the fourth basic structure. It is preferable that the light amount of the third diffracted light flux is slightly larger than that of the second order diffracted light flux in the third light flux. The step amount in the direction of the optical axis of the step in the fourth basic structure is preferably the step amount providing optical path difference which is about five times of the first wavelength for the first light flux, also providing optical path difference which is about three times of the second wavelength for the second light flux and further providing optical path difference which is about 2.5 times of the third wavelength for the third light flux. Further, the seventh basic structure is the optical path difference providing structure which emits a second-order diffracted light flux with a larger light amount than any diffracted light fluxes with the other diffraction order, when the first light flux passes through the fourth basic structure, which emits a first-order diffracted light flux with a larger light amount than any diffracted light fluxes with the other diffraction order, when the second light flux passes through the fourth basic structure, and which emits first order diffracted light fluxes each with a larger light amount than any diffracted light fluxes with the other diffraction order, when the third light flux passes through the fourth basic structure. The step amount in the direction of the optical axis of the step in the seventh basic structure is preferably the step amount providing optical path difference which is about two times of the first wavelength for the first light flux, also providing optical path difference which is about 1.2 times of the second wavelength for the second light flux and further providing optical path difference which is about one time of the third wavelength for the third light flux. Further, the third basic structure, the fourth basic structure and the seventh basic structure have the function so as to make the spherical aberration under-corrected, when the temperature increases and the wavelength of the first light source, the second light source, and the third light source increases. Thereby, it can compensate the over-corrected spherical aberration caused with the refractive index lowering of the plastic at the time of temperature rise, and it allows to provide an excellent the spherical aberration. Hereupon, the depth of the step in the fourth basic structure and the seventh basic structure can be decreased as compared to that of the third basic structure. It is preferable that the third basic structure, the fourth basic structure and the seventh basic structure are provided on a basic surface (a basic aspheric surface) which is different from a basic surface (a basic aspheric surface) on which the first basic structure, the second basic structure, the fifth basic structure and the sixth basic structure are provided. Further, it is preferable that the third basic structure, the fourth basic structure and the seventh basic structure are provided on the basic surface which is designed so that the third basic structure, the fourth basic structure and the seventh basic structure does not influence as much as possible in the direction of the light flux incident to the objective optical element. Further it is preferable that the third basic structure, the fourth basic structure and the seventh basic structure are the structure in which the depth of the structure in the direction of the optical axis becomes deeper as farther from the optical axis in the direction perpendicular to the optical axis till one point, and then in the area farther from the optical axis than the one point, the depth of the structure in the direction of the optical axis becomes shallower as farther from the optical axis in the direction perpendicular to the optical axis.

Further, when the objective optical element is a plastic lens, it is preferable that the second optical path difference providing structure is formed by overlapping any one of the third basic structure, the fourth basic structure and the seventh basic structure with any one of the first basic structure, a fifth basic structure, and a sixth basic structure. It is more preferable that the second optical path difference providing structure is formed by overlapping the fourth basic structure with the first basic structure.

Further, when the objective optical element is the plastic lens, it is preferable that the objective optical element comprises the most peripheral area comprising the third optical path difference providing structure. In this case, it is preferable that the third optical path difference providing structure is the structure at least having any one of the third basic structure, the fourth basic structure and the seventh basic structure. Preferably, the third optical difference providing structure comprises the fourth basic structure.

Accordingly, when the objective optical element is the plastic lens, there is provided one preferable embodiment that the first optical path difference providing structure is the triple overlapped structure formed by overlapping three kinds of basic structures, the second optical path difference providing structure is the double overlapped structure formed by two kinds of basic structures, and the third optical path difference providing structure has only one kind basic structure.

Further, when the objective optical element is a glass lens or a lens formed of a thermal resin, it is preferable that the first optical path difference providing structure is the structure formed by overlapping only the first basic structure and the second basic structure.

Further, when the objective optical element is a glass lens or a lens formed of a thermal resin, it is preferable that the second optical path difference providing structure is the structure formed by overlapping any one of the third structure and the fourth structure with any one of the first basic structure, the fifth basic structure or the sixth basic structure. Preferably, it is the structure formed by overlapping the first basic structure and the fourth basic structure.

Further, when the objective optical element is a glass lens or a lens formed of a thermal resin, it is preferable that the objective optical element comprises the most peripheral area which is the refractive surface.

It is preferable that the first optical path difference providing structure is a ring-shaped structure comprising plural ring-shaped zones with steps which are arranged concentrically. When the objective optical element is a plastic lens, it is preferable that the steps in the first optical path difference providing structure have at least two kinds of step amounts selected from dA, dB, dC, and dD represented by the following expressions.

$$0.9\times(15\lambda B/(n-1)-2\lambda B'/(n'-1))<dA(\mu m)<1.5\times(15\lambda B/(n-1)-2\lambda B'/(n'-1)) \quad (17)$$

$$0.9\times(5\lambda B/(n-1)+2\lambda B'/(n'-1))<dB(\mu m)<1.5\times((5\lambda B/(n-1)+2\lambda B'/(n'-1)) \quad (18)$$

$$0.9\times 5\lambda B/(n-1)<dC(\mu m)<1.5\times 5\lambda B/(n-1) \quad (19)$$

$$0.9\times(5\lambda B/(n-1)-2\lambda B/(n-1))<dD(\mu m)<1.5\times(5\lambda B/(n-1)-2\lambda B'/(n'-1)) \quad (20)$$

Where, dA preferably satisfies the following expression (17').

$$0.95\times(15\lambda B/(n-1)-2\lambda B'/(n'-1))<dA(\mu m)<1.4\times(15\lambda B/(n-1)-2\lambda B'/(n'-1)) \quad (17')$$

Further, dA more preferably satisfies the following expression (17").

$$1.0\times(15\lambda B/(n-1)-2\lambda B'/(n'-1))<dA(\mu m)<1.3\times(15\lambda B/(n-1)-2\lambda B'/(n'-1)) \quad (17'')$$

Where, dB preferably satisfies the following expression (18').

$$0.95\times(5\lambda B/(n-1)+2\lambda B'/(n'-1))<dB(\mu m)<1.4\times((5\lambda B/(n-1)+2\lambda B'/(n'-1)) \quad (18')$$

Further, dB more preferably satisfies the following expression (18").

$$1.0\times(5\lambda B/(n-1)+2\lambda B'/(n'-1))<dB(\mu m)<1.3\times((5\lambda B/(n-1)+2\lambda B'/(n'-1)) \quad (18'')$$

Where, dC preferably satisfies the following expression (19').

$$0.95\times 5\lambda B/(n-1)<dC(\mu m)<1.4\times 5\lambda B/(n-1) \quad (19')$$

Further, dC more preferably satisfies the following expression (19").

$$1.0\times 5\lambda B/(n-1)<dC(\mu m)<1.3\times 5\lambda B/(n-1) \quad (19'')$$

Where, dD preferably satisfies the following expression (20').

$$0.95\times(5\lambda B/(n-1)-2\lambda B'/(n'-1))<dD(\mu m)<1.4\times(5\lambda B/(n-1)-2\lambda B'/(n'-1)) \quad (20')$$

Further, dD more preferably satisfies the following expression (20").

$$1.0\times(5\lambda B/(n-1)-2\lambda B'/(n'-1))<dD(\mu m)<1.3\times(5\lambda B/(n-1)-2\lambda B'/(n'-1)) \quad (20'')$$

Where, $\lambda B$ represents a design wavelength (μm); $\lambda B'$ represents an arbitral value which is 0.390 μm or more, and is 0.410 μm or less; n represents a refractive index of the objective optical element for the design wavelength $\lambda B$; and n' represents a refractive index of the objective optical element for a wavelength $\lambda B'$.

Further, $\lambda B$ may represent the wavelength (μm) of the first light source arranged in the optical pickup apparatus, that is using wavelength, if it is difficult to perceive the design wavelength; and $\lambda B'$ preferably represents an arbitral value which is 0.390 μm or more, and is 0.405 μm or less. More preferably, $\lambda B'$ represents an arbital value which is 0.390 μm or more, and is 0.400 μm or less.

Figure 12:
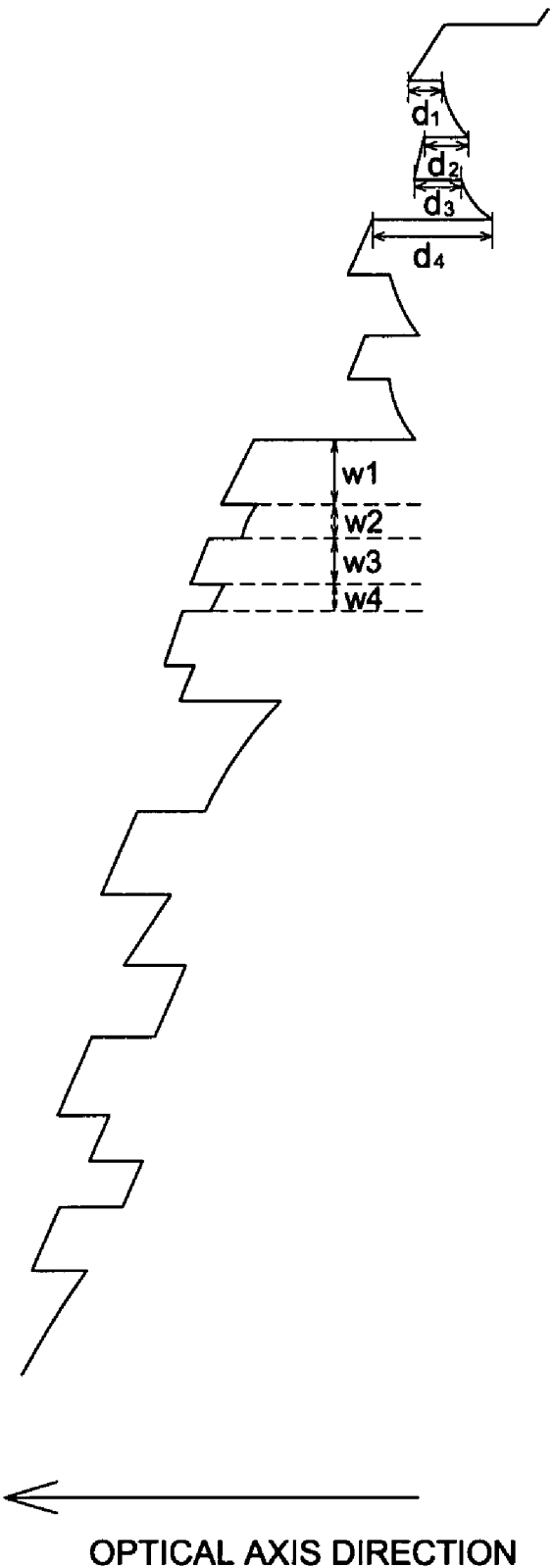
FIG. 12 is a view showing the step amount of an example of the optical path difference providing structure.

In the specification, the step amount means a length of the step in the optical path difference providing structure in the direction of the optical axis. For example, when the optical path difference providing structure is the structure shown in FIG. 12, examples of the step amount are each length of d1, d2, d3, and d4. "The steps in the first optical path difference providing structure have at least two kinds of step amounts selected from dA, dB, dC, and dD" means that at least one step x in the entire of the steps in the first optical path difference providing structure has the step amount satisfying any one of dA, dB, dC, and dD, and the other step y has the step amount satisfying any one of dA, dB, dC, and dD, which differs from the step amount of the step x.

It is preferable that there is no step having the step amount other than dA, dB, dC, and dD in the first optical path difference providing structure. It is further preferable that the step amount is not excessively large, from the viewpoint of easy manufacture of the die for the optical path difference providing structure and from the viewpoint of excellent transfer of the die. Therefore, it is more preferable that the entire of steps in the first optical path difference providing structure are composed of the steps having the step amounts satisfying only dC and dD.

Figure 13:
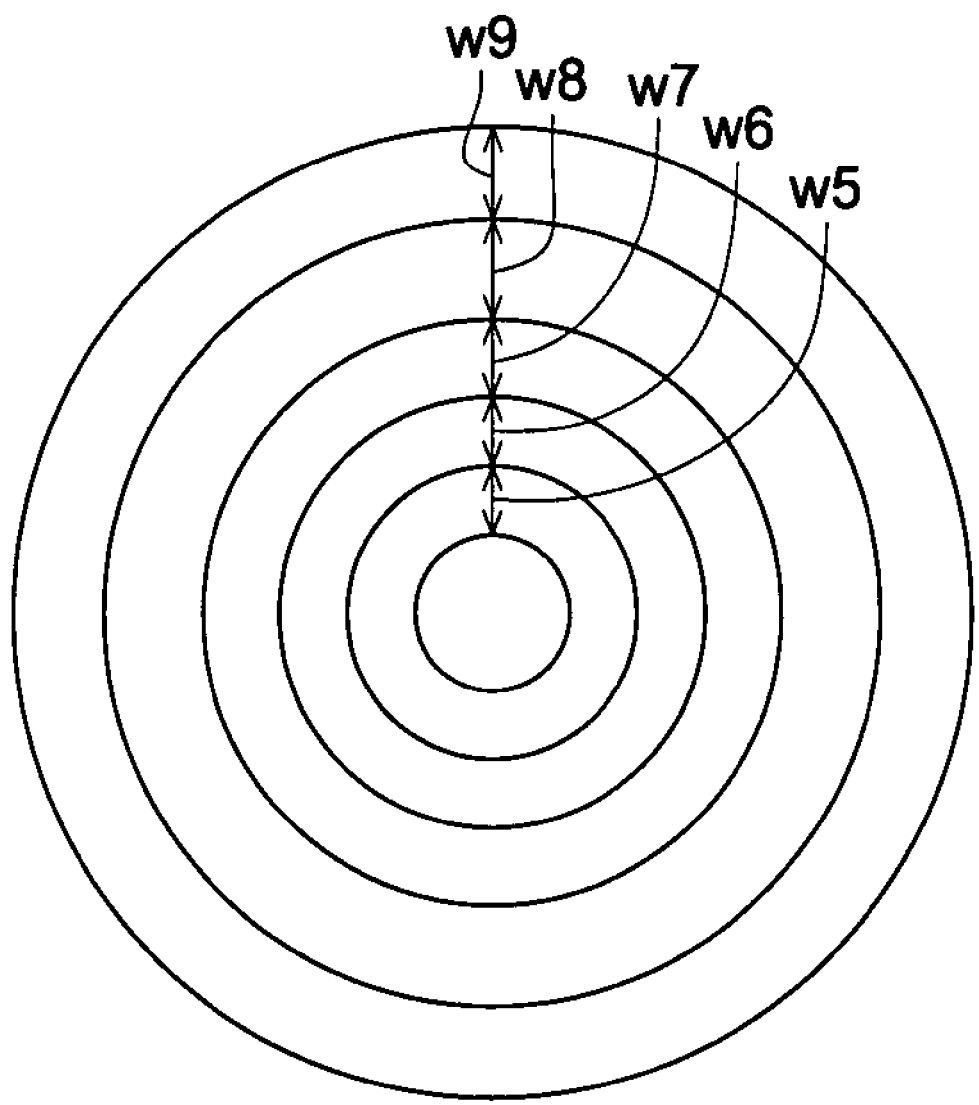
FIG. 13 is a view showing an example of the pitch width.
Figure 14:
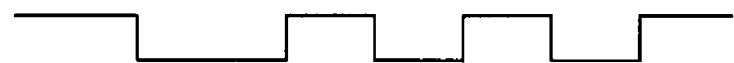
FIGS. 14(a) to 14(d) are views for illustrating the design method of the optical path difference providing structure according to the present invention.
Figure 14:
Figure 14:
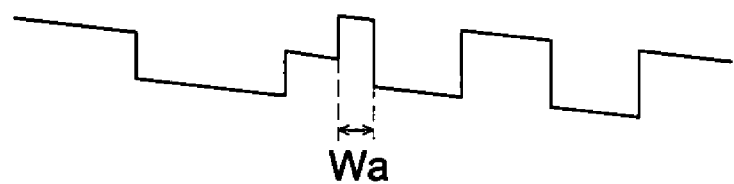
Figure 14:
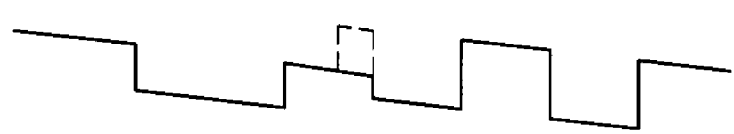

When designing an optical element according to the present invention, it can be considered to design it with the following method. First, the basic structure which is an optical path difference providing structure comprising a ring-shaped structure, is designed. Next, another basic structure is designed and the another basic structure comprises a ring-shaped structure which emits different order diffracted light flux with the maximum light amount for some wavelength from the diffracted light flux with the maximum light amount emitted from the former basic structure. Then, the first optical path difference providing structure or the second optical path difference providing structure can be designed by overlapping these two basic structures (they may be three basic structures) with each other. When designing the optical path difference providing structure using this method, there is a possibility that a ring-shaped zone with small pitch width appears. For example, the optical path difference providing structure shown in FIG. 14(c) can be obtained by overlapping the basic structure shown in FIG. 14(a) and the basic structure shown in FIG. 14(b). However, there appears a small ring-shaped zone with a small pitch width which is shown as Wa in FIG. 14(c) in the obtained structure. Here, the pitch width means a width of the ring-shaped zone in the direction perpendicular to the optical axis of the optical element. For example, when the optical path difference providing structure is a structure shown in FIG. 12, examples of the pitch width are each length of w1, w2, w3, and w4. When the optical path difference providing structure is a structure shown in FIG. 13, examples of the pitch width are each length of w5, w6, w7, w8, and w9.

The inventors of the present invention found as a result of earnest study that when the ring-shaped zone has width Wa of 5 μm or less, the ring-shaped zone can be removed or filled without giving bad effect to the optical characteristics. Namely, in the structure shown in FIG. 14(c), the optical characteristics is not substantially affected, even when the small pitch width in which Wa is 5 μm or less is removed.

Further, it is preferable that the pitch width of the step is not excessively small, from the viewpoint of manufacturing the die easily and transferring the die in good condition. Therefore, when an ring-shaped zone with the pitch width of 5 μm or less appears in the primitive optical path difference providing structure designed by overlapping plural basic structures, it is preferable that the ring-shaped zone with the pitch width of 5 μm or less is removed to obtain the final version of the optical path difference providing structure. When the ring-shaped zone with the pitch width of 5 μm or less is the protruded shape, the ring-shaped zone can be removed by cutting out. When the ring-shaped zone with the pitch width of 5 μm or less is the depressed shape, the ring-shaped zone can be removed by filling up.

Accordingly, at least the first optical path difference providing structure are composed of the ring-shaped zones whole of which have pitch width of 5 μm or more. Preferably, the second optical path difference providing structure and the third optical path difference providing structure also are composed of the ring-shaped zones whole of which have pitch width of 5 μm or more.

As described above, it is preferable that the step amount is not excessively large. The inventors of the present invention found the followings as a result of earnest study. When the primitive optical path difference providing structure obtained by overlapping plural basic structures has one ring-shaped zone with a step amount being larger than the reference value, the excessively large step amount can be reduced without bad effect to the optical characteristics by making the step amount of the ring-shaped zone small by 10·λB/(n−1) μm. Although an arbitral value is set for the reference value, the reference value is preferably set to 10 ·λB/(n−1) μm.

From a viewpoint that fewer thin ring-shaped zones are preferable, it is preferable that the entire of the ring shaped zones of the first optical path difference providing structure satisfies that the value of (step amount/pitch width) is preferably 1 or less, and more preferably is 0.8 or less. Further more preferably, the entire of the ring shaped zones of all of the optical path difference providing structures satisfies that the value of (step amount/pitch width) is preferably 1 or less, and most preferably is 0.8 or less.

NA1 represents the image side numerical aperture of the objective optical element, necessary for reproducing and/or recording information for the first optical disk. NA2 (NA1≧NA2) represents that the image side numerical aperture of the objective optical element necessary for reproducing and/or recording for the information to the second optical disk. NA3 (NA2>NA3) represents that the image side numerical aperture of the objective optical element necessary for reproducing and/or recording information for the third optical disk. It is preferable that NA1 is one of: 0.8 or more, and 0.9 or less; and 0.55 or more, and 0.7 or less. Specifically, preferable NA1 is 0.85. It is preferable that NA2 is 0.55 or more, and is 0.7 or less. Specifically, preferable NA2 is 0.60. Further, it is preferable that NA3 is 0.4 or more, and is 0.55 or less. Specifically, preferable NA3 is 0.45 or 0.53.

It is preferable that the border of the central area and the peripheral area in the objective optical element is formed in a portion corresponding to the range being 0.9·NA3 or more and being 1.2·NA3 or less (more preferably, 0.95·NA3 or more, and 1.15·NA3 or less) for the third light flux. More preferably, the border of the central area and the peripheral area of the objective optical element is formed in a portion corresponding to NA3. Further, it is preferable that the border of the peripheral area and the most peripheral area of the objective optical element is formed in a portion corresponding to the range being 0.9·NA2 or more, and being 1.2·NA2 or less (more preferably, being 0.95·NA2 or more, and being 1.15·NA2 or less) for the second light flux. More preferably, the border of the peripheral area and the most peripheral area of the objective optical element is formed in a portion corresponding to NA2. It is preferable that the border of the outside of the most peripheral area of the objective optical element is formed in a portion corresponding to the range being than 0.9·NA1 or more, and being 1.2·NA1 or less (more preferably, being 0.95·NA1 or more, and being 1.15·NA1 or less) for the first light flux. More preferably, the border of the outside of the most peripheral area of the objective optical element is formed in a portion corresponding to NA1.

When the third light flux passing through the objective optical element is converged on the information recording surface of the third optical disk, it is preferable that the spherical aberration has at least one discontinuous portion. In that case, it is preferable that the discontinuous portion exists in the range being 0.9·NA3 or more, and being 1.2·NA3 or less (more preferably, being 0.95·NA3 or more, and being 1.15·NA3 or less) for the third light flux. Further, also when the second light flux passing through the objective optical element is converged on the information recording surface of the second optical disk, it is preferable that the spherical aberration has at least one discontinuous portion. In that case, it is preferable that the discontinuous portion exists in the range being 0.9·NA2 or more, and being 1.2·NA2 or less (more preferably, being 0.95·NA2 or more, and being 1.1·NA2 or less) for the second light flux.

Further, when the spherical aberration is continuous and does not have the discontinuous portion, and when the third light flux passing through the objective optical element is converged on the information recording surface of the third optical disk, it is preferable that the absolute value of the vertical spherical aberration is 0.03 μm or more in NA2, and the absolute value of the vertical spherical aberration is 0.02 μm or less in NA3. More preferably, the absolute value of the vertical spherical aberration is 0.08 μm or more in NA2, and the absolute value of the vertical spherical aberration is 0.01 μm or less in NA3. Further, when the second light flux passing through the objective optical element is converged on the information recording surface of the second optical disk, it is preferable that the absolute value of the vertical spherical aberration is 0.03 μm or more in NA1, and the absolute value of the vertical spherical aberration is 0.005 μm or less in NA2.

Further, because the diffraction efficiency depends on the depth (step amount) of the ring shaped zone in the diffractive structure, the diffraction efficiency of the central area for each wavelength can be appropriately set corresponding to the use of the optical pickup apparatus. For example, in the case of the optical pickup apparatus for recording and reproducing information on the first optical disk, and only for reproducing information on the second and the third optical disks, it is preferable that the diffraction efficiency of the central area and/or the peripheral area is defined with considering primarily the diffraction efficiency for the first light flux. On the other hand, in the case of the optical pickup apparatus only for reproducing information on the first optical disks and for recording and reproducing information on the second and third optical disks, it is preferable that the diffraction efficiency of the central area is defined with considering primarily the diffraction efficiency for the second and third light fluxes and the peripheral area is defined with considering primarily the diffraction efficiency for the second light flux.

In any case, when the following conditional expression (11) is satisfied, the diffraction efficiency of the first light flux calculated by the area weighted mean can be secured high.

$$\eta 11 \leq \eta 21 \tag{11}$$

Where, $\eta 11$ expresses the diffraction efficiency of the first light flux in the central area, $\eta 21$ expresses the diffraction efficiency of the first light flux in the peripheral area. Hereupon, when the diffraction efficiency of the central area is defined with considering primarily the light fluxes with the second and the third wavelengths, the diffraction efficiency of the first light flux of the central area is decreased. However, in the case where the numerical aperture of the first optical disk is larger than the numerical aperture of the third optical disk, when considered on the whole effective diameter of the first light flux, the diffraction efficiency decrease of the central area does not give so much large influence.

Hereupon, the diffraction efficiency in the present specification can be defined as follows.

(1) The transmittance of an objective optical element excluding the first and the second optical path difference providing structures is measured with being divided into the central area and the peripheral area. The objective optical element without the first and the second optical path difference providing structures has a focal length, a lens thickness, a numerical aperture, a material which are the same to the objective optical element having the first and the second optical path difference providing structures. In this case, the transmittance of the central area is measured with the light flux which enters into the peripheral area being shielded, and the transmittance of the peripheral area is measured with the light flux which enters into the central area being shielded.

(2) The transmittance of the objective optical element having the first and the second optical path difference providing structures is measured with being divided into the central area and the peripheral area.

(3) The diffraction efficiencies of both areas are obtained by dividing the results of (2) is divided by the respective results of (1).

Further, the light utilization efficiency of any two light fluxes of the first light flux to the third light flux may be 80% or more, and the light utilization efficiency of the remaining one light flux may be 30% or more, and 80% or less. The light utilization efficiency of the remaining one light flux may also be 40% or more, and 70% or less. In this case, it is preferable that the light utilization efficiency of the third light flux is 30% or more, and 80% or less (or 40% or more, and 70% or less) is.

Hereupon, the light utilization efficiency described in this specification is calculated as follows. It is defined that the objective lens which includes the first optical path difference providing structure and the second optical path difference providing structure (which may further include the third optical path difference providing structure) forms an air disk whose light amount is A, on the information recording surface. It is further defined that the objective lens which is formed of the same material to the former objective lens and has the same focal length, axial thickness, numerical aperture, and wavefront aberration to the former objective lens and which does not includes the first optical path difference providing structure, the second optical path difference providing structure, and the third optical path difference providing structure, forms an air disk whose light amount B, on the information recording surface. The light utilization efficiency described in this specification is obtained by calculating A/B. Where, the above described airy disk is the circle with a radius r' formed around the optical axis of the light converged spot. The radius r' is expressed by r'=0.61·λ/NA.

Further, it is difficult that the tracking characteristic particularly in the third optical disk is maintained in the good condition when there is provided the light amount difference being 0% or more, and 20% or less between the diffracted light flux with a diffraction order having the largest light amount and the diffracted light flux with another diffraction order having the second largest light amount in the third light flux which has passed through the first optical path difference providing structure, that is, the difference between the diffracted light flux forming the first best focus, and the diffracted light flux forming the second best focus. However, the embodiment of the present invention can provide a excellent tracking characteristics under the above described condition.

Each of the first light flux, the second light flux and the third light flux may enters into the objective optical element as a collimated light flux, or may also enter into the objective optical element as a divergent light flux or a convergent light flux. Preferably, the magnification m1 of the objective optical element when the first light flux enters into the objective optical element satisfies the following expression (2).

$$-0.02 < m1 < 0.02 \quad (2)$$

On the one hand, when the first light flux is made incident on the objective optical element as the divergent light, it is preferable that the magnification m1 of the incident light flux of the first light flux on the objective optical element satisfies the following expression (2').

$$-0.10 < m1 < 0.00 \quad (2')$$

Further, when the second light flux enters into the objective optical element as the collimated light flux or substantially collimated light flux, it is preferable that the magnification m2 of the objective optical element when the second light flux enters into the objective optical element satisfies the following expression (3).

$$-0.02 < m2 < 0.02 \quad (3)$$

On the one hand, when the second light flux is made incident on the objective optical element as the divergent light, it is preferable that the magnification m2 of the incident light flux of the second light flux on the objective optical element satisfies the following expression (3').

$$-0.10 < m2 < 0.00 \quad (3')$$

Further, when the third light flux enters into the objective optical element as a collimated light flux or substantially collimated light flux, it is preferable that the magnification m3 of the objective optical element when the third light flux enters into the objective optical element satisfies the following expression (4). When the third light flux is a collimated light flux, a problem is easily caused in the tracking operation. However, even when the third light flux is a collimated light flux, the embodiment of the present invention can obtain the good tracking characteristics, and information can be adequately recorded and/or reproduced for the three different optical disks.

$$-0.02 < m3 < 0.02 \quad (4)$$

On the one hand, when the third light flux enters into the objective optical element as a divergent light flux, it is preferable that the magnification m3 of the objective optical element when the third light flux enters into the objective optical element satisfies the following expression (5).

$$-0.10 < m3 < 0.00 \quad (5)$$

Further, when the objective optical element is a single plastic lens, it is preferable that the temperature characteristic makes good even if some wavelength characteristics is sacrificed. Particularly, it is preferable to maintain a good balance between the wavelength and temperature characteristics. It is more preferable to maintain the temperature characteristic when recording and/or reproducing information for the first optical disk, is made good. In order to satisfy such a characteristic, it is preferable to satisfy the following conditional expressions (12) and (13).

$$+0.00045(WFE\lambda\text{rms}/(°\text{C.·mm})) \leq \delta SAT1/f \leq +0.0027$$
$$(WFE\lambda\text{rms}/(°\text{C.·mm})) \quad (12)$$

$$-0.045(WFE\lambda\text{rms}/(\text{nm·mm})) \leq \delta SA\lambda/f \leq -0.0045$$
$$(WFE\lambda\text{rms}/(\text{nm·mm})) \quad (13)$$

Where, δSAT1 represents δSA3/δT of the objective optical element for a using light wavelength (In this case, it is defined that the wavelength does not changes with the temperature change), in case that information is recorded and/or reproduced for the first optical disk. The using wavelength means a wavelength of the first light flux emitted from the first light source arranged in the optical pickup apparatus comprising the objective optical element. The preferable using wavelength is in the range being 400 nm or more, and being 415 nm or less, and is a wavelength which enables to record and/or reproduce information for the first optical disk. When the using wavelength is difficult to be set as above, the using wavelength may be set to 405 nm and δSAT1 of the objective optical element and δSAT2 and δSAT3 of the objective optical element which are described later, may be obtained. In other words, δSAT1 is a ratio of a change in a third spherical aberration of the objective optical element with a temperature change (temperature characteristics) for a using light wavelength which does not change with temperature change, in case that information is recorded and/or reproduced for the first optical disk. Here, WFE means that the third spherical aberration is represented by using the wavelength aberration. δSAλ represents δSA3/δλ when information is recorded and/or reproduced for the first optical disc by the using wavelength under the condition that the ambient temperature is constant. In other words, δSAλ represents a change in the third spherical aberration of the objective optical element with the wavelength change (wavelength characteristics) when information is recorded and/or reproduced for the first optical disk by the using wavelength under the condition that the ambient temperature is constant. Here, it is preferable that the ambient temperature is a room temperature. The room temperature indicates 10° C. or more, and 40° C. or less, and preferably indicates 25° C. In above expressions, f is a focal length of the objective optical element for the using wavelength of the first light flux, which is preferably 405 nm.

More preferably, the following conditional expression (12') is satisfied.

$$+0.00091(WFE\lambda rms/(° C.·mm)) \leq \delta SAT1/f \leq +0.0018 (WFE\lambda rms/(° C.·mm)) \quad (12')$$

Further preferably, the following conditional expression (12") is satisfied.

$$+0.0013(WFE\lambda rms/(° C.·mm)) \leq \delta SAT1/f \leq +0.0016 (WFE\lambda rms/(° C.·mm)) \quad (12'')$$

Preferably, the following conditional expression (12''') is satisfied.

$$|\delta SAT1| \leq 0.002(WFE\lambda rms/° C.) \quad (12''')$$

Preferably, the following conditional expression (13') is satisfied, more preferably, the following conditional expression (13") is satisfied.

$$-0.032(WFE\lambda rms/(nm·mm)) \leq \delta SA\lambda/f \leq -0.0091 (WFE\lambda rms/(nm·mm)) \quad (13')$$

$$-0.015(WFE\lambda rms/(nm·mm)) \leq \delta SA\lambda/f \leq -0.011 (WFE\lambda rms/(nm·mm)) \quad (13'')$$

Preferably, the following conditional expression (13''') is satisfied, and more preferably, the following conditional expression (13'''') is satisfied.

$$0.01(WFE\lambda rms/nm) \leq |\delta SA\lambda| < 0.1(WFE\lambda rms/nm) \quad (13''')$$

$$0.02(WFE\lambda rms/nm) \leq |\delta SA\delta| < 0.1(WFE\lambda rms/nm) \quad (13'''')$$

Describing furthermore, it is preferable that the objective optical element has the wavelength dependency of the spherical aberration so as to correct the change in the spherical aberration due to the refractive index change of the objective optical element caused with the temperature change by the change of the first wavelength due to the temperature change. Preferably, the following conditional expression (14) is satisfied.

$$0(WFE\lambda rms/(° C.·mm)) \leq \delta SAT2/f \leq +0.00136(WFE\lambda rms/(° C.·mm)) \quad (14)$$

Where, δSAT2 represents δSA3/δT of the objective optical element for a using light wavelength (preferably 405 nm) which changes by 0.05 nm/° C. with a temperature change, in case that information is recorded and/or reproduced for the first optical disk. In other words, δSAT2 is a ratio of a change in a third spherical aberration of the objective optical element with a temperature change for a using light wavelength (preferably 405 nm) which changes by 0.05 nm/° C. with a temperature change in case that information is recorded and/or reproduced for the first optical disk.

More preferably, the following conditional expression (14') is satisfied.

$$0(WFE\lambda rms/(° C.·mm)) \leq \delta SAT2/f \leq +0.00093(WFE\lambda rms/(° C.·mm)) \quad (14')$$

Further preferably, the following conditional expression (14") is satisfied.

$$+0.0007(WFE\lambda rms/(° C.·mm)) \leq \delta SAT2/f \leq +0.0009 (WFE\lambda rms/(° C.·mm)) \quad (14'')$$

Further, when the light converging optical system of the optical pickup apparatus comprises a coupling lens such as a collimator lens, and when the coupling lens is a plastic lens, it preferably satisfies the following conditional expression (15).

$$0(WFE\lambda rms/(° C.·mm)) \leq \delta SAT3/f \leq +0.00091(WFE\lambda rms/(° C.·mm)) \quad (15)$$

Where, δSAT3 represents δSA3/δT of a total optical system including the coupling lens and the objective optical element for a using light wavelength (preferably 405 nm) which changes by 0.05 nm/° C. with a temperature change, in case that information is recorded and/or reproduced for the first optical disk. In other words, δSAT3 is a ratio of a change in a third spherical aberration of a total optical system including the coupling lens and the objective optical element with a temperature change (temperature characteristics) for a using light wavelength (preferably 405 nm) which changes by 0.05 nm/° C. with the temperature change, in case that information is recorded and/or reproduced for the first optical disk.

More preferably, the following conditional expression (15') is satisfied.

$$0(WFE\lambda rms/(° C.·mm)) \leq \delta SAT3/f \leq +0.00045(WFE\lambda rms/(° C.·mm)) \quad (15')$$

More preferably, the following conditional expression (15") is satisfied.

$$+0.00005(WFE\lambda rms/(° C.·mm)) \leq \delta SAT3/f \leq +0.0003 (WFE\lambda rms/(° C.·mm)) \quad (15'')$$

As described above, when the wavelength characteristic is not made so much good, the objective optical element whose temperature characteristic is excellent can be obtained. As for the wavelength characteristics, the light source whose oscillation wavelength is appropriate for the objective optical element is selected with considering the fluctuation of the oscillation wavelength of the light source, that is, the bad influence came from the fluctuation of the wavelength can be suppressed to some degree by selecting the light source whose oscillation wavelength is close to the reference wavelength. Accordingly, a low cost and simple optical pickup apparatus can be provided by combining the objective optical element as described above and the light source whose oscillation wavelength is severely selected. Further, there can be previously prepared the different kinds of the above described objective optical elements whose design wavelengths are different from each other. Therefore, it allows to provide a low cost and simple optical pickup apparatus by combining the light source and the objective optical element whose designed wavelength is adequate corresponding to the fluctuation of the oscillation wavelength of the light source. More specifically, it is preferable that the manufacturing method of the optical pickup apparatus includes: the step of dividing the objective optical elements whose temperature characteristic is excellent as described above, into a plurality of groups corresponding to the specification of the optical path difference providing structure; the step of selecting any one group of the objective optical element corresponding to the oscillation characteristics of the light source to be used; and the step of combining the light source and the selected objective optical element.

For example, there is provided the objective optical elements which are divided into groups including: the group of the objective optical elements having an optical path difference providing structure appropriate for the light source whose oscillation wavelength is deviated to plus side to the reference wavelength; a group of the objective optical elements having an optical path difference providing structure appropriate for the light source whose oscillation wavelength is close to the reference wavelength; and a group of the objective optical elements having the optical path difference providing structure appropriate for the light source whose oscillation wavelength is deviated to minus side to the reference wavelength. Then, the oscillation wavelength of the using light source is measured. The objective optical element lens is selected from the group most appropriate for the measured light source and is combined with the measured light source. These steps allows to provide the optical pickup apparatus which can adequately record and/or reproduce information, even when the temperature changes. Further, it is preferable that, the different identification marks corresponding to these groups are provided to the objective optical elements. In above description, "the specification of the optical path difference providing structure is different" means, for example, that the design wavelength of the diffractive structure is made different. However, it is to be understood that various changes and modifications will be apparent to those skilled in the art. Further, "oscillation characteristics" includes the measured value and fluctuation of the oscillation wavelength.

Further, when the manufacturing method of the above-described optical pickup apparatus is applied, and when the delivery lot of the manufactured optical pickup apparatus is inspected, it is preferable that the following conditional expression (16) is satisfied.

$$\sigma SA3 \leq \sigma\lambda \cdot \delta SA3\lambda_{a11} \qquad (16)$$

Where, σSA3 (λrms) expresses the standard deviation of the third order spherical aberration of the light converging optical systems (from the light source to the information recording surface) each including the objective optical element of the optical pickup apparatus for the wavelength of the light source oscillated at the reference temperature and reference output. Further, σλ (nm) expresses the standard deviation of the oscillation wavelength at the reference temperature and reference output of the light sources included in the delivery lot of the optical pickup apparatus. Further, $\delta SA3\lambda_{a11}$ (λrms/nm) expresses the wavelength dependency of the third spherical aberration of the light converging optical systems (from the light source to the information recording surface) each including the objective optical element included in the delivery lot of the optical pickup apparatus.

Herein, the description will be returned to the explanation of the objective optical element. It is preferable that the objective optical element satisfies the above-described conditional expressions (12) to (15) by including the temperature characteristics correction structure. For example, in the case where the first optical path difference providing structure is the structure comprising at least any one structure selected from a group including at least the third basic structure, the fourth basic structure and the seventh basic structure, the above described conditional expressions (12) to (15) can be realized without designing the complicated optical element. Further, when the second optical path difference providing structure is the structure comprising any one structure selected from a group including at least the third basic structure, fourth basic structure and the seventh structure, the above described conditional expressions (12), (12'), (13), (13'), (13"), (14), (14'), (15), and (15') can be realized without designing the complicated optical element. Further, when the objective optical element comprises the most peripheral area comprising the third optical path difference providing structure around the peripheral area, and the third optical path difference providing structure is the structure comprising any one structure selected from a group including at least the third basic structure, the fourth basic structure and the seventh basic structure, the above-described conditional expressions (12), (12'), (13), (13'), (13"), (14), (14'), (15), and (15') can be realized without designing the complicated optical element.

Further, in the case where the image side numerical aperture (NA) of the objective optical element to the first light flux is 0.8 or more, and 0.9 or less, the effects when the above-described conditional expressions (12), (12'), (13), (13'), (13"), (14), (14'), (15), (15') are satisfied, are more conspicuous.

Further, it is preferable that the working distance (WD) of the objective optical element when the third optical disk is used, is 0.20 mm or more, and is 1.5 mm or less. The working distance of the objective optical element when the third optical disk is preferably 0.3 mm or more, and 1.0 mm or less. Next, it is preferable that the working distance (WD) of the objective optical element when the second optical disk is used, is 0.4 mm or more, and is 0.7 mm or less. The working distance is preferably that the working distance (WD) of the objective optical element when the first optical disk is used, is 0.4 mm or more, and is 0.9 mm or less (when t1<t2, it is preferably 0.6 mm or more, and is 0.9 mm or less).

It is preferable that the entrance pupil diameter of the objective optical element is 2.8 mm or more, and is 4.5 mm or less when the first optical disk is used.

The optical information recording and reproducing apparatus according to the present invention, has the optical disk drive apparatus having the above described optical pickup apparatus.

Herein, the optical disk drive apparatus installed in the optical information recording and reproducing apparatus will be described. There is provided the optical disk drive apparatus employing a system of taking out only a tray which can hold an optical disk with the optical disk being, from the main body of the optical information recording and reproducing apparatus in which optical pickup apparatus is housed; and a system of taking out the main body of the optical disk drive apparatus in which the optical pickup apparatus is housed.

The optical information recording and reproducing apparatus using each of the above described systems, is generally provided with the following component members: an optical pickup apparatus housed in a housing; a drive source of the optical pickup apparatus such as seek-motor by which the optical pickup apparatus is moved toward the inner periphery or outer periphery of the optical disk for each housing; traveling means having a guide rail for guiding the optical pickup apparatus toward the inner periphery or outer periphery of the optical disk; and a spindle motor for rotation driving of the optical disk. However, it is to be understood that various changes and modifications will be apparent to those skilled in the art.

The optical information recording and reproducing apparatus employing the former system is provide with, other than these component members, a tray which can hold the optical disk with the optical disk being mounted thereon, and a loading mechanism for slidably moving the tray. The optical information recording and reproducing apparatus employing the latter system does not include the tray and loading mechanism, and it is preferable that each component member is provided in the drawer corresponding to chassis which can be taken out outside.

The embodiment of the present invention allows that one pickup lens to properly record and/or reproduce information for three different disks (for example, a high density optical disk using a blue-violet laser light source, DVD, and CD) with employing a simple and low-cost configuration. Further, the above embodiment allows to provide an optical pickup apparatus, an objective optical element, and an optical information recording reproducing apparatus which can maintain accuracy of the tracking operation for all three different optical disks, even when using an infinite optical system. The above embodiment further allows to provide an optical pickup apparatus, an objective optical element, and an optical information recording reproducing apparatus which properly record and/or reproduce information for three different disks with using a single objective lens. The above embodiment further allow to provide an optical pickup apparatus, an objective optical element, and an optical information recording reproducing apparatus which provide excellent temperature characteristics and properly record and/or reproduce information for three different disks with using a single objective lens, even when employing a plastic lens.

EXAMPLE

Figure 3:
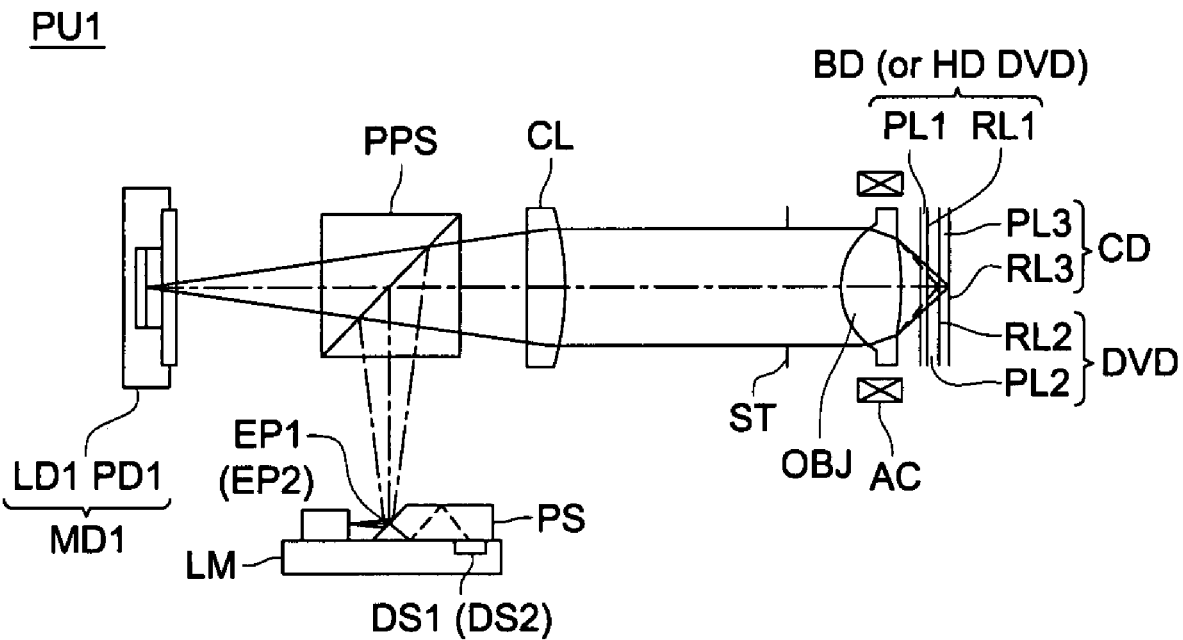
FIG. 3 is a view generally showing the structure of an optical pickup apparatus according to the present invention.

Referring to the drawings, the embodiment of the present invention will be described below. FIG. 3 is a view schematically showing optical pickup apparatus PU1 of the present embodiment capable of recording and/or reproducing information adequately for BD, DVD and CD which are different optical disks. The optical pickup apparatus PU1 can be mounted in the optical information recording and reproducing apparatus. Herein, the first optical disk is BD, the second optical disk is DVD, and the third optical disk is CD. Hereupon, the present invention is not limited to the present embodiment.

The optical pickup apparatus PU1 comprises objective optical element OBJ; aperture ST; collimator lens CL; polarizing dichroic prism PPS; first semiconductor laser LD1 (the first light source) which emits a laser light flux with a wavelength of 405 nm (the firs light flux) when recording/reproducing information for BD; and first light receiving element PD1 which receives the reflection light from information recording surface RL1 of BD; and laser module LM.

Further, the laser module LM comprises second semiconductor laser EP1 (the second light source) which emits the laser light flux with a wavelength of 658 nm (the second light flux) when recording and/or reproducing information for DVD; third semiconductor laser EP2 (the third light source) emitting the laser light flux with a wavelength of 785 nm (the third light flux) when recording and/or reproducing information for CD; second light receiving element DS1 which receives the reflection light flux from the information recording surface RL2 of DVD; the third light receiving element DS2 which receives the reflection light flux from the information recording surface RL3 of CD; and a prism PS.

Figure 4:
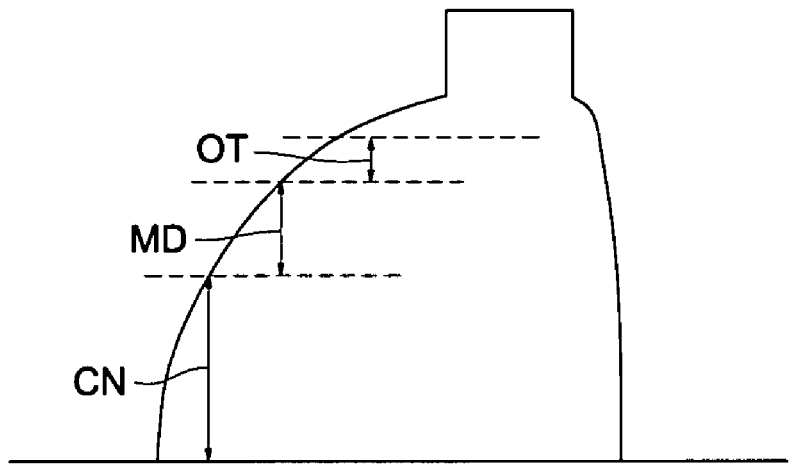
FIG. 4 is a sectional view typically showing an example of objective optical element OBJ according to the present invention.

As shown in FIG. 1 and FIG. 4, objective optical element OBJ includes central area CN including the optical axis; peripheral area MD arranged around the central area; and most peripheral area OT further arranged around the peripheral area, which are formed concentrically around the optical axis in the aspheric optical surface of the light source side of the objective optical element. Hereupon, the area ratio of the central area, peripheral area, most peripheral area shown in FIG. 1 and FIG. 4 is not expressed exactly.

Blue-violet semiconductor laser diode LD1 emits a first light flux ($\lambda 1$=405 nm) which is a divergent light flux. The divergent light flux passes through polarizing dichroic prism PPS, and is converted into a collimated light flux by collimator lens CL. The collimated light flux is converted from straight line polarized light into circular polarized light by the ¼ wavelength plate which is not shown. The diameter of the converted light flux is regulated by the aperture ST, and objective optical element OBJ forms the regulated light flux into a spot on information recording surface RL1 of BD through the protective substrate with thickness of 0.0875 mm.

The light flux on information recording surface RL1 is reflected and modulated by the information pit on the information recording surface RL1. The reflected light flux passes through objective optical element OBJ, aperture ST again, and is converted from circular polarized light into straight line polarized light by the ¼ wavelength plate which is not shown. Then, collimator lens CL convert the light flux into a convergent light flux. The convergent light flux passes through polarizing dichroic prism PPS and is converged on the light receiving surface of the first light receiving element PD1. Then, information recorded in BD can be read based on the output signal of the first light receiving element PD1, by focusing or tracking objective optical element OBJ using biaxial actuator AC.

Red semiconductor laser EP1 emits a second light flux ($\lambda 2$=658 nm) which is a divergent light flux. The divergent light flux is reflected by the prism PS and is further reflected by polarizing dichroic prism PPS. Collimator lens CL collimate the reflected light flux and the collimated light flux is converted from straight line polarized light into circular polarized light by the ¼ wavelength plate which is not shown. The converted light flux enters into objective optical element OBJ. Herein, the incident light flux is converged by the central area and the peripheral area of the objective optical element OBJ (the light flux passing through the most peripheral area is made into a flare, and forms the peripheral spot portion). The converged light flux becomes a spot on information recording surface RL2 of DVD through the protective substrate PL2 with a thickness of 0.6 mm, and forms the central spot portion.

The light flux on information recording surface RL2 is reflected and modulated by the information pit on the information recording surface RL2. The reflection light flux passes through objective optical element OBJ and aperture ST again, and is converted from circular polarized light into straight line polarized light by the ¼ wavelength plate which is not shown. Then, Collimator lens CL converts the light flux into a convergent light flux, the convergent light flux is reflected by the polarizing dichroic prism PPS, then, is reflected two times in the prism, and converged on the second light receiving element DS1. Then, the information recorded in DVD can be read by using the output signal of the second light receiving element DS1.

Infrared semiconductor laser EP2 emits the third light flux ($\lambda 3$=785 nm) which is a divergent light flux. The divergent light flux is reflected by prism PS, and further reflected by polarizing dichroic prism PPS. Collimator lens CL collimate the reflected light flux and the collimated light flux is converted from straight line polarized light into circular polarized light by the ¼ wavelength plate which is not shown. The converted light flux enters into objective optical element OBJ. Herein, the incident light flux is converged by the central area of the objective optical element OBJ (the light flux passing through the peripheral area and the most peripheral area is made into a flare, and forms the peripheral spot portion). The converged light flux becomes a spot on information recording surface RL3 of CD through the protective substrate PL3 with thickness of 1.2 mm, and forms the central spot portion.

The light flux on information recording surface RL3 is reflected and modulated by the information pit on the information recording surface RL3. The reflection light flux passes through objective optical element OBJ and aperture ST again, and is converted from circular polarized light into straight line polarized light by the ¼ wavelength plate which is not shown. Then, collimator lens CL converts the light flux into a convergent light flux, the convergent light flux is reflected by the polarizing dichroic prism PPS, then, is further reflected two times in the prism. The reflected light flux is converged on the third light receiving element DS2. Then, information recorded in CD can be read by using output signal of the third light receiving element DS2.

When the first light flux emitted from the blue-violet semiconductor laser LD1 enters into objective optical element OBJ as a collimated light flux, the first optical path difference providing structure of the central area, the second optical path difference providing structure of the peripheral area and the most peripheral area adequately corrects the spherical aberration of the first light flux. Therefore, information can be recorded and/or reproduced adequately for BD having a protective substrate with a thickness t1. Further, when the second light flux emitted from the red semiconductor laser EP1 enters into objective optical element OBJ as a collimated light flux, the first optical path difference providing structure of the central area, the second optical path difference providing structure of the peripheral area adequately corrects the spherical aberration of the second light flux generated due to the thickness difference between the protective substrates of BD and DVD and the wavelength difference between the first light flux and the second light flux, and the most peripheral area makes the second light flux the flare on the information recording surface of DVD. Therefore, information can be recorded and/or reproduced adequately for DVD having a protective substrate with thickness of t2. Further, when the third light flux emitted from the infrared semiconductor laser EP2 enters into objective optical element OBJ as the parallel light flux, the first optical path difference providing structure of the central area adequately corrects the spherical aberration of the third light flux generated due to the thickness difference between the protective substrates of BD and CD and the wavelength difference between the first light flux and the third light flux, and the second optical path difference providing structure of the peripheral area and the most peripheral area make the third light flux the flare on the information recording surface of CD. Therefore, information can be recorded and/or reproduced adequately for CD having a protective substrate with thickness of t3. Further, the first optical path difference providing structure on the central area sepa-rates a light converged spot of a necessary light of the third light flux which is used for recording and reproducing information, and a light converged spot of an unnecessary light of the third light flux by the adequate distance. Thereby, the first optical path difference providing structure also makes the tracking characteristic good when CD is used. Additionally, the second optical path difference providing structure on the peripheral area can correct the spherochromatism (chromatic spherical aberration) for the first light flux and the second light flux when the wavelength is deviated from the reference wavelength due to the reason such as the manufacturing error of the laser diode.

Examples 1-3

Next, examples which can be used for the above described embodiment will be described. In the following examples 1-3, the objective optical element is a single glass lens. The objective optical element comprises an optical surface including central area CN, the peripheral area MD, and the most peripheral area OT. The first optical path difference providing structure is formed on the entire surface of central area CN on the optical surface. The second optical path difference providing structure is formed on the entire surface of the peripheral area MD on the optical surface. The most peripheral area OT on the optical surface is the refractive surface in the aspheric shape.

Further, in Examples 1-3, the first optical path difference providing structure is the structure formed by overlapping the first basic structure and the second basic structure and having a shape in which a serrated diffractive structure and a binary structure are overlapped. The sectional shape is likely a shape shown in FIG. 2(c). The first basic structure which is the serrated diffractive structure is designed so as to make the light amount of the second order diffracted light flux of the first light flux larger than the light amount of any diffracted light flux with other diffraction order (which also includes 0-th order flux, that is, a transmitted light flux), and to make the light amount of the first order diffracted light of the second light flux is made larger than the light amount of any diffractive light with other diffraction order (which also includes 0-th order light flux, that is, a transmitted light), and to make the light amount of the first order diffractive light of the third light flux larger than the light amount of any diffracted light with other diffraction order (which also includes 0-th order light flux, that is, a transmitted light). Further, the second basic structure which is the binary structure, is so-called, the wavelength selection diffractive structure. The second basic structure is designed so as to make the light amount of the 0-th order diffracted light (transmitted light) of the first light flux larger than the light amount of the any diffracted light with other diffraction order, to make the light amount of the 0-th order diffracted light (transmitted light) of the second light flux larger than the light amount of any diffracted light with other diffraction order, and to make the light amount of ±first order diffracted light of the third light flux larger than the light amount of any diffracted with other diffraction order (which also includes 0-th order light flux, that is, a transmitted light).

Further, each of the examples 1-3 provide a first optical path difference providing structure including the following areas: as shown in FIG. 2(c), the area of the optical axis side of the central area in which the serrated structure having steps facing the optical axis side and the binary structure are overlapped; the area of the peripheral area side of the central area in which the serrated structure having steps facing the opposite side to the optical axis, and the binary structure are overlapped; the transition area arranged between the two areas, which is necessary for switching direction of the step of the serrated structure. This transition area corresponds to a point where the optical path difference function has an extreme value when the optical path difference which is added to the transmitting wavefront by the diffractive structure, is expressed by the optical path difference function. Hereupon, when the optical path difference function has a point which is the extreme value, it reduces the inclination of the optical path difference function. Therefore, the ring-shaped zone pitch can be extended, and the transmittance lowering due to the shape error of the diffractive structure can be suppressed.

In the examples 1-3, the second optical path difference providing structure is the structure formed by overlapping the first basic structure and the fourth basic structure, and having a shape in which a finer serrated diffractive structure and a rougher serrated diffractive structure are overlapped. Hereupon, the step faces the opposite side to the optical axis in the finer serrated diffractive structure, and the step faces the optical axis side in the rougher serrated diffractive structure. The sectional shape is likely a shape shown in FIG. 2(d). The first basic structure which is the finer serrated diffractive structure is designed so as to makes the light amount of the second order diffracted light of the first light flux larger than the light amount of any diffracted light with other diffraction order (which also includes 0-th order flux, that is, a transmitted light flux), to make the light amount of the first order diffractive light of the second light flux larger than the light amount of any diffracted light with other diffraction order (0 which also includes 0-th order flux, that is, a transmitted light flux), and to make the light amount of the first order diffracted light of the third light flux larger than the light amount of any diffracted light with other diffraction order (which also includes 0-th order flux, that is, a transmitted light flux). Further, the fourth basic structure which is the rougher serrated diffractive structure is designed so as to make the light amount of the fifth order diffractive light of the first light flux larger than the light amount of any diffracted light with other diffraction order, to make the light amount of the third order diffracted light of the second light flux larger than the light amount of any diffracted light of other diffraction order, and to make the light amount of the third and second order diffracted light of the third light flux larger than the light amount of any diffracted light with other diffraction order. Hereupon, in FIG. 2(c) and FIG. 2(d), the sectional shape is exaggeratingly drawn for easy understanding.

The lens data of the examples are shown In Tables 1-1 to 6-4. Hereinafter, the power of 10 will be expressed as by using "E". For example, $2.5 \times 10^{-3}$ will be expressed as 2.5E-3.

Each of optical surfaces of the objective optical system is formed as an aspherical surface, which has a symmetric-shape around the optical axis with defined by substituting the coefficients shown in the tables described later into the expression 21.

$$X(h) = \frac{(h^2/r)}{1 + \sqrt{1 - (1+\kappa)(h/r)^2}} + \sum_{i=0}^{10} A_{2i} h^{2i} \quad (21)$$

Herein, $X(h)$ is the axis along the optical axis (the direction of traveling light is positive direction), $\kappa$ is a conical constant, $A_{2i}$ is an aspherical coefficient, h is the height from the optical axis.

Further, The diffractive structure provides the optical path difference with the light fluxes of respective wavelengths, which is defined by substituting the coefficients shown in the tables shown later into the expression 22.

$$\Phi(h) = \lambda/\lambda_B \times dor \times \sum_{i=0}^{6} C_{2i} h^{2i} \quad (22)$$

Hereupon, $\lambda$ is the wavelength of the incident light flux, $\lambda_B$ is the blaze wavelength, dor is the diffraction order, $C_{2i}$ is the coefficient of the optical path difference function.

Example 1

Figure 5A:
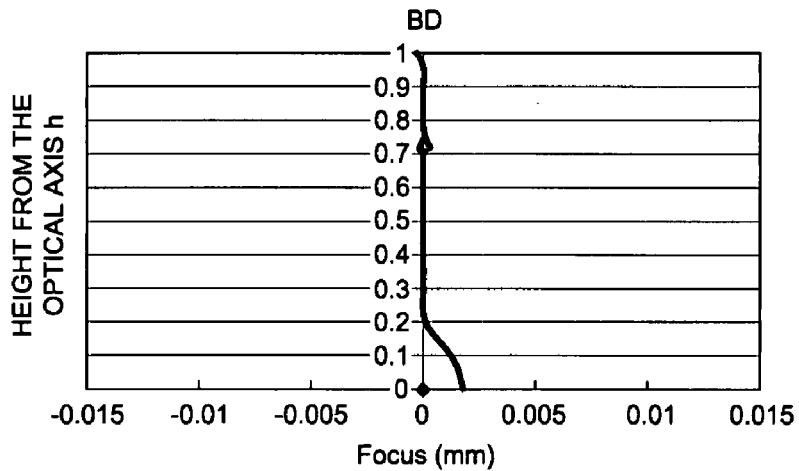
FIGS. 5(a) to 5(c) are vertical spherical aberration diagrams relating to BD, DVD, and CD of Example 1 according to the present invention.
Figure 5B:
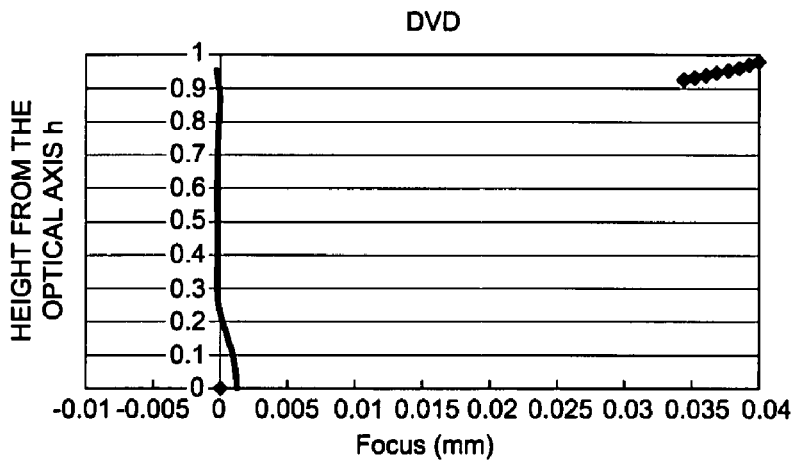
Figure 5C:
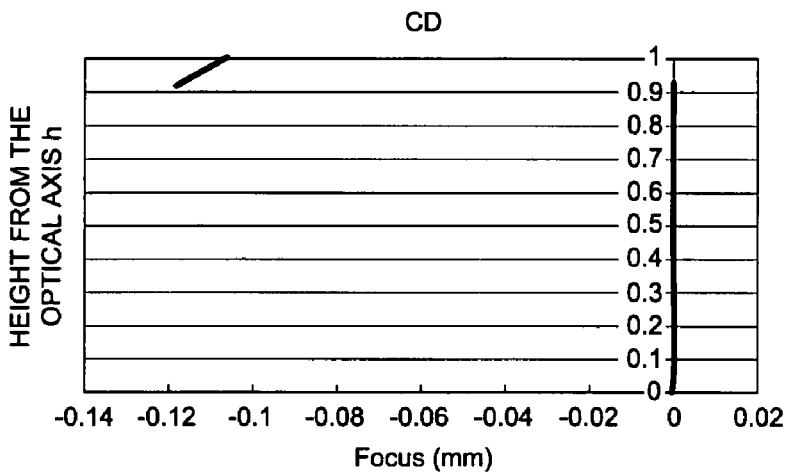

The lens data of Example 1 will be shown in Tables 1-1 to 1-3. Further, FIGS. 5(a), 5(b), and 5(c) show the vertical spherical aberration diagrams of Example 1. The numeral 1.0 of the vertical axis of the vertical spherical aberration diagrams expresses NA 0.85, or a diameter of 3.74 mm in BD; expresses a value slightly larger than NA 0.60, or a diameter of 2.68 mm in DVD; and expresses a value slightly larger than NA 0.45, or a value slightly larger than a diameter of 2.18 mm in CD. Hereupon, L is 0.28 mm in Example 1. Accordingly, it provides L/f=0.28/2.42=0.116.

TABLE 1-1

| Lens Data | | | | | | | |
|---|---|---|---|---|---|---|---|
| Single diffractive lens | | | | | | | |
| Focal length of the objective lens | | $f_1$ = 2.20 mm | | $f_2$ = 2.28 mm | | $f_3$ = 2.42 mm | |
| Numerical aperture | | NA1: 0.85 | | NA2: 0.60 | | NA3: 0.45 | |
| Magnification | | m1: 0 | | m2: 0 | | m3: 0 | |
| The i-th surface | ri | di (405 nm) | ni (405 nm) | di (658 nm) | ni (658 nm) | di (785 nm) | ni (785 nm) |
| 0 | | ∞ | | ∞ | | ∞ | |
| 1 (Stop diameter) | | 0.0 (φ3.74 mm) | | 0.0 (φ2.68 mm) | | 0.0 (φ2.18 mm) | |
| 2 | 1.5795 | 2.430 | 1.605 | 2.430 | 1.586 | 2.430 | 1.582 |
| 2-1 | 1.5799 | | | | | | |
| 2-2 | 1.5804 | | | | | | |
| 2-3 | 1.5810 | | | | | | |
| 2-4 | 1.5793 | | | | | | |

TABLE 1-1-continued

| | | | | | | | |
|---|---|---|---|---|---|---|---|
| 2-5 | 1.5816 | | | | | | |
| 2-6 | 1.5374 | | | | | | |
| 3 | −4.7732 | 0.79 | | 0.54 | | 0.32 | |
| 4 | ∞ | 0.0875 | 1.620 | 0.600 | 1.577 | 1.200 | 1.571 |
| 5 | ∞ | | | | | | |

TABLE 1-2

| | | Surface no. | | | |
|---|---|---|---|---|---|
| | | 2 | 2-1 | 2-2 | 2-3 |
| | | | Area | | |
| | | h ≦ 1.117 | 1.117 ≦ h ≦ 1.178 | 1.178 ≦ h ≦ 1.224 | 1.224 ≦ h ≦ 1.262 |
| Aspheric surface coefficient | κ | −5.1483E−01 | −5.1735E−01 | −5.1984E−01 | −5.2196E−01 |
| | A0 | 0.0000E+00 | −3.4971E−03 | −6.9971E−03 | −1.0502E−02 |
| | A4 | 1.2950E−02 | 1.2950E−02 | 1.2950E−02 | 1.2952E−02 |
| | A6 | 2.6726E−03 | 2.6726E−03 | 2.6726E−03 | 2.6726E−03 |
| | A8 | 3.8605E−03 | 3.8605E−03 | 3.8605E−03 | 3.8605E−03 |
| | A10 | −3.5626E−03 | −3.5626E−03 | −3.5626E−03 | −3.5626E−03 |
| | A12 | 1.3965E−03 | 1.3965E−03 | 1.3965E−03 | 1.3965E−03 |
| | A14 | 8.5125E−05 | 8.5125E−05 | 8.5125E−05 | 8.5125E−05 |
| | A16 | −1.6888E−04 | −1.6888E−04 | −1.6888E−04 | −1.6888E−04 |
| | A18 | 4.5316E−05 | 4.5316E−05 | 4.5316E−05 | 4.5316E−05 |
| | A20 | −4.4456E−06 | −4.4456E−06 | −4.4456E−06 | −4.4456E−06 |
| Optical path difference function | Diffraction order | 2/1/1 | 2/1/1 | 2/1/1 | 2/1/1 |
| | *1 | 395 nm | 395 nm | 395 nm | 395 nm |
| | C2 | −5.4912E−03 | −5.4912E−03 | −5.4912E−03 | −5.4912E−03 |
| | C4 | 2.3942E−03 | 2.3942E−03 | 2.3942E−03 | 2.3942E−03 |
| | C6 | 1.7081E−03 | 1.7081E−03 | 1.7081E−03 | 1.7081E−03 |
| | C8 | −8.9650E−04 | −8.9650E−04 | −8.9650E−04 | −8.9650E−04 |
| | C10 | 2.6700E−04 | 2.6700E−04 | 2.6700E−04 | 2.6700E−04 |
| Optical path difference function | Diffraction order | 0/0/1 | | | |
| | *1 | 785 nm | | | |
| | C2 | 1.5968E−02 | | | |
| | C4 | −7.3725E−04 | | | |
| | C6 | −1.0009E−03 | | | |
| | C8 | 8.1423E−04 | | | |
| | C10 | −2.4796E−04 | | | |

*1: Design wavelength

TABLE 1-3

| | | Surface no. | | | |
|---|---|---|---|---|---|
| | | 2-4 | 2-5 | 2-6 | 3 |
| | | | Area | | |
| | | 1.262 ≦ h ≦ 1.307 | 1.307 ≦ h ≦ 1.355 | 1.355 ≦ h | |
| Aspheric surface coefficient | κ | −5.2821E−01 | −5.2092E−01 | −6.5466E−01 | −1.4057E+01 |
| | A0 | −1.4453E−02 | −1.7566E−02 | 3.2124E−04 | 0.0000E+00 |
| | A4 | 1.2948E−02 | 1.2639E−02 | 1.2109E−02 | 1.4339E−01 |
| | A6 | 2.6726E−03 | 2.6726E−03 | 6.8203E−04 | −1.3569E−01 |
| | A8 | 3.8605E−03 | 3.8605E−03 | 1.8368E−03 | 8.5457E−02 |
| | A10 | −3.5626E−03 | −3.5626E−03 | −1.3166E−03 | −3.5414E−02 |
| | A12 | 1.3965E−03 | 1.3965E−03 | 3.0609E−04 | 8.3196E−03 |
| | A14 | 8.5125E−05 | 8.5125E−05 | 2.2270E−04 | −8.3492E−04 |
| | A16 | −1.6888E−04 | −1.6888E−04 | −1.6894E−04 | 0.0000E+00 |
| | A18 | 4.5316E−05 | 4.5316E−05 | 4.4386E−05 | 0.0000E+00 |
| | A20 | −4.4456E−06 | −4.4456E−06 | −4.3121E−06 | 0.0000E+00 |
| Optical path difference function | Diffraction order | 2/1/1 | 2/1/1 | | |
| | *1 | 395 nm | 395 nm | | |
| | C2 | −5.4912E−03 | −5.4912E−03 | | |
| | C4 | 2.3942E−03 | 2.3942E−03 | | |
| | C6 | 1.7081E−03 | 1.7081E−03 | | |
| | C8 | −8.9650E−04 | −8.9650E−04 | | |
| | C10 | 2.6700E−04 | 2.6700E−04 | | |

TABLE 1-3-continued

| | | Surface no. | | |
|---|---|---|---|---|
| | 2-4 | 2-5 | 2-6 | 3 |
| | | Area | | |
| | $1.262 \leq h \leq 1.307$ | $1.307 \leq h \leq 1.355$ | $1.355 \leq h$ | |
| Optical path difference function | Diffraction order *1 C2 C4 C6 C8 C10 | | | |

*1: Design wavelength

Example 2

Figure 6A:
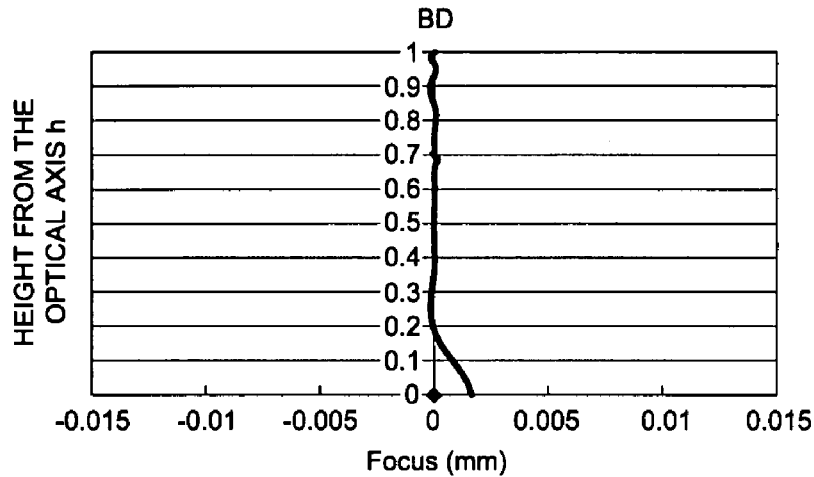
FIGS. 6(a) to 6(c) are vertical spherical aberration diagrams relating to BD, DVD, and CD of Example 2 according to the present invention.
Figure 6B:
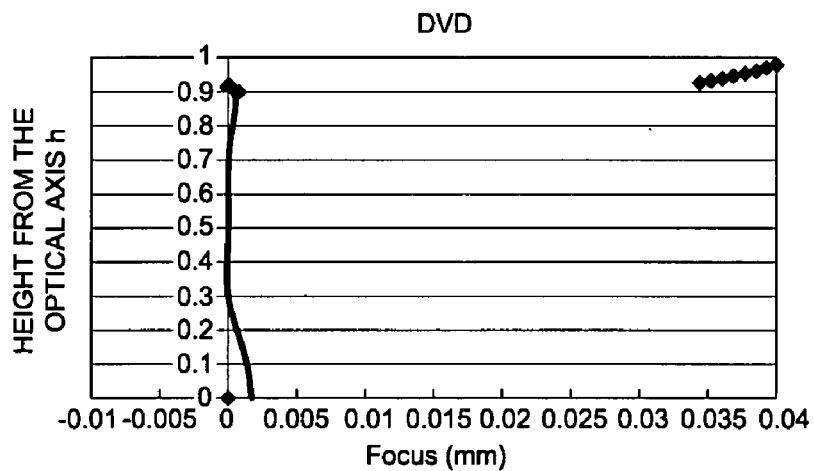
Figure 6C:
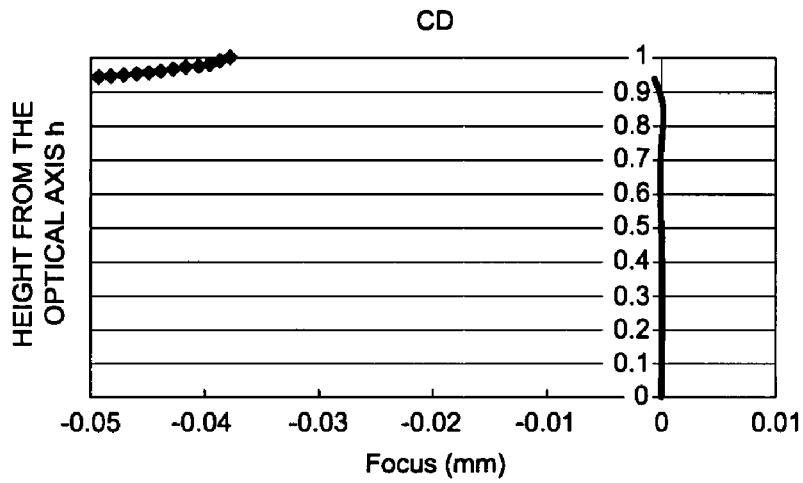

The lens data of Example 2 will be shown in Tables 2-1), to 2-3. Further, FIGS. 6(*a*), 6(*b*), and 6(*c*) show the vertical spherical aberration diagrams of Example 2. The numeral 1.0 of the vertical axis of the vertical spherical aberration diagrams expressions NA 0.85, or a diameter of 3.74 mm in BD; expresses a value slightly larger than NA 0.60, or a diameter of 2.68 mm in DVD; and expresses a value slightly larger than NA 0.45, or a value slightly larger than a diameter of 2.12 mm in CD. Hereupon, L is 0.16 mm in Example 2. Accordingly, it provides L/f=0.16/2.36=0.068.

TABLE 2-1

| Lens Data | | | | |
|---|---|---|---|---|
| Single diffractive lens | | | | |
| Focal length of the objective lens | $f_1$ = 2.20 mm | $f_2$ = 2.28 mm | $f_3$ = 2.36 mm | |
| Numerical aperture | NA1: 0.85 | NA2: 0.60 | NA3: 0.45 | |
| Magnification | m1: 0 | m2: 0 | m3: 0 | |

| The i-th surface | ri | di(405 nm) | ni(405 nm) | di(658 nm) | ni(658 nm) | di(785 nm) | ni(785 nm) |
|---|---|---|---|---|---|---|---|
| 0 | ∞ | | | | | | |
| 1(Stop diameter) | | 0.0 (φ3.74 mm) | | 0.0 (φ2.68 mm) | | 0.0 (φ2.12 mm) | |
| 2 | 1.5810 | 2.430 | 1.605 | 2.430 | 1.586 | 2.430 | 1.582 |
| 2-1 | 1.5825 | | | | | | |
| 2-2 | 1.5820 | | | | | | |
| 2-3 | 1.5809 | | | | | | |
| 2-4 | 1.5808 | | | | | | |
| 2-5 | 1.5811 | | | | | | |
| 2-6 | 1.5316 | | | | | | |
| 3 | −4.7543 | 0.79 | | 0.54 | | 0.26 | |
| 4 | ∞ | 0.0875 | 1.620 | 0.600 | 1.577 | 1.200 | 1.571 |
| 5 | ∞ | | | | | | |

TABLE 2-2

| | | Surface no. | | | |
|---|---|---|---|---|---|
| | | 2 | 2-1 | 2-2 | 2-3 |
| | | | Area | | |
| | | $h \leq 1.116$ | $1.116 \leq h \leq 1.197$ | $1.197 \leq h \leq 1.239$ | $1.239 \leq h \leq 1.273$ |
| Aspheric surface coefficient | κ | −5.0687E−01 | −5.0696E−01 | −5.1166E−01 | −5.1724E−01 |
| | A0 | 0.0000E+00 | −3.3441E−03 | −7.0033E−03 | −1.0810E−02 |
| | A4 | 1.3630E−02 | 1.3630E−02 | 1.3630E−02 | 1.3630E−02 |
| | A6 | 2.1948E−03 | 2.1948E−03 | 2.1948E−03 | 2.1948E−03 |
| | A8 | 3.9803E−03 | 3.9803E−03 | 3.9803E−03 | 3.9803E−03 |
| | A10 | −3.7498E−03 | −3.7498E−03 | −3.7498E−03 | −3.7498E−03 |
| | A12 | 1.4932E−03 | 1.4932E−03 | 1.4932E−03 | 1.4932E−03 |
| | A14 | 7.7535E−05 | 7.7535E−05 | 7.7535E−05 | 7.7535E−05 |
| | A16 | −1.6888E−04 | −1.6888E−04 | −1.6888E−04 | −1.6888E−04 |
| | A18 | 4.5316E−05 | 4.5316E−05 | 4.5316E−05 | 4.5316E−05 |
| | A20 | −4.4456E−06 | −4.4456E−06 | −4.4456E−06 | −4.4456E−06 |

TABLE 2-2-continued

| | | Surface no. | | | |
|---|---|---|---|---|---|
| | | 2 | 2-1 | 2-2 | 2-3 |
| | | | Area | | |
| | | $h \leq 1.116$ | $1.116 \leq h \leq 1.197$ | $1.197 \leq h \leq 1.239$ | $1.239 \leq h \leq 1.273$ |
| Optical path difference function | Diffraction order | 2/1/1 | 2/1/1 | 2/1/1 | 2/1/1 |
| | *1 | 395 nm | 395 nm | 395 nm | 395 nm |
| | C2 | −5.5507E−03 | −5.5507E−03 | −5.5507E−03 | −5.5507E−03 |
| | C4 | 2.6083E−03 | 2.6083E−03 | 2.6083E−03 | 2.6083E−03 |
| | C6 | 1.6957E−03 | 1.6957E−03 | 1.6957E−03 | 1.6957E−03 |
| | C8 | −1.0148E−03 | −1.0148E−03 | −1.0148E−03 | −1.0148E−03 |
| | C10 | 3.1382E−04 | 3.1382E−04 | 3.1382E−04 | 3.1382E−04 |
| Optical path difference function | Diffraction order | 0/0/1 | | | |
| | *1 | 785 nm | | | |
| | C2 | 1.0109E−02 | | | |
| | C4 | −5.6774E−04 | | | |
| | C6 | −1.8990E−03 | | | |
| | C8 | 1.5121E−03 | | | |
| | C10 | −4.9017E−04 | | | |

*1: Design wavelength

TABLE 2-3

| | | Surface no. | | | |
|---|---|---|---|---|---|
| | | 2-4 | 2-5 | 2-6 | 3 |
| | | | Area | | |
| | | $1.273 \leq h \leq 1.316$ | $1.316 \leq h \leq 1.351$ | $1.351 \leq h$ | |
| Aspheric surface coefficient | κ | −5.2032E−01 | −5.2211E−01 | −6.5466E−01 | −1.4567E+01 |
| | A0 | −1.4468E−02 | −1.8188E−02 | 2.0102E−03 | 0.0000E+00 |
| | A4 | 1.3630E−02 | 1.3629E−02 | 1.2109E−02 | 1.4319E−01 |
| | A6 | 2.1948E−03 | 2.1948E−03 | 6.8203E−04 | −1.3589E−01 |
| | A8 | 3.9803E−03 | 3.9803E−03 | 1.8368E−03 | 8.5430E−02 |
| | A10 | −3.7498E−03 | −3.7498E−03 | −1.3166E−03 | −3.5356E−02 |
| | A12 | 1.4932E−03 | 1.4932E−03 | 3.0609E−04 | 8.2999E−03 |
| | A14 | 7.7536E−05 | 7.7535E−05 | 2.2270E−04 | −8.3293E−04 |
| | A16 | −1.6888E−04 | −1.6888E−04 | −1.6894E−04 | 0.0000E+00 |
| | A18 | 4.5316E−05 | 4.5316E−05 | 4.4386E−05 | 0.0000E+00 |
| | A20 | −4.4456E−06 | −4.4456E−06 | −4.3121E−06 | 0.0000E+00 |
| Optical path difference function | Diffraction order | 2/1/1 | 2/1/1 | | |
| | *1 | 395 nm | 395 nm | | |
| | C2 | −5.5507E−03 | −5.5507E−03 | | |
| | C4 | 2.6083E−03 | 2.6083E−03 | | |
| | C6 | 1.6957E−03 | 1.6957E−03 | | |
| | C8 | −1.0148E−03 | −1.0148E−03 | | |
| | C10 | 3.1382E−04 | 3.1382E−04 | | |
| Optical path difference function | Diffraction order | | | | |
| | *1 | | | | |
| | C2 | | | | |
| | C4 | | | | |
| | C6 | | | | |
| | C8 | | | | |
| | C10 | | | | |

*1: Design wavelength

Example 3

Figure 7:
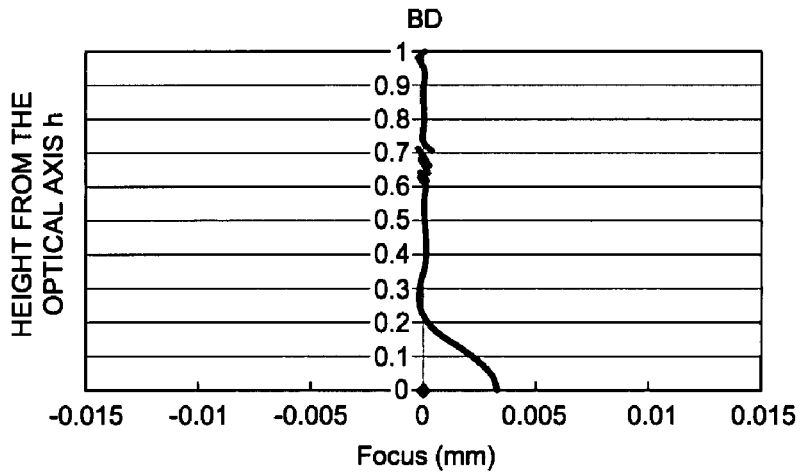
FIGS. 7(a) to 7(c) are vertical spherical aberration diagrams relating to BD, DVD, and CD of Example 3 according to the present invention.
Figure 7:
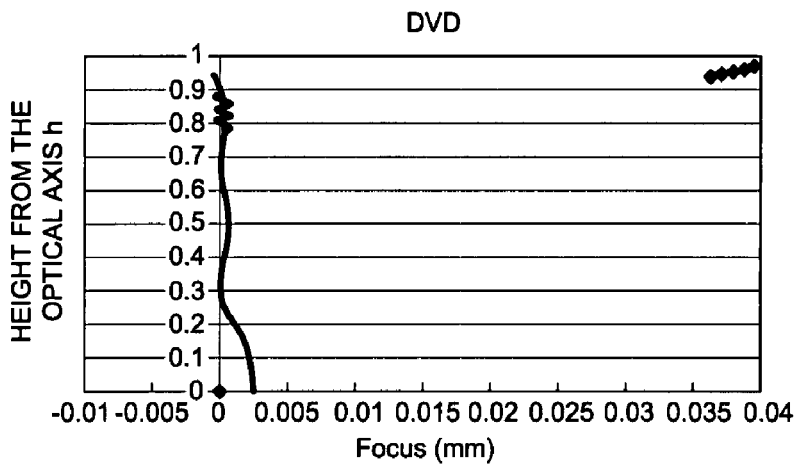
Figure 7:
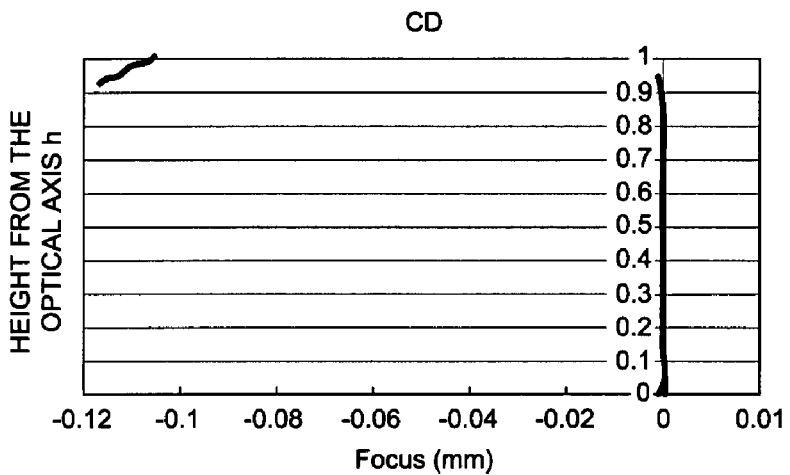

The lens data of Example 31 will be shown in Tables 3-1), to 3-3. Further, FIGS. 7(a), 7(b), and 7(c) show the vertical spherical aberration diagrams of Example 2. The numeral 1.0 of the vertical axis of the vertical spherical aberration diagram expresses NA 0.85 or a diameter of 3.74 mm in BD, expresses a value slightly larger than NA 0.60, or a diameter of 2.68 mm in DVD, and expresses a value slightly larger than NA 0.45, or a value slightly larger than a diameter of 2.17 mm in CD. Hereupon, L is 0.28 mm in Example 3. Accordingly, it provides L/f=0.28/2.43=0.115.

TABLE 3-1

Lens Data

Single diffraction lens
Focal length of the objective lens  $f_1$ = 2.20 mm   $f_2$ = 2.28 mm   $f_3$ = 2.43 mm
Numerical aperture   NA1: 0.85   NA2: 0.60   NA3: 0.45
Magnification   m1: 0   m2: 0   m3: 0

| The i-th surface | ri | di(405 nm) | ni(405 nm) | di(658 nm) | ni(658 nm) | di(785 nm) | ni(785 nm) |
|---|---|---|---|---|---|---|---|
| 0 | ∞ | | | ∞ | | ∞ | |
| 1(Stop diameter) | | 0.0 (φ3.74 mm) | | 0.0 (φ2.68 mm) | | 0.0 (φ2.17 mm) | |
| 2 | 1.5559 | 2.370 | 1.605 | 2.370 | 1.586 | 2.370 | 1.582 |
| 2-1 | 1.5627 | | | | | | |
| 2-2 | 1.5653 | | | | | | |
| 2-3 | 1.5643 | | | | | | |
| 2-4 | 1.5658 | | | | | | |
| 2-5 | 1.5648 | | | | | | |
| 3 | −5.1533 | 0.82 | | 0.57 | | 0.36 | |
| 4 | ∞ | 0.0875 | 1.620 | 0.600 | 1.577 | 1.200 | 1.571 |
| 5 | ∞ | | | | | | |

TABLE 3-2

| | | Surface no. | | | |
|---|---|---|---|---|---|
| | | 2 | 2-1 | 2-2 | 2-3 |
| | | | Area | | |
| | | h ≤ 1.110 | 1.110 ≤ h ≤ 1.179 | 1.179 ≤ h ≤ 1.218 | 1.218 ≤ h ≤ 1.278 |
| Aspheric surface coefficient | κ | −5.3140E−01 | −5.2257E−01 | −5.2131E−01 | −5.2861E−01 |
| | A0 | 0.0000E+00 | −6.0616E−03 | −9.0884E−03 | −1.2687E−02 |
| | A4 | 1.2538E−02 | 1.2538E−02 | 1.2538E−02 | 1.2538E−02 |
| | A6 | 1.5730E−03 | 1.5730E−03 | 1.5730E−03 | 1.5730E−03 |
| | A8 | 7.8213E−03 | 7.8213E−03 | 7.8213E−03 | 7.8213E−03 |
| | A10 | −6.6801E−03 | −6.6801E−03 | −6.6801E−03 | −6.6801E−03 |
| | A12 | 2.5319E−03 | 2.5319E−03 | 2.5319E−03 | 2.5319E−03 |
| | A14 | −7.3283E−05 | −7.3283E−05 | −7.3283E−05 | −7.3283E−05 |
| | A16 | −1.6888E−04 | −1.6888E−04 | −1.6888E−04 | −1.6888E−04 |
| | A18 | 4.5316E−05 | 4.5316E−05 | 4.5316E−05 | 4.5316E−05 |
| | A20 | −4.4456E−06 | −4.4456E−06 | −4.4456E−06 | −4.4456E−06 |
| Optical path difference function | Diffraction order | 2/1/1 | 2/1/1 | 2/1/1 | 2/1/1 |
| | *1 | 395 nm | 395 nm | 395 nm | 395 nm |
| | C2 | −4.2889E−03 | −4.2889E−03 | −4.2889E−03 | −4.2889E−03 |
| | C4 | 1.6784E−03 | 1.6784E−03 | 1.6784E−03 | 1.6784E−03 |
| | C6 | 2.4623E−03 | 2.4623E−03 | 2.4623E−03 | 2.4623E−03 |
| | C8 | −1.1484E−03 | −1.1484E−03 | −1.1484E−03 | −1.1484E−03 |
| | C10 | 3.0281E−04 | 3.0281E−04 | 3.0281E−04 | 3.0281E−04 |
| Optical path difference function | Diffraction order | 0/0/1 | | | |
| | *1 | 785 nm | | | |
| | C2 | 1.6209E−02 | | | |
| | C4 | −4.2084E−04 | | | |
| | C6 | −1.8779E−03 | | | |
| | C8 | 1.5357E−03 | | | |
| | C10 | −4.6042E−04 | | | |

*1: Design wavelength

TABLE 3-3

| | | Surface no. | | |
|---|---|---|---|---|
| | | 2-4 | 2-5 | 3 |
| | | | Area | |
| | | 1.278 ≦ h ≦ 1.346 | 1.346 ≦ h | |
| Aspheric surface coefficient | κ | −5.3306E−01 | −6.5475E−01 | −9.8372E+00 |
| | A0 | −1.9455E−02 | 8.6537E−02 | 0.0000E+00 |
| | A4 | 1.2538E−02 | 1.5782E−02 | 1.4197E−01 |
| | A6 | 1.5730E−03 | 9.9623E−04 | −1.3547E−01 |
| | A8 | 7.8213E−03 | 1.7248E−03 | 8.6460E−02 |
| | A10 | −6.6801E−03 | −1.3501E−03 | −3.5392E−02 |
| | A12 | 2.5319E−03 | 3.0344E−04 | 8.0551E−03 |
| | A14 | −7.3283E−05 | 2.2480E−04 | −7.7385E−04 |
| | A16 | −1.6888E−04 | −1.6807E−04 | 0.0000E+00 |
| | A18 | 4.5316E−05 | 4.4386E−05 | 0.0000E+00 |
| | A20 | −4.4456E−06 | −4.3584E−06 | 0.0000E+00 |
| Optical path difference function | Diffraction order | 2/1/1 | | |
| | *1 | | 395 nm | |
| | C2 | −4.2889E−03 | | |
| | C4 | 1.6784E−03 | | |
| | C6 | 2.4623E−03 | | |
| | C8 | −1.1484E−03 | | |
| | C10 | 3.0281E−04 | | |
| Optical path difference function | Diffraction order | | | |
| | *1 | | | |
| | C2 | | | |
| | C4 | | | |
| | C6 | | | |
| | C8 | | | |
| | C10 | | | |

*1: Design wavelength

Example 4

In Example 4, the objective optical element is a single plastic lens formed of polyolefin. The objective optical element comprises an optical surface comprising the central area CN, the peripheral area MD, and the most peripheral area OT. The first optical path difference providing structure is formed on the entire surface of central area CN on the optical surface. The second optical path difference providing structure is formed on the entire surface of the peripheral area MD on the optical surface. The third optical path difference providing structure is formed on the entire surface of the most peripheral area OT on the optical surface.

Further, in the Example 4, the first optical path difference providing structure is the structure formed by overlapping the first basic structure, the second basic structure and the third basic structure, and having a shape in which two kinds of the serrated diffractive structures and a binary structure are overlapped. The sectional shape of the first optical path difference providing structure is shown as a portion represented as CN in FIG. 8. The third basic structure is a serrated diffractive structure and is designed so as to make the light amount of the tenth order diffracted light of the first light flux larger than the light amount of any diffractive light with other diffraction order (which also includes 0-th order flux, that is, a transmitted light flux), to make the light amount of the sixth order diffracted light of the second light flux larger than the light amount of any diffracted light with other diffraction order (which also includes 0-th order flux, that is, a transmitted light flux), and to make the light amount of the fifth order diffracted light of the third light flux larger than the light amount of any diffracted light with other diffraction order (which also includes 0-th order flux, that is, a transmitted light flux). The step amount in the direction of the optical axis of the step in the first basic structure is the step amount providing optical path difference which is about two times of the first wavelength for the first light flux, also providing optical path difference which is about 1.2 times of the second wavelength for the second light flux and further providing optical path difference which is about 1 time of the third wavelength for the third light flux. The step amount in the direction of the optical axis of the step in the second basic structure is the step amount providing optical path difference which is about five times of the first wavelength for the first light flux, also providing optical path difference which is about three times of the second wavelength for the second light flux and further providing optical path difference which is about 2.5 times of the third wavelength for the third light flux. The step amount in the direction of the optical axis of the step in the third basic structure is the step amount providing optical path difference which is about ten times of the first wavelength for the first light flux, also providing optical path difference which is about six times of the second wavelength for the second light flux and further providing optical path difference which is about five times of the third wavelength for the third light flux. The third basic structure is provided on a basic aspheric surface which is different from a basic aspheric surface on which the first basic structure and the second basic structure are provided.

Figure 8:
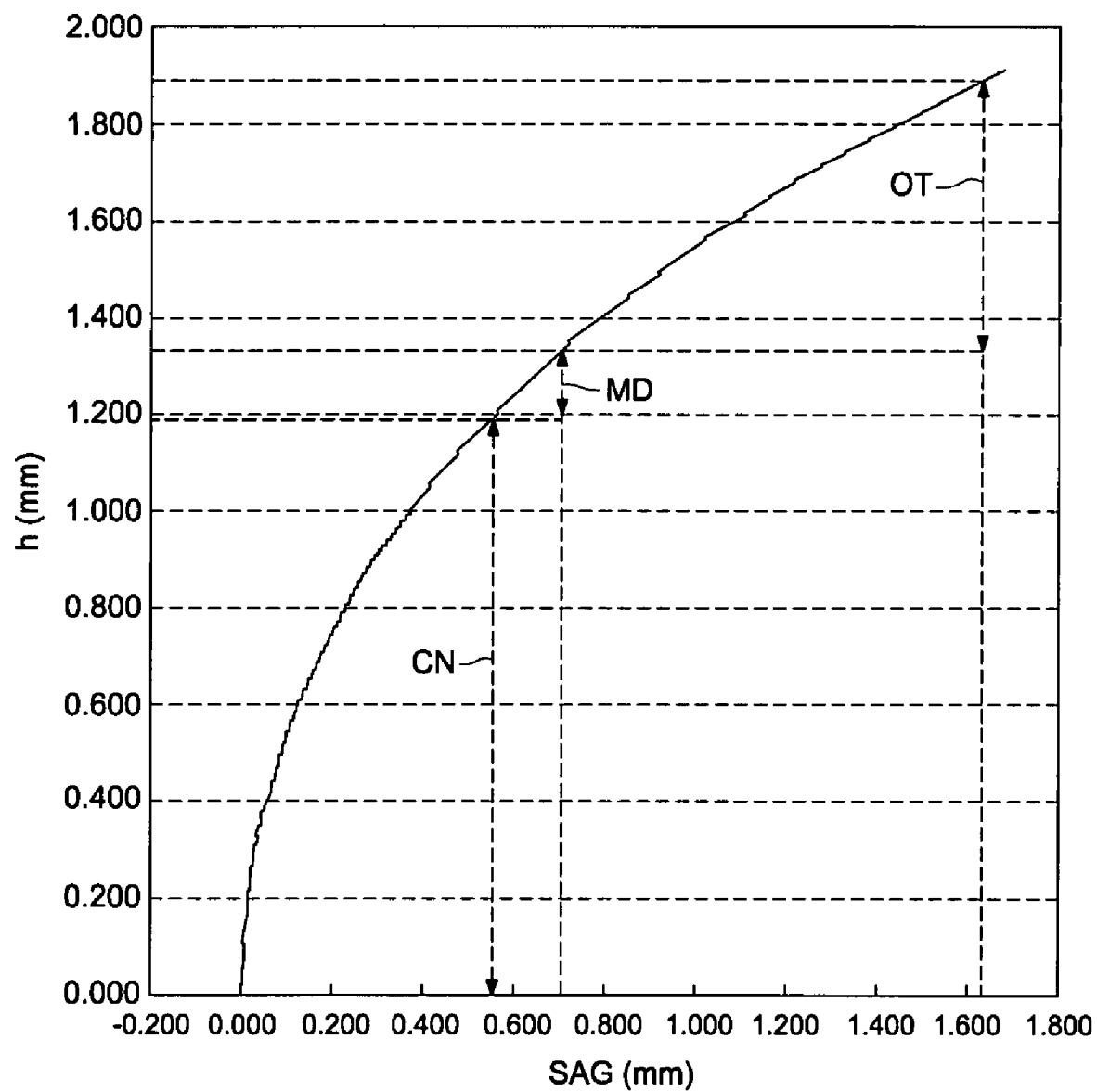
FIG. 8 is a sectional view typically showing the optical path difference providing structure of the objective optical element in Example 4 according to the present invention.

In Example 4, the second optical path difference providing structure is the structure formed by overlapping the first basic structure and the fourth basic structure as shown as MD in FIG. 8, and has a shape in which two kinds of the serrated diffractive structures are overlapped. The step amount in the direction of the optical axis of the step in the fourth basic structure is the step amount providing optical path difference which is about five times of the first wavelength for the first light flux, also providing optical path difference which is about three times of the second wavelength for the second light flux and further providing optical path difference which is about 2.5 times of the third wavelength for the third light flux. The fourth basic structure is provided on a basic aspheric surface which is different from a basic aspheric surface on which the first basic structure is provided. The third basic structure in the first optical path difference providing structure and the fourth basic structure in the second optical path difference providing structure are continuous. The third basic structure and the fourth basic structure are the structure in which the depth of the third basic structure in the direction of the optical axis becomes deeper as farther from the optical axis in the direction perpendicular to the optical axis till the boundary between the first optical path difference providing structure and the second optical path difference providing structure, and then in the area farther from the optical axis than the boundary, the depth of the fourth basic structure in the direction of the optical axis becomes shallower as farther from the optical axis in the direction perpendicular to the optical axis.

In the Example 4, the third optical path difference providing structure is the structure having only the fourth basic structure as shown as OT in FIG. 8, and has a shape which has only one kind of serrated diffractive structure. The third basic structure in the third optical path difference providing structure is not the structure in which the depth of the structure in the direction of the optical axis becomes deeper as farther from the optical axis in the direction perpendicular to the optical axis till one point, and then in the area farther from the optical axis than the one point, the depth of the structure in the direction of the optical axis becomes shallower as farther from the optical axis in the direction perpendicular to the optical axis.

Figure 9:
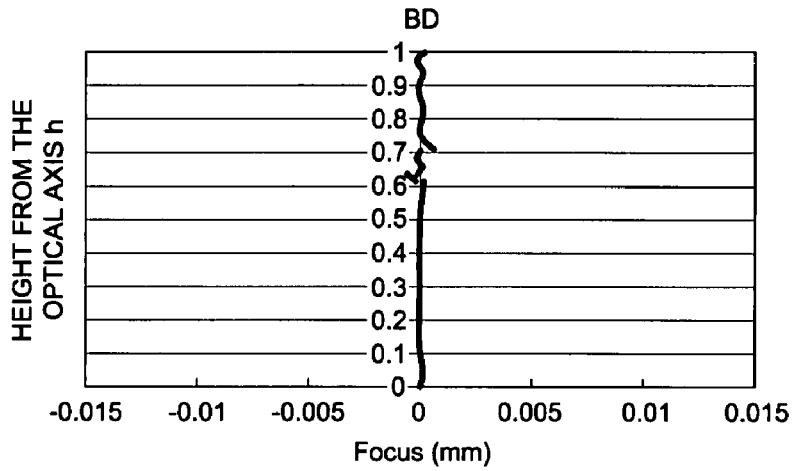
FIGS. 9(a) to 9(c) are vertical spherical aberration diagrams relating to BD, DVD, and CD of Example 4 according to the present invention.
Figure 9:
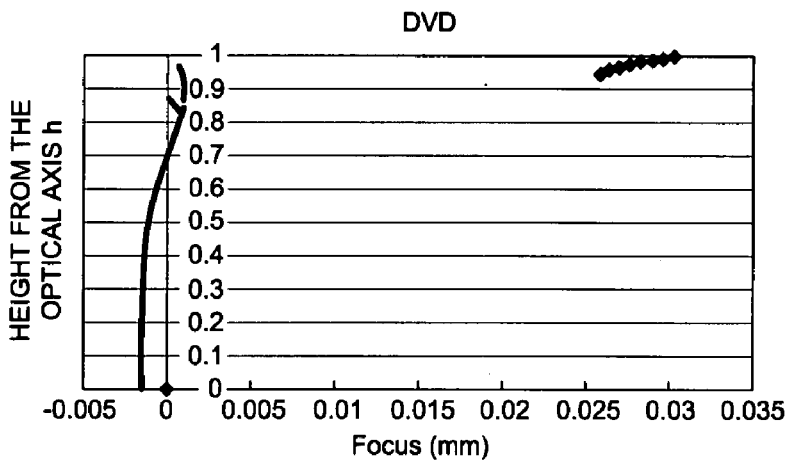
Figure 9:
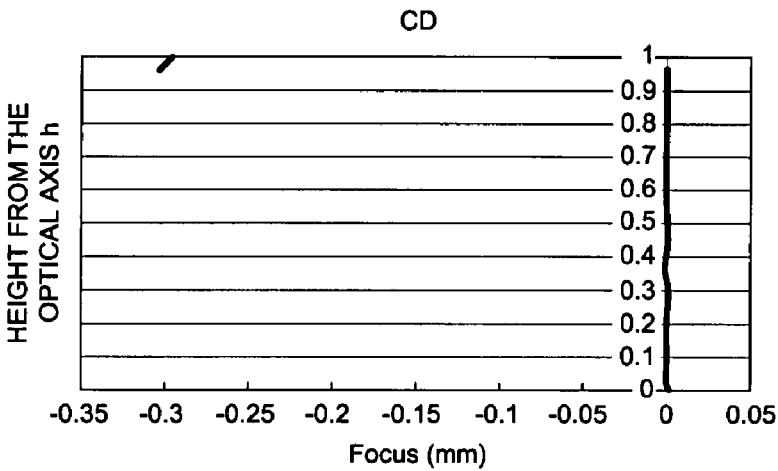

The lens data of Example 4 will be shown in Tables 4-1 to 4-4. Further, FIGS. 9(a) to 9(c) shows the vertical spherical aberration diagrams of Example 4. The numeral 1.0 of the vertical axis of the vertical spherical aberration diagrams expresses NA 0.85 or a diameter of 3.74 mm in BD, expresses a value slightly larger than NA 0.60, or a value slightly larger than a diameter of 2.70 mm in DVD, and expresses a value slightly larger than NA 0.45, or a value slightly larger than a diameter of 2.37 mm in CD. Hereupon, L is 0.60 mm in Example 4. Accordingly, it provides L/f=0.60/2.53=0.237.

The entire of ring-shaped zones of the first optical path difference providing structure in Example 4 can be classified to the groups: a group of a step amount in the range of 3.62 μm to 4.23 μm; and a group of a step amount in the range of 2.22 μm to 2.56 μm. Here, $\lambda B$ is 405 nm. $\lambda B'$ is an arbitral value in the range of 390 nm to 400 nm. Accordingly, each of the entire ring shaped zones in the first optical path difference providing structure in Example 4 has a step amount satisfying any one of dC and dD. Each of the entire ring shaped zones in the first optical path difference providing structure has a pitch difference within the range of 5.3 μm to 110 μm. Each of the entire ring shaped zones in the first optical path difference providing structure has a value of (step amount/pitch width) being 0.8 or less.

TABLE 4-1

Lens Data

| | | | | |
|---|---|---|---|---|
| Single diffraction lens | | | | |
| Focal length of the objective lens | | $f_1$ = 2.20 mm | $f_2$ = 2.28 mm | $f_3$ = 2.53 mm |
| Numerical aperture | | NA1: 0.85 | NA2: 0.60 | NA3: 0.45 |
| Magnification | | m1: 0 | m2: 0 | m3: 0 |

| The i-th surface | ri | di(405 nm) | ni(405 nm) | di(658 nm) | ni(658 nm) | di(785 nm) | ni(785 nm) |
|---|---|---|---|---|---|---|---|
| 0 | ∞ | | | | | | |
| 1(Stop diameter) | | 0.0 (φ3.74 mm) | | 0.0 (φ2.70 mm) | | 0.0 (φ2.37 mm) | |
| 2 | 1.5656 | 2.680 | 1.561 | 2.680 | 1.540 | 2.680 | 1.536 |
| 2-1 | 1.5626 | | | | | | |
| 2-2 | 1.5595 | | | | | | |
| 2-3 | 1.5570 | | | | | | |
| 2-4 | 1.5661 | | | | | | |
| 2-5 | 1.5633 | | | | | | |
| 2-6 | 1.5643 | | | | | | |
| 2-7 | 1.5657 | | | | | | |
| 2-8 | 1.5656 | | | | | | |
| 2-9 | 1.53232 | | | | | | |
| 3 | −2.8740 | 0.67 | | 0.43 | | 0.41 | |
| 4 | ∞ | 0.0875 | 1.620 | 0.600 | 1.577 | 1.200 | 1.571 |
| 5 | ∞ | | | | | | |

TABLE 4-2

| | | Surface no. | | | |
|---|---|---|---|---|---|
| | | 2 | 2-1 | 2-2 | 2-3 |
| | | | Area | | |
| | | h ≦ 0.3982 | 0.3982 ≦ h ≦ 0.6392 | 0.6392 ≦ h ≦ 0.9173 | 0.9173 ≦ h ≦ 1.2020 |
| Aspheric surface coefficient | κ | −0.545763E+00 | −0.544149E+00 | −0.543545E+00 | −0.540372E+00 |
| | A0 | 0.000000E+00 | 0.723148E−02 | 0.144639E−01 | 0.217471E−01 |
| | A4 | 0.173456E−01 | 0.173456E−01 | 0.173456E−01 | 0.173456E−01 |
| | A6 | 0.161268E−02 | 0.161268E−02 | 0.161268E−02 | 0.161268E−02 |
| | A8 | 0.227272E−02 | 0.227272E−02 | 0.227272E−02 | 0.227272E−02 |
| | A10 | −0.176212E−02 | −0.176212E−02 | −0.176212E−02 | −0.176212E−02 |
| | A12 | 0.832672E−03 | 0.832672E−03 | 0.832672E−03 | 0.832672E−03 |
| | A14 | 0.306247E−03 | 0.306247E−03 | 0.306247E−03 | 0.306247E−03 |
| | A16 | −0.312510E−03 | −0.312510E−03 | −0.312510E−03 | −0.312510E−03 |
| | A18 | 0.779196E−04 | 0.779196E−04 | 0.779196E−04 | 0.779196E−04 |
| | A20 | −0.382183E−05 | −0.382183E−05 | −0.382183E−05 | −0.382183E−05 |
| Optical path difference function | Diffraction order | 2/1/1 | 2/1/1 | 2/1/1 | 2/1/1 |
| | *1 | 395 nm | 395 nm | 395 nm | 395 nm |
| | C2 | −7.9481E−03 | −7.9481E−03 | −7.9481E−03 | −7.9481E−03 |
| | C4 | 3.1618E−03 | 3.1618E−03 | 3.1618E−03 | 3.1618E−03 |
| | C6 | 2.6104E−04 | 2.6104E−04 | 2.6104E−04 | 2.6104E−04 |
| | C8 | −1.5449E−04 | −1.5449E−04 | −1.5449E−04 | −1.5449E−04 |
| | C10 | 1.3011E−04 | 1.3011E−04 | 1.3011E−04 | 1.3011E−04 |

TABLE 4-2-continued

| | | Surface no. | | | |
|---|---|---|---|---|---|
| | | 2 | 2-1 | 2-2 | 2-3 |
| | | | Area | | |
| | | $h \leqq 0.3982$ | $0.3982 \leqq h \leqq 0.6392$ | $0.6392 \leqq h \leqq 0.9173$ | $0.9173 \leqq h \leqq 1.2020$ |
| Optical path difference function | Diffraction order | 0/0/1 | 0/0/1 | 0/0/1 | 0/0/1 |
| | *1 | 785 nm | 785 nm | 785 nm | 785 nm |
| | C2 | 3.2600E−02 | 3.2600E−02 | 3.2600E−02 | 3.2600E−02 |
| | C4 | −3.0280E−03 | −3.0280E−03 | −3.0280E−03 | −3.0280E−03 |
| | C6 | 2.4526E−03 | 2.4526E−03 | 2.4526E−03 | 2.4526E−03 |
| | C8 | −1.0989E−03 | −1.0989E−03 | −1.0989E−03 | −1.0989E−03 |
| | C10 | 2.4093E−04 | 2.4093E−04 | 2.4093E−04 | 2.4093E−04 |

*1: Design wavelength

TABLE 4-3

| | | Surface no. | | | |
|---|---|---|---|---|---|
| | | 2-4 | 2-5 | 2-6 | 2-7 |
| | | | Area | | |
| | | $1.2020 \leqq h \leqq 1.2390$ | $1.2390 \leqq h \leqq 1.2677$ | $1.2677 \leqq h \leqq 1.3121$ | $1.3121 \leqq h \leqq 1.3466$ |
| Aspheric surface coefficient | κ | −0.523735E+00 | −0.534676E+00 | −0.540742E+00 | −0.536630E+00 |
| | A0 | 0.193505E−01 | 0.150921E−01 | 0.113044E−01 | 0.782945E−02 |
| | A4 | 0.173456E−01 | 0.173485E−01 | 0.175724E−01 | 0.172773E−01 |
| | A6 | 0.161268E−02 | 0.161268E−02 | 0.161268E−02 | 0.161268E−02 |
| | A8 | 0.227272E−02 | 0.227272E−02 | 0.227272E−02 | 0.227272E−02 |
| | A10 | −0.176212E−02 | −0.176212E−02 | −0.176212E−02 | −0.176212E−02 |
| | A12 | 0.832672E−03 | 0.832672E−03 | 0.832672E−03 | 0.832672E−03 |
| | A14 | 0.306247E−03 | 0.306247E−03 | 0.306247E−03 | 0.306247E−03 |
| | A16 | −0.312510E−03 | −0.312510E−03 | −0.312510E−03 | −0.312510E−03 |
| | A18 | 0.779196E−04 | 0.779196E−04 | 0.779196E−04 | 0.779196E−04 |
| | A20 | −0.382183E−05 | −0.382183E−05 | −0.382183E−05 | −0.382183E−05 |
| Optical path difference function | Diffraction order | 2/1/1 | 2/1/1 | 2/1/1 | 2/1/1 |
| | *1 | 395 nm | 395 nm | 395 nm | 395 nm |
| | C2 | −7.9481E−03 | −7.9481E−03 | −7.9481E−03 | −7.9481E−03 |
| | C4 | 3.1618E−03 | 3.1618E−03 | 3.1618E−03 | 3.1618E−03 |
| | C6 | 2.6104E−04 | 2.6104E−04 | 2.6104E−04 | 2.6104E−04 |
| | C8 | −1.5449E−04 | −1.5449E−04 | −1.5449E−04 | −1.5449E−04 |
| | C10 | 1.3011E−04 | 1.3011E−04 | 1.3011E−04 | 1.3011E−04 |
| Optical path difference function | Diffraction order | | | | |
| | *1 | | | | |
| | C2 | | | | |
| | C4 | | | | |
| | C6 | | | | |
| | C8 | | | | |
| | C10 | | | | |

*1: Design wavelength

TABLE 4-4

| | | Surface no. | | |
|---|---|---|---|---|
| | | 2-8 | 2-9 | 3 |
| | | | Area | |
| | | $1.3466 \leqq h \leqq 1.3751$ | $1.3751 \leqq h$ | |
| Aspheric surface coefficient | κ | −0.545757E+00 | −0.616167E+00 | −5.4022E+01 |
| | A0 | 0.150988E−04 | 0.341800E−01 | 0.0000E+00 |
| | A4 | 0.173456E−01 | 0.132229E−01 | 1.0541E−01 |
| | A6 | 0.161240E−02 | 0.544502E−04 | −1.0213E−01 |
| | A8 | 0.227272E−02 | 0.262231E−02 | 7.4675E−02 |
| | A10 | −0.176212E−02 | −0.156680E−02 | −4.3240E−02 |
| | A12 | 0.832672E−03 | 0.226928E−03 | 1.4629E−02 |
| | A14 | 0.306247E−03 | 0.239248E−03 | −2.0762E−03 |
| | A16 | −0.312510E−03 | −0.165881E−03 | 0.0000E+00 |

TABLE 4-4-continued

| | | Surface no. | | |
|---|---|---|---|---|
| | | 2-8 | 2-9 | 3 |
| | | | Area | |
| | | $1.3466 \leq h \leq 1.3751$ | $1.3751 \leq h$ | |
| | A18 | 0.779196E−04 | 0.451501E−04 | 0.0000E+00 |
| | A20 | −0.382183E−05 | −0.472873E−05 | 0.0000E+00 |
| Optical path difference function | Diffraction order | 2/1/1 | 5/3/2 | |
| | *1 | 395 nm | 405 nm | |
| | C2 | −7.9481E−03 | −1.0012E−03 | |
| | C4 | 3.1618E−03 | −1.0849E−04 | |
| | C6 | 2.6104E−04 | 1.2384E−05 | |
| | C8 | −1.5449E−04 | −5.9681E−06 | |
| | C10 | 1.3011E−04 | −8.9463E−06 | |
| Optical path difference function | Diffraction order | | | |
| | *1 | | | |
| | C2 | | | |
| | C4 | | | |
| | C6 | | | |
| | C8 | | | |
| | C10 | | | |

*1: Design wavelength

Further, as for the temperature characteristics of the objective optical element in the Example 4, δSAT1 is +0.0033 WFEλrms/° C., and δSAT2 is +0.0019 WFEλrms/° C. Further, because f of the objective optical element for the first wavelength is 2.2 mm, δSAT1/f is +0.0015 WFEλrms/(° C.·mm), and δSAT2/f is +0.0009 WFEλrms/(° C.·mm). Further, as for the wavelength characteristics of the objective optical element of the Example 4, δSAλ is −0.03 λrms/nm, and δSAλ/f is −0.0136 λrms/(nm·mm). Hereupon, the using wavelength is 405 nm, and the ambient temperature for the wavelength characteristics is 25° C.

Furthermore, in case that there is provided collimator lens CL which is a single lens formed of the same material (polyolefin plastic) as the objective optical element, and the collimator lens is used for Example 4 with being combined with the objective optical element in Example 4, δSAT3 is +0.0004 WFEλrms/° C., and δSAT3/f is +0.0002 WFEλrms/(° C.·mm). The lens data of the collimator lens will be shown in Table 5.

TABLE 5

Lens Data

Plastic Normal Collimator
Focal length of the collimating lens  $f_1$ = 17.5 mm, $f_2$ = 18.1 mm, $f_3$ = 18.2 mm

| The i-th surface | ri | di(405 nm) | ni(405 nm) | di(658 nm) | ni(658 nm) | di(785 nm) | ni(785 nm) |
|---|---|---|---|---|---|---|---|
| 0 | ∞ | ∞ | | ∞ | | ∞ | |
| 1(Stop diameter) | ∞ | 0.0 (φ4.2 mm) | | 0.0 (φ4.2 mm) | | 0.0 (φ4.2 mm) | |
| 2 | 10.9657 | 1.900 | 1.545 | 1.900 | 1.527 | 1.900 | 1.524 |
| 3 | −68.6939 | 5.000 | | 5.000 | | 5.000 | |
| 4 | ∞ | 8.000 | 1.530 | 8.000 | 1.514 | 8.000 | 1.511 |
| 5 | ∞ | 6.145 | | 6.661 | | 6.764 | |
| 6 | ∞ | | | | | | |

| | | Surface no. | |
|---|---|---|---|
| | | 2 | 3 |
| Aspheric surface coefficient | κ | −6.3761E−01 | −3.8132E+01 |

Example 5

In Example 5, the objective optical element is a single plastic lens formed of polyolefin. The objective optical element comprises an optical surface comprising central area CN, the peripheral area MD, and the most peripheral area OT. The first optical path difference providing structure is formed on the entire surface of central area CN on the optical surface. The second optical path difference providing structure is formed on the entire surface of the peripheral area MD on the optical surface. The third optical path difference providing structure is formed on the most peripheral area OT on the entire surface of the optical surface. The sectional shape is the shape likely to FIG. 8.

Further, in Example 5, the first optical path difference providing structure is the structure formed by overlapping the third basic structure with the first basic structure and the second basic structure, and having a shape in which two kinds of the serrated diffractive structures and the binary structure are overlapped.

In Example 5, the second optical path difference providing structure is the structure formed by overlapping the first basic structure and the fourth basic structure, and having a shape in which two kinds of serrated diffractive structures are overlapped.

In Example 5, the third optical path difference providing structure is the structure formed by only the fourth basic structure, and having a shape including one kind of the serrated diffractive structure.

Figure 11A:
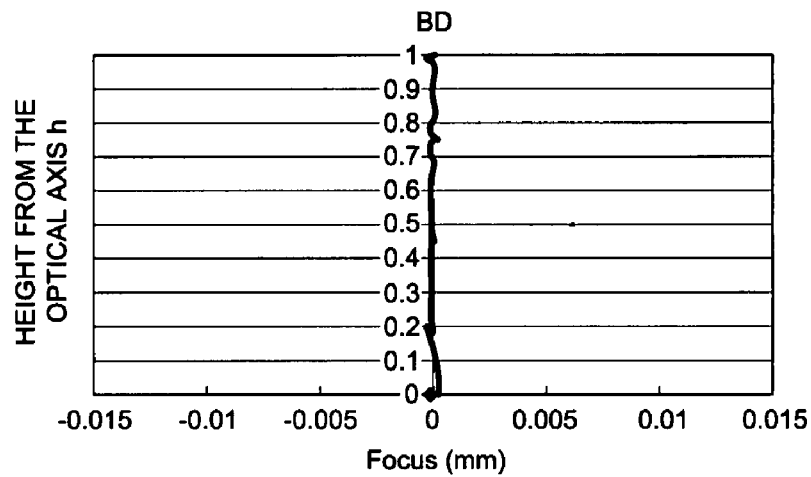
FIGS. 11(a) to 11(c) are vertical spherical aberration diagrams relating to BD, DVD, and CD of Example 5 according to the present invention.
Figure 11B:
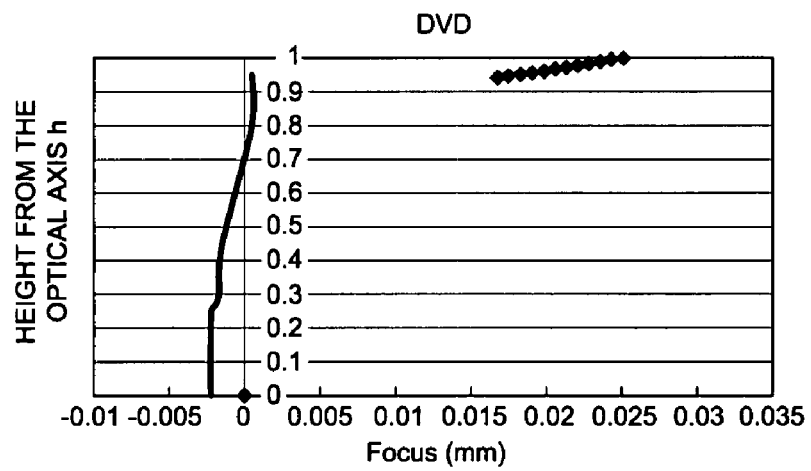
Figure 11C:
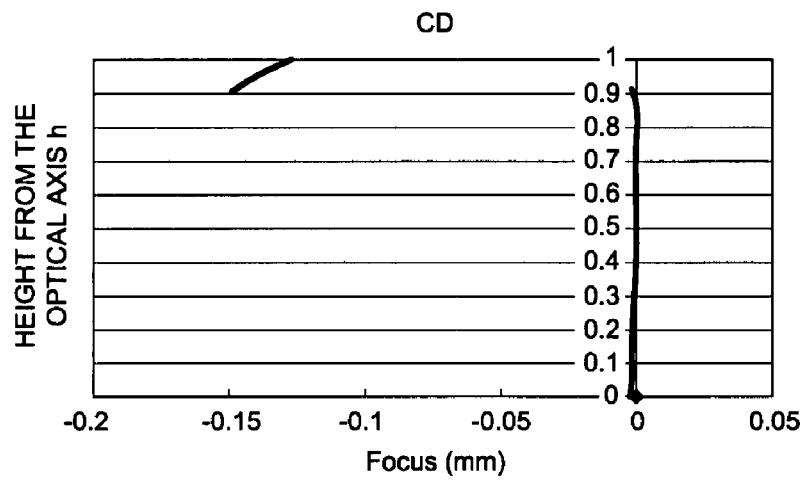

The lens data of Example 5 will be shown in Tables 6-1 to 6-4. Further, FIG. 11 shows vertical spherical aberration diagrams of Example. The numeral 1.0 of the vertical axis of the vertical spherical aberration diagrams expresses NA 0.85, or a diameter of 3.74 mm in BD, expresses a value slightly larger than NA 0.60, or a value slightly larger than a diameter of 2.71 mm in DVD, and expresses a value slightly larger than NA 0.45, or a value slightly larger than a diameter of 2.24 mm in CD. Hereupon, L is 0.38 mm in Example 5. Accordingly, it provides $L/f=0.38/2.45=0.155$.

TABLE 6-1

Lens Data

| Single diffraction lens | | | | |
|---|---|---|---|---|
| Focal length of the objective lens | | $f_1 = 2.20$ mm | $f_2 = 2.29$ mm | $f_3 = 2.45$ mm |
| Numerical aperture | | NA1: 0.85 | NA2: 0.60 | NA3: 0.45 |
| Magnification | | m1: 0 | m2: 0 | m3: 0 |

| The i-th surface | ri | di(405 nm) | ni(405 nm) | di(658 nm) | ni(658 nm) | di(785 nm) | ni(785 nm) |
|---|---|---|---|---|---|---|---|
| 0 | ∞ | ∞ | | ∞ | | ∞ | |
| 1(Stop diameter) | ∞ | 0.0 (φ3.74 mm) | | 0.0 (φ2.71 mm) | | 0.0 (φ2.24 mm) | |
| 2 | 1.5827 | 2.530 | 1.560 | 2.530 | 1.541 | 2.530 | 1.537 |
| 2-1 | 1.5799 | | | | | | |
| 2-2 | 1.5769 | | | | | | |
| 2-3 | 1.5741 | | | | | | |
| 2-4 | 1.5816 | | | | | | |
| 2-5 | 1.5816 | | | | | | |
| 2-6 | 1.5827 | | | | | | |
| 2-7 | 1.5824 | | | | | | |
| 2-8 | 1.5123 | | | | | | |
| 2-9 | 1.5126 | | | | | | |
| 2-10 | 1.5126 | | | | | | |
| 3 | −3.3232 | 0.74 | | 0.51 | | 0.34 | |
| 4 | ∞ | 0.0875 | 1.620 | 0.600 | 1.577 | 1.200 | 1.571 |
| 5 | ∞ | | | | | | |

TABLE 6-2

| | | Surface no. | | | |
|---|---|---|---|---|---|
| | | 2 | 2-1 | 2-2 | 2-3 |
| | | | Area | | |
| | | $h \leq 0.357$ | $0.357 \leq h \leq 0.563$ | $0.563 \leq h \leq 0.779$ | $0.779 \leq h \leq 1.229$ |
| Aspheric surface coefficient | κ | −5.1901E−01 | −5.1920E−01 | −5.1610E−01 | −5.1369E−01 |
| | A0 | 0.0000E+00 | 7.2386E−03 | 1.4474E−02 | 2.1741E−02 |
| | A4 | 1.6812E−02 | 1.6812E−02 | 1.6812E−02 | 1.6812E−02 |
| | A6 | 7.2184E−04 | 7.2184E−04 | 7.2184E−04 | 7.2184E−04 |
| | A8 | 3.6921E−03 | 3.6921E−03 | 3.6921E−03 | 3.6921E−03 |
| | A10 | −2.3832E−03 | −2.3832E−03 | −2.3832E−03 | −2.3832E−03 |
| | A12 | 7.3118E−04 | 7.3118E−04 | 7.3118E−04 | 7.3118E−04 |
| | A14 | 4.3460E−04 | 4.3460E−04 | 4.3460E−04 | 4.3460E−04 |
| | A16 | −3.3859E−04 | −3.3859E−04 | −3.3859E−04 | −3.3859E−04 |
| | A18 | 7.7905E−05 | 7.7905E−05 | 7.7905E−05 | 7.7905E−05 |
| | A20 | −3.8236E−06 | −3.8236E−06 | −3.8236E−06 | −3.8236E−06 |
| Optical path difference function | Diffraction order | 2/1/1 | 2/1/1 | 2/1/1 | 2/1/1 |
| | *1 | 395 nm | 395 nm | 395 nm | 395 nm |
| | C2 | −9.6690E−03 | −9.6690E−03 | −9.6690E−03 | −9.6690E−03 |
| | C4 | 2.8071E−03 | 2.8071E−03 | 2.8071E−03 | 2.8071E−03 |
| | C6 | 4.5147E−04 | 4.5147E−04 | 4.5147E−04 | 4.5147E−04 |
| | C8 | −1.8776E−04 | −1.8776E−04 | −1.8776E−04 | −1.8776E−04 |
| | C10 | 1.1487E−04 | 1.1487E−04 | 1.1487E−04 | 1.1487E−04 |

TABLE 6-2-continued

|  |  | Surface no. | | | |
|---|---|---|---|---|---|
|  |  | 2 | 2-1 | 2-2 | 2-3 |
|  |  | Area | | | |
|  |  | $h \leqq 0.357$ | $0.357 \leqq h \leqq 0.563$ | $0.563 \leqq h \leqq 0.779$ | $0.779 \leqq h \leqq 1.229$ |
| Optical path difference function | Diffraction order | 0/0/1 | 0/0/1 | 0/0/1 | 0/0/1 |
|  | *1 | 785 nm | 785 nm | 785 nm | 785 nm |
|  | C2 | 2.1432E−02 | 2.1432E−02 | 2.1432E−02 | 2.1432E−02 |
|  | C4 | −1.7579E−03 | −1.7579E−03 | −1.7579E−03 | −1.7579E−03 |
|  | C6 | 6.1798E−04 | 6.1798E−04 | 6.1798E−04 | 6.1798E−04 |
|  | C8 | −1.7907E−04 | −1.7907E−04 | −1.7907E−04 | −1.7907E−04 |
|  | C10 | 5.5149E−06 | 5.5149E−06 | 5.5149E−06 | 5.5149E−06 |

*1: Design wavelength

TABLE 6-3

|  |  | Surface no. | | | |
|---|---|---|---|---|---|
|  |  | 2-4 | 2-5 | 2-6 | 2-7 |
|  |  | Area | | | |
|  |  | $1.229 \leqq h \leqq 1.279$ | $1.279 \leqq h \leqq 1.313$ | $1.313 \leqq h \leqq 1.338$ | $1.338 \leqq h \leqq 1.360$ |
| Aspheric surface coefficient | κ | −5.0865E−01 | −5.1138E−01 | −5.0846E−01 | −5.1704E−01 |
|  | A0 | 1.9053E−02 | 1.5184E−02 | 1.1708E−02 | 7.7827E−03 |
|  | A4 | 1.7171E−02 | 1.7096E−02 | 1.6812E−02 | 1.6882E−02 |
|  | A6 | 7.2184E−04 | 7.2184E−04 | 7.2184E−04 | 7.8583E−04 |
|  | A8 | 3.6921E−03 | 3.6921E−03 | 3.6921E−03 | 3.6921E−03 |
|  | A10 | −2.3832E−03 | −2.3832E−03 | −2.3832E−03 | −2.3832E−03 |
|  | A12 | 7.3118E−04 | 7.3118E−04 | 7.3118E−04 | 7.3118E−04 |
|  | A14 | 4.3460E−04 | 4.3460E−04 | 4.3460E−04 | 4.3460E−04 |
|  | A16 | −3.3859E−04 | −3.3859E−04 | −3.3859E−04 | −3.3859E−04 |
|  | A18 | 7.7905E−05 | 7.7905E−05 | 7.7905E−05 | 7.7905E−05 |
|  | A20 | −3.8236E−06 | −3.8236E−06 | −3.8236E−06 | −3.8236E−06 |
| Optical path difference function | Diffraction order | 2/1/1 | 2/1/1 | 2/1/1 | 2/1/1 |
|  | *1 | 395 nm | 395 nm | 395 nm | 395 nm |
|  | C2 | −9.6690E−03 | −9.6690E−03 | −9.6690E−03 | −9.6690E−03 |
|  | C4 | 2.8071E−03 | 2.8071E−03 | 2.8071E−03 | 2.8071E−03 |
|  | C6 | 4.5147E−04 | 4.5147E−04 | 4.5147E−04 | 4.5147E−04 |
|  | C8 | −1.8776E−04 | −1.8776E−04 | −1.8776E−04 | −1.8776E−04 |
|  | C10 | 1.1487E−04 | 1.1487E−04 | 1.1487E−04 | 1.1487E−04 |
| Optical path difference function | Diffraction order |  |  |  |  |
|  | *1 |  |  |  |  |
|  | C2 |  |  |  |  |
|  | C4 |  |  |  |  |
|  | C6 |  |  |  |  |
|  | C8 |  |  |  |  |
|  | C10 |  |  |  |  |

*1: Design wavelength

TABLE 6-4

|  |  | Surface no. | | | |
|---|---|---|---|---|---|
|  |  | 2-8 | 2-9 | 2-10 | 3 |
|  |  | Area | | | |
|  |  | $1.360 \leqq h \leqq 1.693$ | $1.693 \leqq h \leqq 1.795$ | $h \geqq 1.795$ |  |
| Aspheric surface coefficient | κ | −6.3971E−01 | −6.3971E−01 | −6.3971E−01 | −6.4455E+01 |
|  | A0 | 3.3772E−02 | 3.3772E−02 | 3.3772E−02 | 0.0000E+00 |
|  | A4 | 6.7776E−03 | 6.7776E−03 | 6.7776E−03 | 1.0127E−01 |
|  | A6 | 9.8447E−04 | 9.8447E−04 | 9.8447E−04 | −1.0483E−01 |
|  | A8 | 3.0474E−03 | 3.0474E−03 | 3.0474E−03 | 8.1714E−02 |
|  | A10 | −1.6077E−03 | −1.6077E−03 | −1.6077E−03 | −4.5164E−02 |
|  | A12 | 1.9240E−04 | 1.9240E−04 | 1.9240E−04 | 1.3855E−02 |
|  | A14 | 2.3762E−04 | 2.3762E−04 | 2.3762E−04 | −1.7611E−03 |
|  | A16 | −1.6317E−04 | −1.6317E−04 | −1.6317E−04 | 0.0000E+00 |

TABLE 6-4-continued

| | | Surface no. | | | |
|---|---|---|---|---|---|
| | | 2-8 | 2-9 | 2-10 | 3 |
| | | | Area | | |
| | | $1.360 \leq h \leq 1.693$ | $1.693 \leq h \leq 1.795$ | $h \geq 1.795$ | |
| | A18 | 4.5602E−05 | 4.5602E−05 | 4.5602E−05 | 0.0000E+00 |
| | A20 | −4.8919E−06 | −4.8919E−06 | −4.8919E−06 | 0.0000E+00 |
| Optical path difference function | Diffraction order | 5/3/2 | 2/1/1 | 5/3/2 | |
| | *1 | 405 nm | 405 nm | 405 nm | |
| | C2 | −2.9493E−03 | −7.3734E−03 | −2.9493E−03 | |
| | C4 | 2.1334E−04 | 5.3335E−04 | 2.1334E−04 | |
| | C6 | −3.0344E−05 | −7.5859E−05 | −3.0344E−05 | |
| | C8 | −2.1699E−05 | −5.4247E−05 | −2.1699E−05 | |
| | C10 | −4.3323E−06 | −1.0831E−05 | −4.3323E−06 | |
| Optical path difference function | Diffraction order | | | | |
| | *1 | | | | |
| | C2 | | | | |
| | C4 | | | | |
| | C6 | | | | |
| | C8 | | | | |
| | C10 | | | | |

*1: Design wavelength

Further, as for the temperature characteristics of the objective optical element of Example 5, δSAT1 is +0.0308 WFEλrms/° C., and δSAT2 is +0.00176 WFEλrms/° C. Further, because f of the objective optical element for the first wavelength is 2.20 mm, δSAT1/f is +0.0014 WFEλrms/(° C.·mm), and δSAT2/f is +0.0008 WFEλrms/(° C.·mm). Further, as for the wavelength characteristics of the objective optical element of Example 5, δSAλ is −0.02618 λrms/nm, and δSAλ/f is −0.0119 λrms/(nm·mm). Hereupon, the using wavelength is 405 nm, and the ambient temperature for the wavelength characteristics is 25° C.

Furthermore, in case that there is provided collimator lens CL which is a single lens same as the collimator lens used in Example 4, and the collimator lens is used for Example 5 with being combined with the objective optical element in Example 5, δSAT3 is +0.000198 WFEλrms/° C., and δSAT3/f is +0.00009 WFEλrms/(° C.·mm).

Next, an example of the manufacturing method of the optical pickup apparatus by using the objective optical element of Example 4 or 5, and the similar objective optical element to them, will be described. Herein, it is considered that the objective optical element is optimized to the blue-violet semiconductor laser LD1 in which the deviation of the oscillation wavelength is larger. Initially, it is defined that the reference wavelength of the blue-violet semiconductor laser LD1 is 405 nm. The objective optical element in the first group is formed as follows. The objective optical element is designed, for the reference wavelength, so as to include an optical path difference providing structure by which the spherical aberration becomes optimum when the design wavelength is 402 nm. The first metallic mold corresponding to the objective optical element is produced, and the objective optical element molded by the first metallic mold is labeled as the first group.

The objective optical element in the second group is formed as follows. The objective optical element is designed so as to include an optical path difference providing structure by which the spherical aberration becomes optimum when the design wavelength is 403 nm. The second metallic mold corresponding to the objective optical element is produced, and the objective optical element molded by the second metallic mold is labeled as the second group.

The objective optical element in the third group is formed as follows. The objective optical element is designed so as to include an optical path difference providing structure by which the spherical aberration becomes optimum when the design wavelength is 404 nm. The third metallic mold corresponding to the objective optical element is produced, and the objective optical element molded by the third metallic mold is labeled as the third group.

The objective optical element in the fourth group is formed as follows. The objective optical element is designed so as to include an optical path difference providing structure by which the spherical aberration becomes optimum when the design wavelength is 405 nm. The fourth metallic mold corresponding to the objective optical element is produced, and the objective optical element molded by the fourth metallic mold is labeled as the fourth group.

The objective optical element in the fifth group is formed as follows. The objective optical element is designed so as to include an optical path difference providing structure by which the spherical aberration becomes optimum when the design wavelength is 406 nm. The fifth metallic mold corresponding to the objective optical element is produced, and the objective optical element molded by the fifth metallic mold is labeled as the fifth group.

The objective optical element in the sixth group is formed as follows. The objective optical element is designed so as to include an optical path difference providing structure by which the spherical aberration becomes optimum when the design wavelength is 407 nm. The sixth metallic mold corresponding to the objective optical element is produced, and the objective optical element molded by the sixth metallic mold is labeled as the sixth group.

The objective optical element in the seventh group is formed as follows. The objective optical element is designed so as to include an optical path difference providing structure by which the spherical aberration becomes optimum when the design wavelength is 408 nm. The seventh metallic mold corresponding to the objective optical element is produced, and the objective optical element molded by the seventh metallic mold is labeled as the seventh group.

In this embodiment, the specification of the optical path difference providing structure is divided into seven groups. However it is to be understood that various changes and modifications will be apparent to those skilled in the art. For example, the numbers of groups may be 3 or 5.

Figure 15:
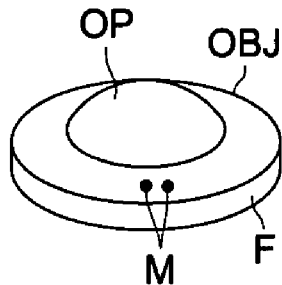
FIG. 15 is a perspective view of molded objective optical element OBJ.

FIG. 15 is a perspective view of the molded objective lens OBJ. As shown in FIG. 15, a convex or concave identification mark M is formed on the circular flange F arranged around the optical surface OP in the objective optical element OBJ. The mark can be simultaneously transferred and formed on the objective optical element OBJ at the time of the molding of the objective optical element OBJ by previously forming concave portion or convex portion corresponding to the mark on the flange transfer surface of the metallic mold (not shown). In the present embodiment, when one identification mark M is formed, it shows that the objective lens belongs to the first group. When two identification marks M are formed, it shows that the objective lens belongs to the second group. When three identification marks M are formed, it shows that the objective lens belongs to the third group. The succeeding groups are identified by the same manner. Hereupon, a method of labeling the groups is not limited to the above method. For example, the different identification mark may also be attached on that tray of an objective optical lens, cartridge or box for packaging that.

Figure 16:
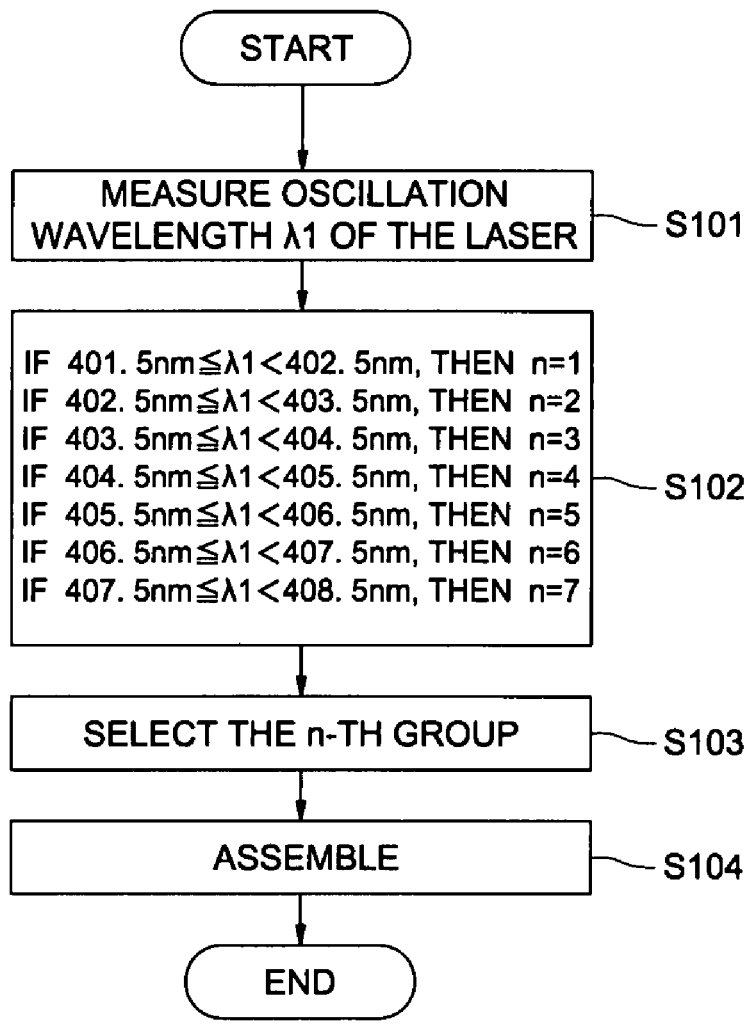
FIG. 16 is a flow chart showing an example of the manufacturing method of the optical pickup apparatus.

FIG. 16 is a flowchart showing the manufacturing method of the optical pickup apparatus according to the present embodiment. In step S101 of FIG. 16, the oscillation wavelength $\lambda 1$ of the arbitrary blue-violet semiconductor laser diode is measured. Next, in step S102, if the measured oscillation wavelength $\lambda 1$ is 401.5 nm or more, and less than 402.5 nm, n is set to 1; if the measured oscillation wavelength $\lambda 1$ is 402.5 nm or more, and less than 403.5 nm, n is set to 2; if the measured oscillation wavelength $\lambda 1$ is 403.5 nm or more, and less than 404.5 nm, n is set to 3; when the measured oscillation wavelength $\lambda 1$ is 404.5 nm or more, and less than 405.5 nm, n is set to 4; if the measured oscillation wavelength $\lambda 1$ is 405.5 nm or more, and less than 406.5 nm, n is set to 5; when the measured oscillation wavelength $\lambda 1$ is 406.5 nm or more, and less than 407.5 nm, n is set to 6; and if the measured oscillation wavelength $\lambda 1$ is 407.5 nm or more, and less than 408.5 nm, n is set to 7. Hereupon, when the oscillation wavelength $\lambda 1$ of the blue-violet semiconductor laser is less than 401.5 nm, or is 408.5 nm or more, it may be replaced with another one as the product which is out of the tolerance.

In succeeding step S103, the objective optical element in the n-th group is selected. Further, in step S104, when the measured blue-violet semiconductor laser diode and parts including the selected objective optical element are assembled, the optical pickup apparatus is completed.

The present invention is not limited to the examples described in the specification, it is apparent to those skilled in the art, from the examples and spirit described in the present specification that the invention includes other examples and modified examples. The description and examples in the specification is persistently purposed for the exemplification, and the scope of the present invention is shown by the following claims.

What is claimed is:

1. An optical pickup apparatus for recording and/or reproducing information for an optical disk, the optical pickup apparatus comprising:

a first light source for emitting a first light flux having a first wavelength $\lambda 1$;

a second light source for emitting a second light flux having a second wavelength $\lambda 2$ ($\lambda 2 > \lambda 1$);

a third light source for emitting a third light flux having a third wavelength $\lambda 3$ ($\lambda 3 > \lambda 2$); and an objective optical element for converging the first light flux onto an information recording surface of a first optical disk having a protective substrate with a thickness t1, for converging the second light flux onto an information recording surface of a second optical disk having a protective substrate with a thickness t2 (t1≦t2), and for converging the third light flux onto an information recording surface of a third optical disk having a protective substrate with a thickness t3 (t2<t3), wherein the optical pickup apparatus records and/or reproduces information by converging the first light flux onto the information recording surface of the first optical disk, by converging the second light flux onto the information recording surface of the second optical disk, and by converging the third light flux onto the information recording surface of the third optical disk, wherein the objective optical element comprises an optical surface comprising at least two areas which are a central area and a peripheral area surrounding the central area, the central area comprises a first optical path difference providing structure, the peripheral area comprises a second optical path difference providing structure, wherein the objective optical element converges the first light flux which passes through the central area of the objective optical element onto the information recording surface of the first optical disk so that the optical pickup apparatus can record and/or reproduce information on the information recording surface of the first optical disk, the objective optical element converges the second light flux which passes through the central area of the objective optical element onto the information recording surface of the second optical disk so that the optical pickup apparatus can record and/or reproduce information on the information recording surface of the second optical disk, the objective optical element converges the third light flux which passes through the central area of the objective optical element onto the information recording surface of the third optical disk so that the optical pickup apparatus can record and/or reproduce information on the information recording surface of the third optical disk, the objective optical element converges the first light flux which passes through the peripheral area of the objective optical element onto the information recording surface of the first optical disk so that the optical pickup apparatus can record and/or reproduce information on the information recording surface of the first optical disk, and the objective optical element converges the second light flux which passes through the peripheral area of the objective optical element onto the information recording surface of the second optical disk so that the optical pickup apparatus can record and/or reproduce information on the information recording surface of the second optical disk, and wherein the optical pickup apparatus satisfies following expressions:

$$+0.00045(WFE\lambda rms/(°C·mm)) \leq \delta SAT1/f \leq +0.0027 (WFE\lambda rms/(°C·mm)),\text{ and}$$

$$-0.045(WFE\lambda rms/(nm·mm)) < \delta SA\lambda/f \leq -0.0045 (WFE\lambda rms/(nm·mm)),$$

where $\delta SAT1$ represents $\delta SA3/\delta T$ of the objective optical element for a using light wavelength which does not change with a temperature change, in case that information is recorded and/or reproduced for the first optical disk, in other words, $\delta SAT1$ is a ratio of a change in a third spherical aberration of the objective optical element with a temperature change for a using light wavelength which does not change with a temperature change, in case that information is recorded and/or reproduced for the first optical disk, and $\delta SA\lambda$ represents $\delta SA3/\delta\lambda$ of the objective optical element for a using light wavelength, in case that information is recorded and/or reproduced for the first optical disk, in other words, $\delta SA\lambda$ is a ratio of a change in a third spherical aberration of the objective optical element with a wavelength change for an using light wavelength, in case that information is recorded and/or reproduced for the first optical disk, and f is a focal length of the objective optical element for the first light flux.

2. The optical pickup apparatus of claim 1, satisfying a following expression:

$$0(WFE\lambda rms/(°C·mm)) \leq \delta SAT2/f \leq +0.00136(WFE\lambda rms/(°C·mm)),$$

where $\delta SAT2$ represents $\delta SA3/\delta T$ of the objective optical element for a using light wavelength which changes by 0.05 nm/° C. with a temperature change, in case that information is recorded and/or reproduced for the first optical disk, in other words, $\delta SAT2$ is a ratio of a change in a third spherical aberration of the objective optical element with a temperature change for a using light wavelength which changes by 0.05 nm/° C. with the temperature change, in case that information is recorded and/or reproduced for the first optical disk.

3. The optical pickup apparatus of claim 1, further comprising a coupling lens which is a plastic lens, and satisfying a following expression:

$$0(WFE\lambda rms/(°C·mm)) \leq \delta SAT3/f \leq +0.00091(WFE\lambda rms/(°C·mm)),$$

where $\delta SAT3$ represents $\delta SA3/\delta T$ of a total optical system including the coupling lens and the objective optical element for a using light wavelength which changes by 0.05 nm/° C. with a temperature change in case that information is recorded and/or reproduced for the first optical disk, in other words, $\delta SAT3$ is a ratio of a change in a third spherical aberration of a total optical system including the coupling lens and the objective optical element with a temperature change for a using light wavelength which changes by 0.05 nm/° C. with the temperature change, in case that information is recorded and/or reproduced for the first optical disk.

4. The optical pickup apparatus of claim 1, wherein the first optical path difference providing structure comprises any one structure selected from a group including a third basic structure, a fourth basic structure and a seventh basic structure, and the third basic structure is an optical path difference providing structure which emits a tenth-order diffracted light flux with a larger light amount than any diffracted light fluxes with the other diffraction order, when the first light flux passes through the third basic structure, which emits a sixth-order diffracted light flux with a larger light amount than any diffracted light fluxes with the other diffraction order, when the second light flux passes through the third basic structure, and which emits a fifth order diffracted light flux with a larger light amount than any diffracted light fluxes with the other diffraction order, when the third light flux passes through the third basic structure, the fourth basic structure is an optical path difference providing structure which emits a fifth-order diffracted light flux with a larger light amount than any diffracted light fluxes with the other diffraction order, when the first light flux passes through the fourth basic structure, which emits a third-order diffracted light flux with a larger light amount than any diffracted light fluxes with the other diffraction order, when the second light flux passes through the fourth basic structure, and which emits a second order diffracted light flux with a larger light amount than any diffracted light fluxes with the other diffraction order, when the third light flux passes through the fourth basic structure, and the seventh basic structure is an optical path difference providing structure which emits a second-order diffracted light flux with a larger light amount than any diffracted light fluxes with the other diffraction order, when the first light flux passes through the seventh basic structure, which emits a first-order diffracted light flux with a larger light amount than any diffracted light fluxes with the other diffraction order, when the second light flux passes through the seventh basic structure, and which emits a first order diffracted light flux with a larger light amount than any diffracted light fluxes with the other diffraction order, when the third light flux passes through the seventh basic structure.

5. The optical pickup apparatus of claim 4, wherein the second optical path difference providing structure includes any one structure selected from a group including the third basic structure, the fourth basic structure and the seventh basic structure.

6. The optical pickup apparatus of claim 1, wherein the optical surface of the objective optical element is further comprises a most peripheral area surrounding the peripheral area and being a refractive surface.

7. The optical pickup apparatus of claim 1, wherein the optical surface of the objective optical element further comprises a most peripheral area surrounding the peripheral area and comprising a third optical path difference providing structure.

8. The optical pickup apparatus of claim 7, wherein the third optical path difference providing structure comprises at least one of a third basic structure, a fourth basic structure and a seventh basic structure, and the third basic structure is an optical path difference providing structure which emits a tenth-order diffracted light flux with a larger light amount than any diffracted light fluxes with the other diffraction order, when the first light flux passes through the third basic structure, which emits a sixth-order diffracted light flux with a larger light amount than any diffracted light fluxes with the other diffraction order, when the second light flux passes through the third basic structure, and which emits a fifth-order diffracted light flux with a larger light amount than any diffracted light fluxes with the other diffraction order, when the third light flux passes through the third basic structure, and the fourth basic structure is an optical path difference providing structure which emits a fifth-order diffracted light flux with a larger light amount than any diffracted light fluxes with the other diffraction order, when the first light flux passes through the fourth basic structure, which emits a third-order diffracted light flux with a larger light amount than any diffracted light fluxes with the other diffraction order, when the second light flux passes through the fourth basic structure, and which emits third and second order diffracted light fluxes each with a larger light amount than any diffracted light fluxes with the other diffraction order, when the third light flux passes through the fourth basic structure, and the seventh basic structure is an optical path difference providing structure which emits a second-order diffracted light flux with a larger light amount than any diffracted light fluxes with the other diffraction order, when the first light flux passes through the seventh basic structure, which emits a first-order diffracted light flux with a larger light amount than any diffracted light fluxes with the other diffraction order, when the second light flux passes through the seventh basic structure, and which emits a first-order diffracted light flux with a larger light amount than any diffracted light fluxes with the other diffraction order, when the third light flux passes through the seventh basic structure.

9. The optical pickup apparatus of claim 7, wherein the objective optical element converges the first light flux which passes through the most peripheral area of the objective optical element onto the information recording surface of the first optical disk so that the optical pickup apparatus can record and/or reproduce information on the information recording surface of the first optical disk.

10. The optical pickup apparatus of claim 1, wherein an image side numerical aperture (NA) of the objective optical element for the first light flux is 0.8 or more and is 0.9 or less.

11. The optical pickup apparatus of claim 1, wherein the objective optical element is a single lens.

12. The optical pickup apparatus of claim 11, wherein the objective optical element is a plastic lens.

13. An optical pickup apparatus for recording and/or reproducing information for an optical disk, the optical pickup apparatus comprising:

a first light source for emitting a first light flux having a first wavelength $\lambda 1$ (350 nm $\leq \lambda 1 \leq$ 440 nm); and an objective optical element for converging the first light flux onto an information recording surface of a first optical disk having a protective substrate with a thickness t1 (0.0750 mm $\leq$ t1 $\leq$ 0.125 mm), wherein the optical pickup apparatus records and/or reproduces information by converging the first light flux onto the information recording surface of the first optical disk, and wherein the optical pickup apparatus satisfies following expressions:

$+0.00045(WFE\lambda rms/(° C.·mm)) \leq \delta SAT1/f \leq +0.0027 (WFE\lambda rms/(° C.·mm))$, and $-0.045(WFE\lambda rms/(nm·mm)) \leq \delta SA\lambda/f \leq -0.0045 (WFE\lambda rms/(nm·mm))$, where $\delta SAT1$ represents $\delta SA3/\delta T$ of the objective optical element for a using light wavelength which does not change with a temperature change, in case that information is recorded and/or reproduced for the first optical disk, in other words, $\delta SAT1$ is a ratio of a change in a third spherical aberration of the objective optical element with a temperature change for a using light wavelength which does not change with a temperature change, in case that information is recorded and/or reproduced for the first optical disk, and $\delta SA\lambda$ represents $\delta SA3/\delta \lambda$ of the objective optical element for a using light wavelength, in case that information is recorded and/or reproduced for the first optical disk, in other words, $\delta SA\lambda$ is a ratio of a change in a third spherical aberration of the objective optical element with a wavelength change for an using light wavelength, in case that information is recorded and/or reproduced for the first optical disk, and f is a focal length of the objective optical element for the first light flux.

14. An objective optical element for use in an optical pickup apparatus, the optical pickup apparatus comprising a first light source for emitting a first light flux having a first wavelength $\lambda 1$;

a second light source for emitting a second light flux having a second wavelength $\lambda 2$ ($\lambda 2 > \lambda 1$); and a third light source for emitting a third light flux having a third wavelength $\lambda 3$ ($\lambda 3 > \lambda 2$), and conducting recording and/or reproducing information using the first light flux for a first optical disk having a protective substrate with a thickness t1, conducting recording and/or reproducing information using the second light flux for a second optical disk having a protective substrate with a thickness t2 (t1 $\leq$ t2), and conducting recording and/or reproducing information using the third light flux for a third optical disk having a protective substrate with a thickness t3 (t2 < t3), the objective optical element comprising:

an optical surface comprising at least two areas which are a central area and a peripheral area arranged around the central area, wherein the central area comprises a first optical path difference providing structure, the peripheral area comprises a second optical path difference providing structure, wherein the objective optical element converges the first light flux which passes through the central area of the objective optical element onto the information recording surface of the first optical disk so that the optical pickup apparatus can record and/or reproduce information on the information recording surface of the first optical disk, the objective optical element converges the second light flux which passes through the central area of the objective optical element onto the information recording surface of the second optical disk so that the optical pickup apparatus can record and/or reproduce information on the information recording surface of the second optical disk, the objective optical element converges the third light flux which passes through the central area of the objective optical element onto the information recording surface of the third optical disk so that the optical pickup apparatus can record and/or reproduce information on the information recording surface of the third optical disk, the objective optical element converges the first light flux which passes through the peripheral area of the objective optical element onto the information recording surface of the first optical disk so that the optical pickup apparatus can record and/or reproduce information on the information recording surface of the first optical disk, and the objective optical element converges the second light flux which passes through the peripheral area of the objective optical element onto the information recording surface of the second optical disk so that the optical pickup apparatus can record and/or reproduce information on the information recording surface of the second optical disk, and wherein the objective optical element satisfies following expressions:

$$+0.00045(WFE\lambda \text{rms}/(°\text{C·mm})) \leq \delta SAT1/f \leq +0.0027(WFE\lambda \text{rms}/(°\text{C·mm})), \text{ and}$$

$$-0.045(WFE\lambda \text{rms}/(\text{nm·mm})) \leq \delta SA\lambda/f \leq -0.0045(WFE\lambda \text{rms}/(\text{nm·mm})),$$

where $\delta SAT1$ represents $\delta SA3/\delta T$ of the objective optical element for a using light wavelength which does not change with a temperature change, in case that information is recorded and/or reproduced for the first optical disk, in other words, $\delta SAT1$ is a ratio of a change in a third spherical aberration of the objective optical element with a temperature change for a using light wavelength which does not change with a temperature change, in case that information is recorded and/or reproduced for the first optical disk, and $\delta SA\lambda$ represents $\delta SA3/\delta \lambda$ of the objective optical element for a using light wavelength, in case that information is recorded and/or reproduced for the first optical disk, in other words, $\delta SA\lambda$ is a ratio of a change in a third spherical aberration of the objective optical element with a wavelength change for an using light wavelength, in case that information is recorded and/or reproduced for the first optical disk, and f is a focal length of the objective optical element for the first light flux.

15. The objective optical element of claim 14, satisfying a following expression:

$$0(WFE\lambda \text{rms}/(°\text{C·mm})) \leq \delta SAT2/f \leq +0.00136(WFE\lambda \text{rms}/(°\text{C·mm})),$$

where $\delta SAT2$ represents $\delta SA3/\delta T$ of the objective optical element for a using light wavelength which changes by 0.05 nm/° C. with a temperature change, in case that information is recorded and/or reproduced for the first optical disk, in other words, $\delta SAT2$ is a ratio of a change in a third spherical aberration of the objective optical element with a temperature change for a using light wavelength which changes by 0.05 nm/° C. with a temperature change, in case that information is recorded and/or reproduced for the first optical disk.

16. The objective optical element of claim 14, wherein the optical pickup apparatus further comprises a coupling lens which is a plastic lens, and the objective optical element satisfies a following expression:

$$0(WFE\lambda \text{rms}/(°\text{C·mm})) \leq \delta SAT3/f \leq +0.00091(WFE\lambda \text{rms}/(°\text{C·mm})),$$

where $\delta SAT3$ represents $\delta SA3/\delta T$ of a total optical system including the coupling lens and the objective optical element for a using light wavelength which changes by 0.05 nm/° C. with a temperature change which changes by 0.05 nm/° C. with a temperature change, in case that information is recorded and/or reproduced for the first optical disk, in other words, $\delta SAT3$ is a ratio of a change in a third spherical aberration of a total optical system including the coupling lens and the objective optical element with a temperature change for a using light wavelength which changes by 0.05 nm/° C. with the temperature change, in case that information is recorded and/or reproduced for the first optical disk.

17. The objective optical element of claim 14, wherein the first optical path difference providing structure comprises any one structure selected from a group including a third basic structure, a fourth basic structure and a seventh basic structure, and the third basic structure is an optical path difference providing structure which emits a tenth-order diffracted light flux with a larger light amount than any diffracted light fluxes with the other diffraction order, when the first light flux passes through the third basic structure, which emits a sixth-order diffracted light flux with a larger light amount than any diffracted light fluxes with the other diffraction order, when the second light flux passes through the third basic structure, and which emits a fifth order diffracted light flux with a larger light amount than any diffracted light fluxes with the other diffraction order, when the third light flux passes through the third basic structure, the fourth basic structure is an optical path difference providing structure which emits a fifth-order diffracted light flux with a larger light amount than any diffracted light fluxes with the other diffraction order, when the first light flux passes through the fourth basic structure, which emits a third-order diffracted light flux with a larger light amount than any diffracted light fluxes with the other diffraction order, when the second light flux passes through the fourth basic structure, and which emits a second order diffracted light flux with a larger light amount than any diffracted light fluxes with the other diffraction order, when the third light flux passes through the fourth basic structure, and the seventh basic structure is an optical path difference providing structure which emits a second-order diffracted light flux with a larger light amount than any diffracted light fluxes with the other diffraction order, when the first light flux passes through the seventh basic structure, which emits a first-order diffracted light flux with a larger light amount than any diffracted light fluxes with the other diffraction order, when the second light flux passes through the seventh basic structure, and which emits a first order diffracted light flux with a larger light amount than any diffracted light fluxes with the other diffraction order, when the third light flux passes through the seventh basic structure.

18. The objective optical element of claim 17, wherein the second optical path difference providing structure includes any one structure selected from a group including the third basic structure, the fourth basic structure and the seventh basic structure.

19. The objective optical element of claim 14,
wherein the optical surface of the objective optical element is further comprises a most peripheral area surrounding the peripheral area and being a refractive surface.

20. The objective optical element of claim 14,
wherein the optical surface of the objective optical element further comprises a most peripheral area surrounding the peripheral area and comprising a third optical path difference providing structure.

21. The objective optical element of claim 20,
wherein the third optical path difference providing structure comprises at least one of a third basic structure, a fourth basic structure and a seventh basic structure, and
the third basic structure is an optical path difference providing structure
which emits a tenth-order diffracted light flux with a larger light amount than any diffracted light fluxes with the other diffraction order, when the first light flux passes through the third basic structure,
which emits a sixth-order diffracted light flux with a larger light amount than any diffracted light fluxes with the other diffraction order, when the second light flux passes through the third basic structure, and
which emits a fifth order diffracted light flux with a larger light amount than any diffracted light fluxes with the other diffraction order, when the third light flux passes through the third basic structure, and
the fourth basic structure is an optical path difference providing structure
which emits a fifth-order diffracted light flux with a larger light amount than any diffracted light fluxes with the other diffraction order, when the first light flux passes through the fourth basic structure,
which emits a third-order diffracted light flux with a larger light amount than any diffracted light fluxes with the other diffraction order, when the second light flux passes through the fourth basic structure, and
which emits third and second order diffracted light fluxes each with a larger light amount than any diffracted light fluxes with the other diffraction order, when the third light flux passes through the fourth basic structure, and the seventh basic structure is an optical path difference providing structure
which emits a second-order diffracted light flux with a larger light amount than any diffracted light fluxes with the other diffraction order, when the first light flux passes through the seventh basic structure,
which emits a first-order diffracted light flux with a larger light amount than any diffracted light fluxes with the other diffraction order, when the second light flux passes through the seventh basic structure, and
which emits a first order diffracted light flux with a larger light amount than any diffracted light fluxes with the other diffraction order, when the third light flux passes through the seventh basic structure.

22. The objective optical element of claim 20,
wherein the objective optical element converges the first light flux which passes through the most peripheral area of the objective optical element onto the information recording surface of the first optical disk so that the optical pickup apparatus can record and/or reproduce information on the information recording surface of the first optical disk.

23. The objective optical element of claim 14,
wherein an image side numerical aperture (NA) of the objective optical element for the first light flux is 0.8 or more and is 0.9 or less.

24. The objective optical element of claim 14, wherein the objective optical element is a single lens.

25. The objective optical element of claim 20, wherein the objective optical element is a plastic lens.

26. An objective optical element for use in an optical pickup apparatus, the optical pickup apparatus comprising
a first light source for emitting a first light flux having a first wavelength λ1 (350 nm ≦λ1 440 nm); and
conducting recording and/or reproducing information using the first light flux for a first optical disk having a protective substrate with a thickness t1,
wherein the objective optical element converges the first light flux onto the information recording surface of the first optical disk having a protective substrate with a thickness t1 (0.0750 mm ≦t1 ≦0.125 mm), and
wherein the optical pickup apparatus satisfies following expressions:

+0.00045($WFE\lambda$rms/(° C.·mm))≦$\delta SAT1/f$≦+0.0027 ($WFE\lambda$rms/(° C.·mm)), and −0.045($WFE\lambda$rms/(nm·mm))≦$\delta SA\lambda/f$≦−0.0045 ($WFE\lambda$rms/(nm·mm)), where δSAT1 represents δSA3/δT of the objective optical element for a using light wavelength which does not change with a temperature change, in case that information is recorded and/or reproduced for the first optical disk, in other words, δSAT1 is a ratio of a change in a third spherical aberration of the objective optical element with a temperature change for a using light wavelength which does not change with a temperature change, in case that information is recorded and/or reproduced for the first optical disk, and
δSAλ represents δSA3/δλ of the objective optical element for a using light wavelength, in case that when information is recorded and/or reproduced for the first optical disk, in other words, δSAλ is a ratio of a change in a third spherical aberration of the objective optical element with a wavelength change for an using light wavelength, in case that information is recorded and/or reproduced for the first optical disk, and
f is a focal length of the objective optical element for the first light flux.

27. An optical information recording and/or reproducing apparatus, comprising:
an optical pickup apparatus comprising:
a first light source for emitting a first light flux having a first wavelength λ1;
a second light source for emitting a second light flux having a second wavelength λ2 (λ2 >λ1);
a third light source for emitting a third light flux having a third wavelength λ3 (λ3 >λ2); and
an objective optical element
for converging the first light flux onto an information recording surface of a first optical disk having a protective substrate with a thickness t1,
for converging the second light flux onto an information recording surface of a second optical disk having a protective substrate with a thickness t2 (t1≦t2), and
for converging the third light flux onto an information recording surface of a third optical disk having a protective substrate with a thickness t3 (t2 <t3),
wherein the optical pickup apparatus records and/or reproduces information by converging the first light flux onto the information recording surface of the first optical disk, by converging the second light flux onto the information recording surface of the second optical disk, and by converging the third light flux onto the information recording surface of the third optical disk, wherein the objective optical element comprises an optical surface comprising at least two areas which are a central area and a peripheral area surrounding the central area, the central area comprises a first optical path difference providing structure, the peripheral area comprises a second optical path difference providing structure, wherein the objective optical element converges the first light flux which passes through the central area of the objective optical element onto the information recording surface of the first optical disk so that the optical pickup apparatus can record and/or reproduce information on the information recording surface of the first optical disk, the objective optical element converges the second light flux which passes through the central area of the objective optical element onto the information recording surface of the second optical disk so that the optical pickup apparatus can record and/or reproduce information on the information recording surface of the second optical disk, the objective optical element converges the third light flux which passes through the central area of the objective optical element onto the information recording surface of the third optical disk so that the optical pickup apparatus can record and/or reproduce information on the information recording surface of the third optical disk, the objective optical element converges the first light flux which passes through the peripheral area of the objective optical element onto the information recording surface of the first optical disk so that the optical pickup apparatus can record and/or reproduce information on the information recording surface of the first optical disk, and the objective optical element converges the second light flux which passes through the peripheral area of the objective optical element onto the information recording surface of the second optical disk so that the optical pickup apparatus can record and/or reproduce information on the information recording surface of the second optical disk, and wherein the optical pickup apparatus satisfies following expressions:

$$+0.00045(WFE\lambda rms/(° C. \cdot mm)) \leq \delta SAT1/f \leq +0.0027 (WFE\lambda rms/(° C. \cdot mm)), \text{ and}$$

$$-0.045(WFE\lambda rms/(nm \cdot mm)) \leq \delta SA\lambda/f \leq -0.0045 (WFE\lambda rms/(nm \cdot mm)),$$

where $\delta SAT1$ represents $\delta SA3/\delta T$ of the objective optical element for a using light wavelength which does not change with a temperature change, in case that information is recorded and/or reproduced for the first optical disk, in other words, $\delta SAT1$ is a ratio of a change in a third spherical aberration of the objective optical element with a temperature change for a using light wavelength which does not change with a temperature change, in case that information is recorded and/or reproduced for the first optical disk, and $\delta SA\lambda$ represents $\delta SA3/\delta\lambda$ of the objective optical element for a using light wavelength, in case that information is recorded and/or reproduced for the first optical disk, in other words, $\delta SA\lambda$ is a ratio of a change in a third spherical aberration of the objective optical element with a wavelength change for an using light wavelength, in case that information is recorded and/or reproduced for the first optical disk, and f is a focal length of the objective optical element for the first light flux.

\* \* \* \* \*